United States Patent
Jardine et al.

(10) Patent No.: US 12,296,859 B2
(45) Date of Patent: May 13, 2025

(54) VEHICLE CONTROLLER AND CONTROL METHOD

(71) Applicant: JAGUAR LAND ROVER LIMITED, Coventry (GB)

(72) Inventors: Fraser Jardine, Warwickshire (GB); Daniel Woolliscroft, Warwickshire (GB); Ruben Gomez Padin, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 410 days.

(21) Appl. No.: 16/982,985

(22) PCT Filed: Feb. 22, 2019

(86) PCT No.: PCT/EP2019/054401
§ 371 (c)(1),
(2) Date: Sep. 21, 2020

(87) PCT Pub. No.: WO2019/179717
PCT Pub. Date: Sep. 26, 2019

(65) Prior Publication Data
US 2021/0024097 A1    Jan. 28, 2021

(30) Foreign Application Priority Data

Mar. 23, 2018 (GB) .................................... 1804651
Mar. 23, 2018 (GB) .................................... 1804652
(Continued)

(51) Int. Cl.
*B60W 60/00*      (2020.01)
*B60W 40/08*      (2012.01)
(Continued)

(52) U.S. Cl.
CPC ........ *B60W 60/0051* (2020.02); *B60W 40/08* (2013.01); *B60W 40/105* (2013.01);
(Continued)

(58) Field of Classification Search
CPC .. B60W 60/0051; B60W 40/08; B60W 50/14; B60W 60/001; B60W 2520/10;
(Continued)

(56) References Cited

U.S. PATENT DOCUMENTS 9,580,080 B1    2/2017   Letwin et al.
9,594,373 B2 *   3/2017   Solyom ................ G05D 1/0061
(Continued)

FOREIGN PATENT DOCUMENTS

| CA | 3 033 463 | 2/2018 |
| EP | 2 915 718 | 9/2015 |
| WO | 2014085121 | 6/2014 |

OTHER PUBLICATIONS

Vision Zero International, Easy Transition: In Preparation for Its Drive Me Trial of Autonomous Driving on Public Roads, Volvo Is Paying Attention to the Safety and Usability of the Self-Driving Car's User Interface, UKIP Media & Events (Year: 2016).*

(Continued)

*Primary Examiner* — Elaine Gort
*Assistant Examiner* — Chanmin Park
(74) *Attorney, Agent, or Firm* — McCoy Russell LLP

(57) ABSTRACT

Embodiments of the present invention provide a controller (110). The controller (110) comprises input means (140) for receiving one or more state signals each indicative of one or more of a vehicle characteristic, a user characteristic and an environment characteristic. The controller (110) comprises output means (150) for outputting an availability signal indicative of an availability of an autonomous driving mode of a host vehicle. The controller (110) comprises control (Continued)

means (120) arranged to control the output means (150) to output the availability signal in dependence on the one or more state signals.

16 Claims, 18 Drawing Sheets

(30) Foreign Application Priority Data

| Mar. 23, 2018 | (GB) | 1804653 |
|---|---|---|
| Mar. 23, 2018 | (GB) | 1804654 |
| Mar. 23, 2018 | (GB) | 1804655 |
| Mar. 23, 2018 | (GB) | 1804657 |
| Mar. 23, 2018 | (GB) | 1804658 |
| Mar. 23, 2018 | (GB) | 1804659 |
| Mar. 23, 2018 | (GB) | 1804661 |
| Mar. 23, 2018 | (GB) | 1804662 |

(51) Int. Cl.
  *B60W 40/105* (2012.01)
  *B60W 50/14* (2020.01)

(52) U.S. Cl.
  CPC .......... *B60W 50/14* (2013.01); *B60W 60/001* (2020.02); *B60W 2520/10* (2013.01); *B60W 2540/229* (2020.02); *B60W 2555/20* (2020.02)

(58) Field of Classification Search
  CPC ....... B60W 2540/229; B60W 2555/20; B60W 2050/0075; B60W 2540/045; B60W 60/0057; B60W 2540/22; B60W 2552/05; B60W 2554/804; B60W 2556/10; B60W 50/082
  See application file for complete search history.

(56) References Cited

U.S. PATENT DOCUMENTS

| 11,079,771 B2* | 8/2021 | Battles ............. G08G 1/096775 |
| 2014/0088814 A1 | 3/2014 | You et al. |
| 2016/0103449 A1 | 4/2016 | Desnoyer et al. |
| 2016/0231743 A1 | 8/2016 | Bendewald et al. |
| 2016/0362116 A1 | 12/2016 | Otsuka |
| 2017/0236210 A1 | 8/2017 | Kumar et al. |
| 2018/0188727 A1* | 7/2018 | Zhuang ............... B60W 50/035 |
| 2019/0092341 A1* | 3/2019 | Stark .................... B60W 10/04 |

OTHER PUBLICATIONS

International Search Report and Written Opinion, PCT/EP2019/054401, Jul. 11, 2019.
Combined Search and Examination Report, GB1804651.6, Sep. 19, 2018, 7 pp.

* cited by examiner

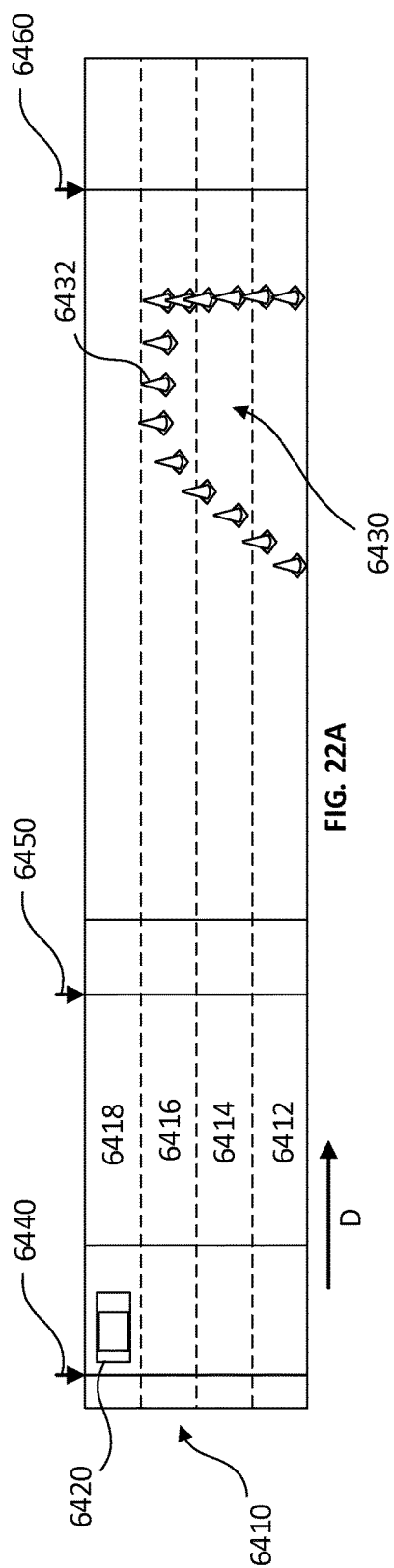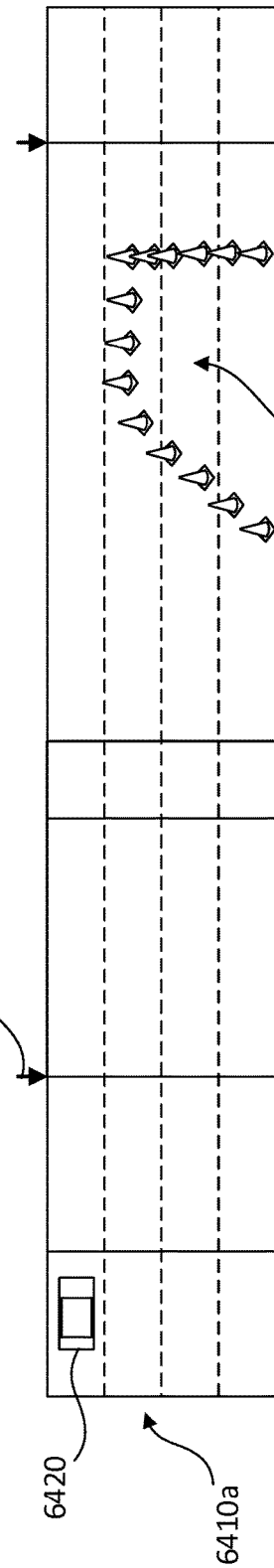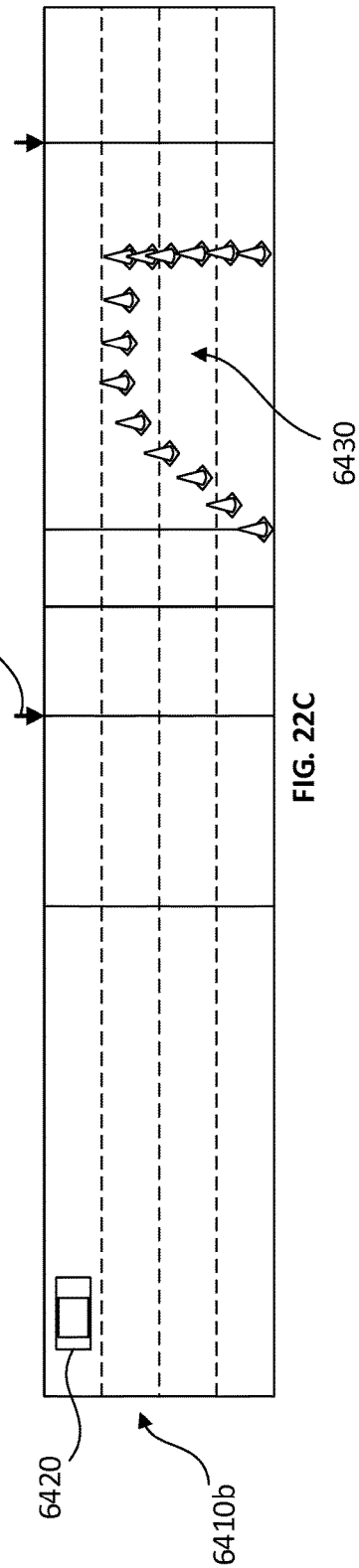

VEHICLE CONTROLLER AND CONTROL METHOD

CROSS-REFERENCE TO RELATED APPLICATIONS

This application is a 371 of International Application No. PCT/EP2019/054401, filed Feb. 22, 2019, which claims priority to GB Patent Application Nos. 1804651.6, 1804652.4, 1804653.2, 1804654.0, 1804655.7, 1804657.3, 1804658.1, 1804662.3, 1804661.5, 1804659.9, all filed Mar. 23, 2018, the contents of all of which are hereby incorporated by reference herein in their entirety.

TECHNICAL FIELD

The present disclosure relates to a vehicle controller and control method and particularly, but not exclusively, to a controller and a method for controlling the vehicle. Aspects of the invention relate to a controller, to a system, to a method, to a vehicle and to computer software.

BACKGROUND

It is known for a vehicle to operate in accordance with a predefined autonomous driving mode. The vehicle may be instructed to operate in accordance with the predefined autonomous driving mode by a user or occupant of the vehicle i.e. via an input device at which a user input is received to control operation of the predefined autonomous driving mode.

This may be problematic, especially when the user initiates the autonomous driving mode in unsuitable situations.

It is an object of embodiments of the invention to at least mitigate one or more of the problems of the prior art.

SUMMARY OF THE INVENTION

Aspects and embodiments of the invention provide a controller, a system, a method, a vehicle and computer software as claimed in the appended claims.
Availability Signal According to an aspect of the invention, there is provided a controller arranged to operably cause an output of an availability signal indicative of an availability of an autonomous driving mode of a host vehicle in dependence on a received signal indicative of a suitability of initiation of an autonomous driving mode. The received signal may be indicative of a vehicle characteristic. The received signal may be indicative of a user characteristic. The received signal may be indicative of an environment characteristic.

According to an aspect of the invention, there is provided a controller comprising input means for receiving one or more state signals each indicative of one or more of a vehicle characteristic, a user characteristic and an environment characteristic, output means for outputting an availability signal indicative of an availability of an autonomous driving mode of a host vehicle, and control means arranged to control the output means to output the availability signal in dependence on the one or more state signals. Advantageously, at least one of the vehicle characteristic(s), the user characteristic(s) and the environment characteristic(s) may be used to determine whether an autonomous driving mode is available.

The controller as described above, wherein:
the input means comprises an electrical input for receiving the signal;
the output means comprises an electrical output for outputting the signal; and
the control means comprises one or more control devices such as electronic processing devices.

The input means may be arranged to receive an initiation signal indicative of a user's request to initiate the autonomous driving mode in response to the availability signal. The output means may be arranged to output a driving mode signal to cause the host vehicle to initiate the autonomous driving mode. The control means may be arranged to control the output means to output the driving mode signal in dependence on the initiation signal. Advantageously, the autonomous driving mode of the host vehicle may be initiated by the user as a result of the availability signal. The input means arranged to receive the initiation signal may be the same or separate to the input means arranged to receive the one or more state signals. Optionally, the user may be the driver of the host vehicle. In other examples, the user may be another occupant of the host vehicle.

The control means may be arranged to determine a transition phase of the autonomous driving mode, during which control of a vehicle movement of the host vehicle is transitioned away from the user to an autonomous driving control means. At the end of the transition phase, the autonomous driving control means may be arranged to autonomously control the vehicle movement. A duration of the transition phase may be determined in dependence on the one or more state signals. Advantageously, the host vehicle may transition smoothly from a range of different current conditions to the autonomous driving mode.

The output means may be arranged to output a progress signal indicative of a progress through the transition phase. The control means may be arranged to control the output means to output the progress signal during the transition phase. Advantageously, the user may be kept informed of the progress through the transition phase via the progress signal. The user can know when at least aspects of the control of the host vehicle are completely controlled by the autonomous driving mode.

The control means may be arranged to determine the duration of the transition phase during the transition phase. Advantageously, the duration of the transition phase need not be preset at the start of the transition phase. The duration of the transition phase may be updated during the transition phase.

At least one of the one or more state signals may be indicative of a driving environment of the host vehicle. The driving environment may be indicative of a type of navigable path. Advantageously, the autonomous driving mode may be available only in certain driving environments, such as certain types of navigable paths. Optionally, the driving environment may be indicative of a road type of the navigable path, such as a multi-lane path, or a highway. Optionally, it may be expected that the driving environment is free of pedestrians.

At least one of the one or more state signals may be indicative of a speed. Optionally, the speed may be a wheel speed, a powertrain speed (such as a speed of a motor, a speed of an engine, or a speed of a drive shaft), or any other vehicle speed. The speed may be a speed of the host vehicle. At least one or the one or more state signals may be indicative of a speed of at least one target vehicle. Advantageously, the autonomous driving mode may be available only when the speed is such that the autonomous driving mode can perform fully.

At least one of the one or more state signals may be indicative of a detection range of one or more sensors associated with the host vehicle. Advantageously, the autonomous driving mode may be available only when the detection range of one or more sensors associated with the host vehicle exceeds a range threshold.

At least one of the one or more state signals may be indicative of a weather condition. Advantageously, the autonomous driving mode may be available only during predetermined weather conditions. The weather condition may be a current weather condition, or an upcoming weather condition.

At least one of the one or more state signals may be indicative of an awareness of the user. Advantageously, the autonomous driving mode may be available only when the user is sufficiently aware to be able to resume control from the autonomous driving mode. Optionally, the host vehicle may be configured to perform a predefined manoeuvre in dependence on the awareness of the user.

The input means may be arranged to receive a frequency signal indicative of a frequency of previous activation of the autonomous driving mode of the host vehicle. The control means may be arranged to control the output means to output the availability signal in dependence on the frequency signal. Advantageously, users who less often use the autonomous driving mode may be less often made aware that the autonomous driving mode is available. Conversely, users who more often use the autonomous driving mode may be more often made aware that the autonomous driving mode is available. The frequency of previous activation of the autonomous driving mode of the host vehicle may be the frequency of activations of the autonomous driving mode when the option to initiate the autonomous driving mode has been made available to the user. Alternatively, the frequency of previous activation of the autonomous driving mode of the host vehicle may be the frequency of activations of the autonomous driving mode.

The control means may be arranged to determine the frequency signal as having a first value if a frequency of previous activation of the autonomous driving mode is greater than a first threshold; and the frequency signal as having a second value if a frequency of previous activation of the autonomous driving mode is lower than a second threshold. The first threshold may be the same as the second threshold.

According to an aspect of the invention, there is provided a system, comprising the controller of any preceding claim, arranged to output the availability signal, and notification means for receiving the availability signal and to indicate to a user that the autonomous driving mode is available in dependence on the received availability signal. Advantageously, the notification means indicates to the user that the autonomous driving mode is available.

The system as described above, wherein:
the notification means comprises a notification unit.

The notification means may be a display means. The display means may be a display panel. The display means may be an indicator light. Advantageously, the user may be made aware that the autonomous driving mode is available using display means.

Optionally, the notification means may be tactile output means (such as a tactile output unit for example a vibration motor), or a sound output means (such as a speaker).

The notification means may be arranged to receive the driving mode signal to cause the notification means to indicate to the user that the autonomous driving mode is to be initiated. Advantageously, the controller can control the notification means to indicate to the user that the autonomous driving mode is being initiated. The notification means to indicate to the user that the autonomous driving mode is to be initiated may be the same or different to the notification means to indicate to the user that the autonomous driving mode is available.

The notification means may be arranged to indicate to the user the progress through the transition phase. The notification means to indicate to the user the progress through the transition phase may be the same or different to the notification means to indicate to the user that the autonomous driving mode is available.

The system may comprise sensing means for determining at least one of the vehicle characteristic, the user characteristic or the environment characteristic. The system may comprise sensor output means for outputting the one or more state signals to the controller. The system may comprise sensor control means to control the sensor output means to output the one or more state signals to the controller in dependence on the at least one of the vehicle characteristic, the user characteristic and the environment characteristic determined by the sensing means. Advantageously, the system may provide the one or more state signals to the controller. The sensing means may be a sensing device. The sensor output means may be a sensor output unit. The sensor control means may comprise one or more control devices such as electronic processing devices. The sensor control means may be separate from the sensing means.

According to an aspect of the invention, there is provided a method comprising receiving one or more state signals each indicative of one or more of a vehicle characteristic, a user characteristic and an environment characteristic from an input means, determining the availability signal indicative of an availability of an autonomous driving mode of a vehicle in dependence on the one or more state signals, and controlling an output means with a control means to output the availability signal. Advantageously, the availability signal can be output when the autonomous driving mode is available, determined in dependence on the one or more state signals.

The method may comprise outputting a driving mode signal to cause the host vehicle to initiate the autonomous driving mode when the user requests initiation of the autonomous driving mode following receipt of the availability signal. Advantageously, the autonomous driving mode may be initiated following a request from the user.

The method may comprise determining whether to make the user aware that the autonomous driving mode is currently available in dependence on a frequency of previous activation of the autonomous driving mode of the host vehicle. Advantageously, the frequency of previous activation of the autonomous driving mode can be used to determine whether or not to output the availability signal.

The method may comprise modifying a vehicle movement controlled by the user during a transition phase of the autonomous driving mode in preparation for the end of the transition phase in which the vehicle movement is fully controlled by control means of the host vehicle. Advantageously, the autonomous driving mode can begin to take control of the host vehicle during the transition phase of the autonomous driving mode.

Fall-Back Signals

According to an aspect of the invention, there is provided a controller arranged to operably cause an output of a component control signal indicative of a control request to cause a component associated with a host vehicle to perform an action associated with a manoeuvre of the host vehicle in dependence on whether a keep-alive signal is received within a predetermined time period of a received fall-back signal. The component control signal is determined in dependence on the fall-back signal. The fall-back signal is indicative of the action to be performed by the component.

According to an aspect of the invention, there is provided a controller comprising output means for outputting a component control signal indicative of a control request to cause a component associated with a host vehicle to perform an action associated with a manoeuvre of the host vehicle, input means for receiving a fall-back signal indicative of an action to be performed by the component, the action associated with a manoeuvre of the host vehicle, and for receiving a keep-alive signal indicative of a continued operation of a communication link to the input means, and control means arranged to determine if a keep-alive signal is received by the input means within a predetermined period of time from a time of receipt of a fall-back signal by the input means, and arranged to control the output means to output the component control signal in dependence on the fall-back signal if the keep-alive signal is not determined to be received by the input means within the predetermined period of time. Advantageously, the fall-back signal can be used to determine instructions to send to a component of the host vehicle in the event a keep-alive signal is subsequently not received within the expected time. For example, should the system suffer from a network failure or a communication failure the host vehicle can be brought to a stop by the component control signal determined in dependence on the fall-back signal.

The controller as described above, wherein:
the input means comprises an electrical input for receiving the signal;
the output means comprises an electrical output for outputting the signal; and
the control means comprises one or more control devices such as electronic processing devices.

The predetermined period of time may be less than five seconds. The predetermined period of time may be less than one second. In some embodiments, the predetermined period of time may be less than half a second.

The fall-back signal may be indicative of one or more actions to be performed by the component over a duration of at least two seconds. The duration may be at least five seconds.

The component associated with the host vehicle may be a component for movement of the host vehicle. The component for movement may be a component for longitudinal motion of the host vehicle, such as a component for torque. The torque component may be a component for braking or a component for locomotion, such as a motor or engine. The component for movement may be a component for lateral motion of the host vehicle, such as a component for steering.

The fall-back signal may be indicative of a manoeuvre to be performed by the host vehicle. Therefore, in some embodiments, the action to be performed by the component may be determined by the controller in dependence on the manoeuvre to be performed by the host vehicle. In other embodiments, the action to be performed by the component may be determined by the component in dependence on the manoeuvre to be performed by the host vehicle. The fall-back signal may comprise an instruction for receipt by the component associated with the host vehicle to cause the component to perform the action.

The keep-alive signal may be a dedicated keep-alive signal. In some embodiments, the keep-alive signal may comprise at least a portion of the keep-alive signal used by the controller to determine something in addition to the continued operation of the communication link to the input means.

The input means may be arranged to receive a command signal indicative of a request for an action to be performed by the component. The control means may be arranged to control the output means to output the component control signal in dependence on the command signal. Advantageously, commands for the component may be received by the controller other than fall-back commands to be carried out only if the communication link is lost. The command signal may be indicative of a request for an action to be performed prior to or instead of the action indicated by the fall-back signal. In some embodiments, the command signal may be received with the fall-back signal.

The keep-alive signal may comprise the command signal. Advantageously, the request for the action to be performed by the component, indicated by the command signal may function as the keep-alive signal.

The input means may be arranged to receive a further fall-back signal indicative of a further action to be performed by the component instead of the action indicated by the previous fall-back signal. The keep-alive signal may comprise the further fall-back signal. Advantageously, the fall-back signal can be replaced by the further fall-back signal. The further fall-back signal may be indicative of an updated action to be performed by the component in the event of a failure in the communication link to the input means. The further fall-back signal can also function as the keep-alive signal.

The output means may be arranged to output a further component control signal to cause a further component associated with the host vehicle to perform an action associated with the manoeuvre of the host vehicle. The control means may be arranged to control the output means to output the further component control signal in dependence on the fall-back signal if the keep-alive signal is not determined to be received by the input means within the predetermined period of time. In some embodiments, the further component control signal is indicative of the manoeuvre of the host vehicle. Therefore, the further component will determine the action to be performed in dependence on the further component control signal. In other embodiments, the further component control signal is directly indicative of the action to be performed by the further component.

The input means may be arranged to receive the keep-alive signal over a first communication link. The output means may be arranged to output the component control signal over a second communication link, different from the first communication link. Advantageously, if the first communication link fails, the component control signal can still be sent to the component of the host vehicle over the second communication link. The first communication link may be a network communication link. The first communication link may be a direct wired connection. The second communication link may be a network communication link. The second communication link may be a direct wired connection. The second communication link may be a Controller Area Network (CAN). The first communication link may be a FlexRay network.

The control means may be arranged to generate a plurality of component control signals, each to cause the component to perform a different portion of the action indicated by the fall-back signal, in dependence on the fall-back signal and to control the output means to output each of the plurality of component control signals. Advantageously, the plurality of component control signals may allow the component to perform a multi-stage manoeuvre. For example, when the host vehicle is travelling in a lane of a navigable path, the manoeuvre may be to move the host vehicle out of the lane and subsequently to bring the host vehicle to a stop.

The action may be associated with a stopping manoeuvre of the host vehicle. Advantageously, the host vehicle can be stopped when the keep-alive signal is not received within the predetermined period of time. The stopping manoeuvre may be performed over a distance greater than a minimum stopping distance of the host vehicle. Advantageously, the host vehicle may be stopped in a distance to allow any further vehicles immediately following the host vehicle to take appropriate evasive action. In some embodiments, the stopping manoeuvre comprises a steering portion preceding a stopping portion of the manoeuvre. Therefore, the host vehicle can navigate out of a lane of a navigable path of the host vehicle before stopping.

According to an aspect of the invention, there is provided a system, comprising the controller described hereinbefore as a first controller, arranged to receive the fall-back signal, and to output the component control signal, and a second controller arranged to generate the fall-back signal. Advantageously, the second controller can generate the fall-back signal for use by the first controller.

The system may comprise input means for receiving one or more state signals each indicative of at least one of a vehicle characteristic, a user characteristic or an environment characteristic. The second controller may be arranged to generate the fall-back signal in dependence on the one or more state signals received from the input means. Advantageously, the fall-back signal may be determined based on at least one of one or more vehicle characteristics, one or more user characteristics and one or more environment characteristics. For example, the fall-back signal may be determined in dependence on a vehicle characteristic in the form of a current speed of the host vehicle and an environment characteristic in the form of a location of at least one further vehicle in the vicinity of the host vehicle.

The system as described above, wherein:
  the input means comprises an electrical input for receiving the signal.

The system may comprise component control means arranged to control the component associated with the host vehicle to perform the action associated with the manoeuvre of the host vehicle in dependence on the component control signal. Advantageously, the component control means can control the component in accordance with the instructions indicated by the component control signal.

The system as described above, wherein:
  the component control means comprises one or more control devices such as electronic processing devices.

The system may comprise further component control means arranged to control the further component associated with the host vehicle to perform the action associated with the manoeuvre of the host vehicle. The further component may be of a different type than the component. The further component may be of a same type as the movement component. Advantageously, the system may control multiple components of the host vehicle using the first controller.

The system as described above, wherein:
  the further component control means comprises one or more control devices such as electronic processing devices.

According to an aspect of the invention, there is provided a method comprising receiving a fall-back signal indicative of an action to be performed by a component, the action associated with a manoeuvre of a host vehicle, determining if a keep-alive signal is received within a predetermined period of time from a time of receipt of the fall-back signal, the keep-alive signal indicative of a continued operation of a communication link for receiving the keep-alive signal, and outputting a component control signal to cause the component associated with the host vehicle to perform the action associated with the manoeuvre of the host vehicle in dependence on the fall-back signal if the keep-alive signal is not received within the predetermined period of time. Advantageously, the method ensures a component of the host vehicle performs an action indicated by a fall-back signal in the event of failure of a communication link through which the keep-alive signal (or the fall-back signal) is received.

The method may comprise outputting a further component control signal to cause a further component associated with the host vehicle to perform an action associated with the manoeuvre of the host vehicle in dependence on the fall-back signal if the keep-alive signal is not received within the predetermined period of time. Advantageously, more than one component of the host vehicle can be given instructions to perform an action based on the fall-back signal if the keep-alive signal is not received within the predetermined period of time.

The method may comprise determining a plurality of component control signals, each to cause the component to perform a different portion of the action, in dependence on the fall-back signal, and outputting each of the plurality of component control signals. Advantageously, a multi-stage manoeuvre can be performed by the host vehicle by giving the component a plurality of different component control signals in the event that the keep-alive signal is not received within the predetermined period of time.

Speed Change Based on Speed of Vehicle in Another Lane

According to an aspect of the invention, there is provided a controller arranged to operably cause an output of a speed change signal to cause a speed of a host vehicle travelling in a first lane of a multi-lane navigable path to change towards a further vehicle speed of a further vehicle in a second lane of the multi-lane navigable path in dependence on a second speed signal indicative of the further vehicle speed. The speed change signal may be output in dependence on a first speed signal indicative of the host vehicle speed.

According to an aspect of the invention, there is provided a controller comprising input means for receiving a first speed signal indicative of a host vehicle speed of a host vehicle travelling in a first lane of a multi-lane navigable path, and a second speed signal indicative of a further vehicle speed of a further vehicle in a second lane of the multi-lane navigable path. The controller comprises output means for outputting a speed change signal to cause the host vehicle to control a speed of the host vehicle from the host vehicle speed towards the further vehicle speed. The controller comprises control means arranged to cause the output means to output the speed change signal in dependence on the second speed signal. Advantageously, the speed of one or more vehicles travelling in another lane to the host vehicle, such as the further vehicle, can be used to determine whether and/or how to change the speed of the host vehicle. The present invention is useful for use during lane change manoeuvres of the host vehicle.

The controller as described above, wherein:
  the input means comprises an electrical input for receiving the signal;
  the output means comprises an electrical output for outputting the signal; and the control means comprises one or more control devices such as electronic processing devices.

The second speed signal indicative of the further vehicle speed may be indicative of a relative speed of the further vehicle relative to the host vehicle. In this situation, it will be understood that the speed change signal may be output in dependence on the relative speed between the further vehicle and the host vehicle. The second speed signal may be indicative of an absolute speed of the further vehicle relative to the navigable path. The control means may be arranged to determine the speed change signal in dependence on the second speed signal. Advantageously, the speed change signal may be determined in dependence on the relative speed between the further vehicle and the host vehicle. The control means may be arranged to determine the speed change signal in dependence on the first speed signal and the second speed signal.

The speed change signal may be to cause the host vehicle to decelerate. In some embodiments, the controller may be used in situations where the further vehicle in the second lane is travelling more slowly than the host vehicle, and the host vehicle needs to decelerate prior to changing lanes. In this case, the speed change signal may be to cause the host vehicle to decelerate the speed of the host vehicle towards the further vehicle speed of the further vehicle. In an alternative embodiment, the further vehicle may be travelling more quickly than the host vehicle. In some examples, the host vehicle may need to first decelerate to increase a gap between the host vehicle and another vehicle travelling in front of the host vehicle in the first lane. The increased gap can be used to allow the host vehicle sufficient space in the first lane to accelerate towards the further vehicle speed of the further vehicle before the host vehicle moves from the first lane to the second lane. It will be understood that in some embodiments, the speed change signal may be to cause the host vehicle to accelerate.

The input means may be arranged to receive a space availability signal indicative of a presence of a space in front of or behind the further vehicle of a size sufficient to accommodate the host vehicle. The control means may be arranged to cause the output means to output the speed change signal in dependence on the space availability signal. Advantageously, the presence of a space into which the host vehicle could fit can be used to determine whether or not to change the speed of the host vehicle. In some embodiments, the control means may be arranged to cause the output means to output the speed change signal if the space availability signal is indicative of the presence of the space in front of or behind the further vehicle of the size sufficient to accommodate the host vehicle.

The control means may be arranged to determine the size of the space in dependence on the first speed signal, the second speed signal and the space availability signal. The control means may be arranged to cause the output means to output the speed change signal in dependence on the size of the space and the second speed signal. Advantageously, speed of the host vehicle and the speed of the further vehicle can be considered when deciding on the size of space which is sufficient to accommodate the host vehicle. For example, only a space having a size above a size threshold may be considered of sufficient size where either of the host vehicle or the further vehicle is travelling at a speed above a predetermined threshold.

The space may be a current space. The space may be an expected space. In other words, the control means may be arranged to determine if the expected space will have a size sufficient to accommodate the host vehicle at a predetermined time in the future. Advantageously, the host vehicle may start a speed change in advance of the space being of sufficient size if it is determined that the expected space will have a sufficient size at the predetermined time in the future. The predetermined time in the future may be less than 10 seconds in the future. The predetermined time in the future may be less than 5 seconds. The control means may be arranged to determine if the expected space will have a sufficient size in dependence on the second speed signal, indicative of the further vehicle speed of one or more further vehicles in the second lane, the first speed signal, and one or more host vehicle characteristics, such as host vehicle torque.

The speed change signal may be to cause the host vehicle to control the speed of the host vehicle towards the further vehicle speed in the first lane. Advantageously, the speed of the host vehicle can be changed before the host vehicle moves out of the first lane. Therefore, the host vehicle may be travelling at a speed closer to the further vehicle speed than the host vehicle speed when the host vehicle enters the second lane.

The second speed signal may be indicative of an average speed of a plurality of further vehicles in the second lane. Advantageously, the speed of a plurality of further vehicles in the second lane may be used as part of determining the speed control signal. The control means may be arranged to determine the average speed of the plurality of further vehicles in the second lane in dependence on the second speed signal.

The control means may be arranged to determine if the second speed signal is indicative of the further vehicle speed being different to the host vehicle speed. The control means may be arranged to cause the output means to output the speed change signal in dependence on if the second speed signal is indicative of the further vehicle speed being different to the host vehicle speed by more than a predetermined threshold. Advantageously, the speed change signal may not be output if the further vehicle speed is not sufficiently different to the host vehicle speed, preventing unnecessary manoeuvres of the host vehicle. In some embodiments, the control means may be arranged to determine is the second speed signal is indicative of the further vehicle speed being greater than the host vehicle speed. Therefore, the controller may be configured to output the speed change signal if vehicles in the second lane are moving faster than the first lane.

The speed change signal may be to cause the host vehicle to move from the first lane to the second lane at a speed different from the host vehicle speed. Advantageously, the host vehicle may start changing speeds away from the host vehicle speed before moving out of the first lane towards the second lane.

The input means may be for receiving a request signal indicative of a request by a user of the host vehicle to move the host vehicle into the second lane. The control means may be arranged to cause the output means to output the speed change signal in dependence on the request signal. Advantageously, the speed change signal may be output following a request by the user. The request by the user may be an indicator input. The request by the user may be a request directed externally to the host vehicle to allow the host vehicle to move into the second lane. The request by the user may be a request to the host vehicle for the host vehicle to move into the second lane.

In some embodiments, the user may be substantially in control of a steering of the host vehicle even after the speed change signal is output by the controller. In some embodiments, the user may be substantially in control of a steering of the host vehicle during receipt of the request by the user of the host vehicle to move the host vehicle into the second lane.

The output means may be for outputting a notification signal to cause a notification means of the host vehicle to indicate that the host vehicle will move into the second lane. The control means may be arranged to control the output means to output the notification signal in dependence on the second speed signal. Advantageously, the notification signal can be used to indicate, for example to the user, that the host vehicle will move into the second lane if the further vehicle speed of the further vehicle satisfies conditions in the control means of the controller for the host vehicle moving from the first lane to the second lane. The notification means may be a display means, an audio output means or a tactile output means. The display means may be an indicator light or an electronic display. The audio output means may be a speaker. The tactile output means may be a tactile output device.

According to an aspect of the invention, there is provided a system, comprising the controller described hereinbefore, arranged to output the speed change signal, a sensing means for detecting the further vehicle speed of the further vehicle and arranged to output the second speed signal to the controller in dependence thereon, and actuator means for receiving the speed change signal and to cause the host vehicle to change speeds from the host vehicle speed towards the further vehicle speed. Advantageously, the system determines whether to change speeds from the host vehicle speed towards the further vehicle speed based on the further vehicle speed.

The system as described above, wherein:
the sensing means comprises a sensor; and
the actuator means comprises an actuator.

The sensing means may comprise an optical sensor. The sensing means may comprise a radar sensor. The sensing means may comprise a laser sensor. The sensing means may comprise an ultrasound sensor. The sensing means may be arranged to detect a doppler shift in an emitted signal.

The actuator means may be a torque control actuator for controlling a torque of the host vehicle. The torque control actuator may be a brake control actuator. The torque control actuator may be an acceleration control actuator.

The system may be configured to be operating in an autonomous driving mode when the controller outputs the speed change signal. Advantageously, the system will control at least one of a steering control or a torque control of the host vehicle when the controller outputs the speed change signal. In some embodiments, the system will control the steering control and the torque control of the host vehicle in the autonomous driving mode when the controller outputs the speed change signal.

The system may further comprise an indicator switch for receiving the request from the user of the host vehicle to move from the first lane to the second lane, and outputting the request signal to the controller in dependence thereon.

Advantageously, the user may operate the indicator switch of the host vehicle to request that the host vehicle moves from the first lane to the second lane. In some embodiments, the operation of the indicator switch is arranged to cause an operation of indicator means of the host vehicle.

The system may comprise the notification means for receiving the notification signal and to indicate that the host vehicle will move into the second lane in dependence on the notification signal. Advantageously, the notification means can indicate, for example to the user of the host vehicle, that the host vehicle will move from the first lane to the second lane.

The notification means may be an indicator light. The indicator light may be an external indicator light for indicating to one or more further vehicles in the vicinity of the host vehicle that the host vehicle will move into the second lane.

According to an aspect of the invention, there is provided a method comprising receiving, at a host vehicle travelling at a host vehicle speed in a first lane of a multi-lane navigable path, a further vehicle speed of a further vehicle in a second lane of the multi-lane navigable path, and changing a speed of the host vehicle from the host vehicle speed towards the further vehicle speed in dependence on the further vehicle speed. Advantageously, the speed of the host vehicle in a first lane can be changed based on the speed of the further vehicle in a second lane.

The second lane may be adjacent the first lane. The second lane may be an outside lane relative to the first lane. The second lane may be an inside lane relative to the first lane.

The further vehicle speed may be received of an electronic controller of the host vehicle. The speed of the host vehicle may be changed from the host vehicle speed towards the further vehicle speed autonomously by an electronic controller of the host vehicle.

The speed of the host vehicle may be changed from the host vehicle speed towards the further vehicle speed in dependence on whether the further vehicle speed is different to the host vehicle speed. The speed of the host vehicle may be changed from the host vehicle speed towards the further vehicle speed in dependence on whether the further vehicle speed is different to the host vehicle speed by at least a predetermined threshold.

In some embodiments, the further vehicle speed may be a relative speed of the further vehicle to the host vehicle speed of the host vehicle. The method may comprise receiving the host vehicle speed of the host vehicle. The speed of the host vehicle may be changed in dependence on the host vehicle speed and the further vehicle speed.

The method may comprise receiving a request by a user of the host vehicle to move the host vehicle into the second lane. The speed of the host vehicle may be changed from the host vehicle speed towards the further vehicle speed in dependence on the request by the user of the host vehicle to move the host vehicle into the second lane.

The method may comprise indicating that the host vehicle will move into the second lane. The method may comprise indicating to the user of the host vehicle that the host vehicle will move into the second lane.

The method may comprise receiving an indication of a presence of a space in front of or behind the further vehicle, the space having a size sufficient to accommodate the host vehicle. The speed of the host vehicle may be changed in dependence on receiving the indication of the presence of the space in front of or behind the further vehicle. Advantageously, the method may change the speed of the host vehicle when a space of sufficient size has been identified. In some embodiments, the method may comprise receiving an indication of a presence of a space between a spaced two of a plurality of further vehicles in the second lane.

The method may comprise determining if the size of the space is sufficient to accommodate the host vehicle in dependence on the host vehicle speed and the further vehicle speed. The speed of the host vehicle may be changed from the host vehicle speed towards the further vehicle speed in dependence on whether the size of the space is determined to be sufficient to accommodate the host vehicle.

The host vehicle and the further vehicle may be travelling in the same direction. Advantageously, the method may be a method to aid merging the host vehicle in the first lane with traffic in the second lane.

Dual Request Signals to Transition Out of Autonomous Driving Mode

According to an aspect of the invention, there is provided a controller, comprising input means for receiving a first request signal indicative of a first request from a user to transition from a first driving mode to a second driving mode of a host vehicle and for receiving a second request signal indicative of a second request from the user to transition from the first driving mode to the second driving mode, output means for outputting a first transition signal to cause the host vehicle to transition from the first driving mode to the second driving mode, and control means arranged to cause the output means to output the first transition signal in dependence on the first request signal and the second request signal. One of the first driving mode and the second driving mode may be an autonomous driving mode. The other of the first driving mode and the second driving mode may be a manual driving mode in which the user controls at least one of a steering and a torque of the host vehicle.

According to an aspect of the invention, there is provided a controller, comprising input means for receiving a first request signal indicative of a first request from a user to transition out of an autonomous driving mode of a host vehicle and for receiving a second request signal indicative of a second request from the user to transition out of the autonomous driving mode, output means for outputting a first transition signal to cause the host vehicle to transition out of the autonomous driving mode, and control means arranged to cause the output means to output the first transition signal in dependence on the first request signal and the second request signal. Advantageously, two user requests may be required for the host vehicle to transition out of the autonomous driving mode, which can reduce accidental transitions out of the autonomous driving mode.

The controller as described above, wherein:
the input means comprises an electrical input for receiving the signal;
the output means comprises an electrical output for outputting the signal; and
the control means comprises one or more control devices such as electronic processing devices.

The control means may be arranged to determine if the first request signal is indicative of the first request from the user to transition out of the autonomous driving mode. The control means may be arranged to cause the output means to output the first transition signal in dependence on the determination that the first request signal is indicative of the first request from the user to transition out of the autonomous driving mode. The control means may be arranged to determine if the second request signal is indicative of the second request from the user to transition out of the autonomous driving mode. The control means may be arranged to cause the output means to output the first transition signal in dependence on the determination that the second request signal is indicative of the second request from the user to transition out of the autonomous driving mode.

It will be understood that the first request and the second request are both conscious, deliberate or intentional requests by the user. In other words, the user performs a conscious, deliberate or intentional action in order to make each of the first request and the second request.

The input means may be for receiving a further request signal indicative of a further request from the user to transition out of the autonomous driving mode. In other words, the user may have made three requests to transition out of the autonomous driving mode. The output means may be for outputting a second transition signal to cause the host vehicle to transition from the autonomous driving mode to a further driving mode in a shorter period of time than with the first transition signal. The control means may be arranged to cause the output means to output the second transition signal in dependence on the further request signal and a determination that the first request signal is indicative of the first request from the user to transition out of the autonomous driving mode and that the second request signal is indicative of the second request from the user to transition out of the autonomous driving mode. Advantageously, the host vehicle can transition out of the autonomous driving mode more quickly in response to the further request from the user than in response to the first request and second request from the user. This may be useful where the user needs to take over quickly control of the host vehicle. The further driving mode may be a manual driving mode in which the user controls at least one of a steering and a torque of the host vehicle. The first transition signal may be to cause the host vehicle to transition from the autonomous driving mode to the manual driving mode. The second transition signal may be to cause the host vehicle to transition from the autonomous driving mode to the further driving mode in less than three seconds. The second transition signal may be to cause the host vehicle to transition from the autonomous driving mode to the further driving mode in less than one second.

The further request from the user to transition out of the autonomous driving mode may comprise a vehicle movement request. The further request from the user to transition out of the autonomous driving mode may comprise a lateral movement request in the form of a steering request. The further request from the user to transition out of the autonomous driving mode may comprise a longitudinal movement request in the form of a torque request. The torque request may comprise a braking request. The torque request may comprise an acceleration request. Advantageously, the further request may be an override request to quickly transition the host vehicle out of the autonomous driving mode.

The control means may be arranged to determine if the first request signal is indicative of the first request from the user having a duration of at least a predetermined first threshold, and to cause the output means to output the first transition signal in dependence thereon. Advantageously, the host vehicle can transition out of the autonomous driving mode if the first request is maintained from the predetermined first threshold. The predetermined first threshold may be at least three seconds.

The control means may be arranged to determine if the second request signal is indicative of the second request from the user having a duration of at least a predetermined second threshold, and to cause the output means to output the first transition signal in dependence thereon. Advantageously, the host vehicle can transition out of the autonomous driving mode if the first request is maintained from the predetermined first threshold and if the second request is maintained for the predetermined second threshold. The predetermined second threshold may be at least three seconds.

The control means may be arranged to determine if the first request signal and the second request signal are received concurrently, and to cause the output means to output the first transition signal in dependence thereon. Advantageously, the host vehicle can transition out of the autonomous driving mode if the first request and the second request overlap. In other words, the user must be making the first request and the second request at the same time for the host vehicle to transition out of the autonomous driving mode. The control means may be arranged to determine that the first request signal and the second request signal are received concurrently if the first request signal and the second request signal are received within a predetermined concurrency threshold. The predetermined concurrency threshold may be less than five seconds.

According to an aspect of the invention, there is provided a steering wheel rotatable by one or more hands of the user to steer the host vehicle in a manual driving mode. The steering wheel comprises a first input apparatus and a second input apparatus positioned on the steering wheel and each operable separately by the one or more hands of the user. The first input apparatus and the second input apparatus may each be for receiving a request from the user to transition out of an autonomous driving mode of the host vehicle. The first input apparatus and the second input apparatus may each comprise indicia to indicate to the user that operation thereof will transition the host vehicle out of the autonomous driving mode of the host vehicle.

According to an aspect of the invention, there is provided a system, comprising the controller of any preceding claim, arranged to output the first transition signal, and an input apparatus, operable by the user to output the first request signal to the input means of the controller, and operable separately by the user to output the second request signal to the input means of the controller. Advantageously, the system requires two inputs by the user to transition the host vehicle out of the autonomous driving mode.

The input apparatus may be arranged to be provided at a steering-control of the host vehicle. Advantageously, the input apparatus can be operated by a user in a position in which the user is also prepared to operate the steering-control of the host vehicle. The steering-control may be a steering wheel. The input apparatus may comprise a first input apparatus, operable by the user to output the first request signal and a second input apparatus, operable by the user to output the second request signal. Therefore, the two requests by the user may be made on different input apparatus. Both the first input apparatus and the second input apparatus may be arranged to be associated with the steering-control of the host vehicle. Therefore, the user is prepared to operate the steering-control of the host vehicle when in the position to operate the first input apparatus and the second input apparatus. Furthermore, the first input apparatus and the second input apparatus are located so as to be easily reachable by the user of the host vehicle. Yet further, the input apparatus is positioned so as to be substantially difficult to operate to provide the first request signal and the second request signal by an occupant of the host vehicle other than the user. The advantage above is generally enhanced where the input apparatus comprises the first input apparatus and the second input apparatus.

The first input apparatus may be a first input device. The second input apparatus may be a second input device. The first input device and the second input device may each be a capacitive input device. The first input device and the second input device may each be a button switch. The first input device and the second input device may each be a push-button switch.

The first input apparatus may be separate from the second input apparatus.

The input apparatus may be operable by a first hand of the user to output the first request signal and operable by a second hand of the user to output the second request signal. Advantageously, the hands to be used by the user to operate the steering-control of the host vehicle when the host vehicle has transitioned out of the autonomous driving mode can be used to operate the input apparatus.

The input apparatus may be operable by the hands of the user when the hands of the user are on the steering-control of the host vehicle. Advantageously, the hands may already be positioned in a suitable position to operate the steering-control of the host vehicle when the user operates the input apparatus to output the first request signal and the second request signal. Where the steering-control is a steering wheel, the input apparatus may be operable by the hands of the user when the hands are located in a preferred operation position on the steering wheel. The preferred operation position on the steering wheel may be generally referred to as the 10 and 2 driving position. The input apparatus may be operable by the thumb of the first hand of the user when the first hand is on the steering-control to output the first request signal. The input apparatus may be operable by the thumb of the second hand of the user when the second hand is on the steering-control to output the second request signal. Advantageously, the operation of the input apparatus need not require release of any fingers of the hands around the steering-control. The input apparatus may be arranged in a central portion of the steering-control, away from a rim portion of the steering-control. Advantageously, the provision of the input apparatus in the central portion of the steering-control ensures the rim portion of the steering-control need not be cluttered with the input apparatus.

According to an aspect of the invention, there is provided a method comprising receiving a first request from a user to transition out of an autonomous driving mode of a host vehicle, receiving a second request from the user to transition out of the autonomous driving mode, different from the first request, and outputting a first transition request to cause the host vehicle to transition out of the autonomous driving mode in dependence on the first request and the second request. Advantageously, the user must make the first request and the second request to transition the host vehicle out of the autonomous driving mode. Further, accidental transition out of the autonomous driving mode can be reduced.

The method may comprise receiving a further request from the user to transition out of the autonomous driving mode. The method may comprise outputting a second transition request in dependence on the further request. The second transition request may be to cause the host vehicle to transition out of the autonomous driving mode in a shorter period of time than with the first transition request. Advantageously, the user may be able to transition out of the autonomous driving mode via a separate request where this is urgent. For example, the further request may be in the form of a movement control request, such as a steering request or a torque request.

The method may comprise transitioning out of the autonomous driving mode.

The method may comprise determining if at least one of the first request and the second request have a duration of at least a predetermined threshold. The first transition request may be output in dependence on determining if at least one of the first request and the second request have the duration of at least the predetermined threshold. Advantageously, the first request and the second request will only transition the host vehicle out of the autonomous driving mode when maintained for a sufficient time. The duration may be at least three seconds.

The method may comprise determining if the first request and the second request are received concurrently. The transition signal may be output in dependence on determining if the first request and the second request are received concurrently. Advantageously, the first request and the second request will only transition the host vehicle out of the autonomous driving mode when both received together.

Secondary Confirmation of Deactivation of Autonomous Driving Mode

According to an aspect of the invention, there is provided a controller arranged to operably cause an output of a transition signal to cause a host vehicle to transition out of an autonomous driving mode in dependence on a request signal and a capability signal. The request signal is indicative of a request from a user to transition out of the autonomous driving mode. The capability signal is indicative of a capability of the user to take control of the host vehicle after the host vehicle has transitioned out of the autonomous driving mode.

According to an aspect of the invention, there is provided a controller comprising input means for receiving a request signal indicative of a request from a user to transition out of an autonomous driving mode of a host vehicle and for receiving a capability signal indicative of a capability of the user to take control of the host vehicle after the host vehicle has transitioned out of the autonomous driving mode, output means for outputting a transition signal to cause the host vehicle to transition out of the autonomous driving mode, and control means arranged to cause the output means to output the transition signal in dependence on the request signal and the capability signal. Advantageously, the controller can be configured to transition the host vehicle out of the autonomous driving mode if the user requests the transition and if the user satisfies a capability criterion for being capable of taking control of the host vehicle after the host vehicle has transitioned out of the autonomous driving mode. The transition signal may be to cause the host vehicle to transition to a manual driving mode in which at least one of a steering control and a torque control of the host vehicle is to be performed by the user.

The controller as described above, wherein:
the input means comprises an electrical input for receiving the signal;
the output means comprises an electrical output for outputting the signal; and
the control means comprises one or more control devices such as electronic processing devices.

The control means may be arranged to determine the capability of the user to take control of the host vehicle in dependence on the capability signal. Advantageously, the controller determines whether the user is capable of taking control of the host vehicle. The control means may be arranged to determine that the user is requesting to transition out of the autonomous driving mode in dependence on the request signal. The control means may be arranged to cause the output means to output the transition signal if the user is determined to be requesting to transition out of the autonomous driving mode. The control means may be arranged to cause the output means to output the transition signal if the user is determined to be capable to take control of the host vehicle.

The capability signal may be indicative of an awareness level of the user. Advantageously, the user may be determined to be capable to take control of the host vehicle if the awareness level is above a predetermined awareness threshold. The awareness level may be a numerical scale between 0 and 10, with 0 being not aware at all, such as in a sleep state, and 10 being fully aware, such as in a fully alert state.

The capability signal may be indicative of an action or state of the user different to the request of the user to transition the host vehicle out of the autonomous driving mode. Therefore, there is an additional check by the controller beyond the request by the user to transition the host vehicle out of the autonomous driving mode.

The capability signal may be indicative of a gaze state of the user. Advantageously, in some embodiments, the capability signal may be indicative of a passive determination that the user is capable to take control of the host vehicle. The gaze state of the user may comprise a blink characteristic. In some embodiments, the user may be determined to be capable to take control of the host vehicle if the user is blinking less than a predetermined blink threshold. The gaze state of the user may comprise a pupil characteristic. The gaze state of the user may comprise a gaze direction. In some embodiments, the user may be determined to be capable to take control of the host vehicle if the gaze direction is directed towards a predetermined acceptable gaze direction, such as out of a front of the host vehicle.

The capability signal may be indicative of one or more images of an eye of the user. The control means may be arranged to determine the capability of the user to take control of the host vehicle in dependence on the blink characteristic of the eye of the user. The blink characteristic could be a number of blinks of the eye in a predetermined time, such as blinks per minute. The blink characteristic could be a proportion of time in which the eye is blinking over a predetermined period of time.

The capability signal may be indicative of a position of the user.

The capability signal may be indicative of a physiological characteristic of the user, such as a heart rate or state of health. The capability signal may be indicative of a legal qualification of the user, such as a driving license allowing operation of the host vehicle out of the autonomous driving mode.

The capability signal may be different to a control signal indicative of a control attempt by the user to control a component for movement of the host vehicle to perform a requested action.

The request signal may be indicative of an input by the user to an input apparatus to request transition out of the autonomous driving mode. The input apparatus may be at a steering-control such as a steering wheel of the host vehicle. The input may be a tactile input such as a button press.

According to an aspect of the invention, there is provided a system comprising the controller of any preceding claim, arranged to output the transition signal, a first sensing means responsive to the request from the user to transition out of the autonomous driving mode of the host vehicle and to output the request signal to the controller, and a second sensing means responsive to the capability of the user to take control of the host vehicle after the host vehicle has transitioned out of the autonomous driving mode and to output the capability signal to the controller. Advantageously, the first and second sensing means can together detect the request from the user and the capability of the user. The system is arranged to cause the host vehicle to transition out of the autonomous driving mode in response to both the request from the user and the determined capability of the user to take control of the host vehicle.

The system as described above, wherein:
the first sensing means comprises a first sensor; and
the second sensing means comprises a second sensor.

The first sensing means may comprise an input device, operable by a hand of the user. Advantageously, the request from the user can be made by one or more hands of the user.

The second sensing means may be different to the first sensing means. In some embodiments, the first sensing means and the second sensing means may be the same sensing means, arranged to be responsive to both the request and to determine that the user is capable to take control of the host vehicle.

The input device may be arranged to be provided at a steering wheel of the host vehicle. Advantageously, the request from the user may be received when the user's hands are on the steering wheel of the host vehicle, demonstrating a possible capability of the user to take control of the host vehicle. The input device may be arranged on the steering wheel. The input device may be arranged in a central portion of the steering wheel, the central portion within a rim portion of the steering wheel.

The input device may comprise two buttons. Each button may be arranged to be engaged by a different hand of the user. Advantageously, the request can be made by operation of both buttons, making it possible that both hands are on the steering wheel.

The second sensing means may comprise a touch sensor arranged to detect a presence of a hand of a user on a steering wheel of the host vehicle. Advantageously, the presence of the hand of the user on the steering wheel may be representative of the capability of the user to take control of the host vehicle. The or a further touch sensor of the second sensing means may be arranged to detect the presence of a further hand of the user on the steering wheel. The touch sensor may be a capacitive touch sensor. The touch sensor may be a resistive touch sensor.

The second sensing means may comprise a physiological sensor arranged to capture data indicative of a current awareness of the user. Thus, a physiological parameter of the user may be analysed to determine whether the user is capable of taking control of the host vehicle. The physiological sensor may be a heart rate sensor. The physiological sensor may comprise a camera. The camera may be arranged to capture one or more images of an eye of the user. Advantageously, characteristics of the eye, such as a blink characteristic or a gaze characteristic can be used to determine an awareness of the user. The camera may be an infrared camera. Advantageously, an infrared camera may be able to observe the eye of the user through at least some sunglasses.

The second sensing means may comprise a plurality of sensors. The second sensing means may comprise a plurality of different sensors, for example a physiological sensor and a touch sensor.

According to an aspect of the invention, there is provided a method comprising receiving a request from a user to transition out of an autonomous driving mode of a host vehicle, receiving a capability of the user to take control of the host vehicle after the host vehicle has transitioned out of the autonomous driving mode, and transitioning the host vehicle out of the autonomous driving mode in dependence on the request and the capability. Advantageously, the host vehicle can transition out of the autonomous driving mode if a request is received from the user and if the user is capable of taking control of the host vehicle.

The request by the user to transition out of the autonomous driving mode may be determined substantially as described in any way hereinbefore.

Handover from Autonomous Driving Mode—Hand on Wheel

According to an aspect of the invention, there is provided a controller arranged to operably cause an output of a user readiness signal indicative of contact of a user on a steering wheel of a host vehicle in dependence on a feedback signal. The feedback signal may be indicative of a resistance experienced by the steering wheel of the host vehicle in response to a force for moving the steering wheel applied to the steering wheel.

According to an aspect of the invention, there is provided a controller, comprising input means for receiving a feedback signal indicative of a resistance experienced by a steering wheel of a host vehicle in response to a force for moving the steering wheel applied to the steering wheel, output means for outputting a user readiness signal indicative of a presence of a hand of a user on the steering wheel, and control means arranged to cause the output means to output the user readiness signal in dependence on the feedback signal. Advantageously, the resistance to movement created by the presence of the hand of the user on the steering wheel can be used to determine that the user's hand is present on the steering wheel. This ensures that the user is ready to take control of the host vehicle when the host vehicle transitions out of the autonomous driving mode to a manual driving mode in which the steering of the host vehicle is controlled by the user. In some examples, there may be a distinction in the resistance experienced by the steering wheel for a hand holding the steering wheel and a hand merely contacting the steering wheel, but without holding the steering wheel. In some examples, there may be a distinction in the resistance experienced by the steering wheel for two hands on the steering wheel and one hand on the steering wheel. Such distinctions may be used to output the user readiness signal if the hand is holding the steering wheel or if both hands are on the steering wheel.

The controller as described above, wherein:
the input means comprises an electrical input for receiving the signal;
the output means comprises an electrical output for outputting the signal; and
the control means comprises one or more control devices such as electronic processing devices.

The output means may be arranged to output a steering wheel movement control signal to cause the steering wheel of the host vehicle to attempt to move. The control means may be arranged to cause the output means to output the steering wheel movement control signal. Advantageously, the steering wheel may be caused to move specifically for the purpose of determining whether the hand of the user is on the steering wheel. The control means may be arranged to cause the output means to output the steering wheel movement control signal before the feedback signal is to be received by the input means.

The steering wheel movement control signal may be configured to cause the steering wheel to attempt to perform a rotational movement. Advantageously, the steering wheel is already permitted to move rotationally in normal operation. The rotational movement may be about an axis of rotation of the steering wheel in normal operation of the steering wheel when controlling the steering of the host vehicle. The steering wheel movement control signal may be configured to cause the steering wheel to move.

The steering wheel movement control signal may be configured to cause the steering wheel to apply a predetermined torque. Advantageously, the steering wheel can control the torque to be applied to the hand. The predetermined torque may be below a predetermined threshold below which, if a hand is on the steering wheel, the steering wheel will remain substantially stationary in response to the steering wheel movement control signal.

The steering wheel movement control signal may be configured to cause the steering wheel to attempt to perform a first movement in a first direction and a second movement in a second direction, opposite the first direction. Advantageously, a resulting position of the steering wheel may be substantially unchanged where the first movement and the second movement are opposite and equal. The first direction and the second direction may each be rotational directions.

The steering wheel movement control signal may be configured to cause the steering wheel to attempt to move away from a first position and to return to the first position. Advantageously, a resulting position of the steering wheel may be substantially unchanged.

The force may be such as to cause the steering wheel to attempt to move an amount substantially imperceptible to the user. Advantageously, the user may not be distracted or even notice that a detection of the presence of the hand on the steering wheel is being performed. For example, the amount may be less than 5 millimetres at the portion to be contacted with the hand. The amount may be less than 2 millimetres. The amount may be less than 1 millimetre. The amount may be less than 2 degrees. The amount may be less than 1 degree.

The steering wheel movement control signal may be configured to attempt to apply a rotational movement of up to a predetermined amount, to cause a substantially imperceptible change to a direction of travel of the host vehicle. Advantageously, the detection of the presence of the hand of the user on the steering wheel may not alter a course of the host vehicle. The resulting change in the direction of travel of the host vehicle may be less than 5 degrees. The resulting change in the direction of travel of the host vehicle may be less than 2 degrees. The resulting change in the direction of travel of the host vehicle may be less than 1 degree.

The steering wheel movement control signal may be solely for use to determine the presence of the hand of the user on the steering wheel. The movement of the steering wheel as a result of the steering wheel movement control signal may be arranged to be decoupled from the steering column of the host vehicle, whereby to cause no change in the direction of travel of the host vehicle.

The steering wheel movement control signal may be configured to cause the steering wheel to attempt to move by up to a predetermined amount. The predetermined amount may be less than 2 degrees. The predetermined amount may be less than 1 degree.

The input means may be arranged to receive a detection signal indicative of a further detection of contact with the user on the steering wheel. The control means may be arranged to cause the output means to output the user readiness signal in dependence on the feedback signal and the detection signal. Advantageously, the detection of the hand of the user on the steering wheel may be determined using more than one method. The further detection of contact with the user on the steering wheel may be contact of at least one of the hand, a further hand and a further limb of the user.

The control means may be arranged to determine if the feedback signal is indicative of the resistance experienced by the steering wheel being greater than a predetermined resistance threshold, and to output the user readiness signal if the feedback signal is indicative of the resistance experienced by the steering wheel being greater than a predetermined resistance threshold. Advantageously, the predetermined resistance threshold can be set at a level to indicate presence of the hand of the user.

The user readiness signal may be to cause the host vehicle to transition out of the autonomous driving mode of the host vehicle. Advantageously, the host vehicle can transition out of the autonomous driving mode if the hand of the user is determined to be on the steering wheel.

According to an aspect of the invention, there is provided a system comprising the controller of any preceding claim as a first controller, arranged to output the user readiness signal, a second controller in data communication with the first controller and comprising second controller output means for outputting a mode change signal to cause the host vehicle to transition out of an autonomous driving mode, and second controller control means arranged to cause the second controller output means to output the mode change signal in dependence on the user readiness signal. Advantageously, the system may be arranged to cause the host vehicle to transition out of the autonomous driving mode in dependence on the presence of the hand of the user on the steering wheel.

The system may comprise actuator means for receiving the steering wheel movement control signal and to apply the force to the steering wheel in dependence on the steering wheel movement control signal.

The system may comprise a touch sensor to be provided at the steering wheel and arranged to output the detection signal in response to the further detection of contact with the user on the steering wheel. Advantageously, the presence of the hand of the user on the steering wheel may be confirmed by the detection signal. The touch sensor may be a capacitive touch sensor. Advantageously, the use of the force for moving the steering wheel can detect the presence of the hand of the user on the steering wheel even when the method used for the touch sensor would not detect the presence of the hand of the user, for example if the user is wearing non-conductive gloves and the touch sensor is a capacitive touch sensor.

The system may comprise input means for receiving a steering signal indicative of a path change request in the autonomous driving mode. The system may comprise actuator means to cause the host vehicle to steer in accordance with a steering instruction. The second controller control means may be arranged to determine a steering instruction in dependence on the steering wheel movement control signal. The steering wheel movement control signal may be configured to cause the steering wheel to attempt to move by more than an amount necessary in dependence on the steering signal alone. Advantageously, the steering wheel may be arranged to move in the autonomous driving mode. The presence of the hand of the user may be detected without changing an operation of the autonomous driving mode.

According to an aspect of the invention, there is provided a method comprising receiving a feedback signal indicative of a resistance experienced by a steering wheel of a host vehicle in response to a force for moving the steering wheel applied to the steering wheel, generating a user readiness signal indicative of a presence of a hand of a user on the steering wheel in dependence on the feedback signal, and outputting the user readiness signal.

The method may comprise outputting a steering wheel movement control signal to cause the steering wheel of the host vehicle to attempt to move. Advantageously, the force for moving the steering wheel can be caused by the steering wheel movement control signal.

The method may comprise determining the user readiness signal if the resistance experienced by the steering wheel of the host vehicle in response to the force being applied to the steering wheel is greater than a predetermined resistance threshold. Advantageously, the hand of the user can be determined to be on the steering wheel if the resistance experienced by the steering wheel is greater than the predetermined resistance threshold. The predetermined resistance threshold may be a force threshold. The predetermined resistance threshold may be a torque threshold.

The method may comprise receiving a detection signal indicative of a further detection of contact with the user on the steering wheel and determining the user readiness signal in dependence on the feedback signal and the detection signal. Advantageously two different detections of the hand of the user may be used to determine that the user is ready to take control of the host vehicle.

The method may comprise transitioning the host vehicle out of the autonomous driving mode of the host vehicle in dependence on the user readiness signal.

Detection of Obstacles in Road

According to an aspect of the invention, there is provided a controller arranged to operably cause an output of a first transition signal to cause a host vehicle to transition from an autonomous driving mode to a first further driving mode or a second transition signal to cause the host vehicle to transition from the autonomous driving mode to a second further driving mode in dependence on a detection signal indicative of detection of a first feature associated with a navigable path of the host vehicle. The detection signal may be indicative of one or both of a travel time or a travel distance from the host vehicle to the first feature.

According to an aspect of the invention, there is provided a controller, comprising input means for receiving a detection signal indicative of detection of a first feature associated with a navigable path of a host vehicle and for receiving a time signal indicative of a travel time from the host vehicle to the first feature. The controller comprises output means for outputting a transition signal to cause the host vehicle to transition from an autonomous driving mode to a further driving mode. The controller comprises control means arranged to: if the time signal is indicative of the travel time to the first feature being greater than a first predetermined time, cause the output means to output a first transition signal to cause the host vehicle to transition from the autonomous driving mode to a first further driving mode, in dependence on the detection signal; and if the time signal is indicative of the travel time to the first feature being less than the first predetermined time, cause the output means to output a second transition signal to cause the host vehicle to transition from the autonomous driving mode to a second further driving mode, different from the first further driving mode, in dependence on the detection signal. Advantageously, the host vehicle can transition out of the autonomous driving mode differently depending on a proximity (either in time or distance) of the host vehicle to the first feature.

The controller as described above, wherein:
the input means comprises an electrical input for receiving the signal;
the output means comprises an electrical output for outputting the signal; and
the control means comprises one or more control devices such as electronic processing devices.

In some embodiments, instead or in addition to the time signal, the input means may be for receiving a distance signal indicative of a travel distance from the host vehicle to the first feature. The control means may be arranged to: if the distance signal is indicative of the travel distance to the first feature being greater than a first predetermined distance, cause the output means to output a first transition signal to cause the host vehicle to transition from the autonomous driving mode to a first further driving mode, in dependence on the detection signal; and if the distance signal is indicative of the travel distance to the first feature being less than the first predetermined distance, cause the output means to output a second transition signal to cause the host vehicle to transition from the autonomous driving mode to a second further driving mode, different from the first further driving mode, in dependence on the detection signal.

In some embodiments, the detection signal may comprise the time signal and/or the distance signal.

The first feature may be associated with a driving restriction associated with at least a portion of the navigable path. Advantageously, the host vehicle can transition out of the autonomous driving mode when the host vehicle encounters or is about to encounter the driving restriction. In some embodiments, the driving restriction may be roadworks. The first feature may form at least part of the driving restriction. For example, the first feature may be part of the roadworks, such as a road traffic cone or other roadwork element. The driving restriction may be associated with a closure of the at least a portion of the navigable path. In some embodiments, the driving restriction may be a closure of the at least a portion of the navigable path. The driving restriction may be a closure of one or more lanes of the navigable path.

The first feature may be a temporary path marking. For example, the first feature may be a temporary lane marking. The temporary lane marking may be a painted line. The temporary lane marking may be a road traffic cone. The temporary lane marking may be a mechanical road marker. The first feature may be a lane end sign. The first feature may be a temporary central reservation barrier, for example a Jersey barrier. Therefore, the host vehicle can transition our of the autonomous driving mode to either the first further driving mode or the second further driving mode when the host vehicle detects roadworks ahead. The choice of the first further driving mode or the second further driving mode can be made depending on the available distance or time until the host vehicle reaches the roadworks ahead.

The first transition signal may be to cause the host vehicle to complete the transition from the autonomous driving mode to the first further driving mode before the host vehicle reaches the first feature. Advantageously, the host vehicle will no longer be operating in the autonomous driving mode when the host vehicle reaches the first feature.

As described hereinbefore, in the autonomous driving mode, the steering and torque of the host vehicle is controlled autonomously.

A duration of the transition from the autonomous driving mode to the first further driving mode may be greater than a duration of the transition from the autonomous driving mode to the second further driving mode. Advantageously, the host vehicle can be arranged to transition out of the autonomous driving mode more slowly where there is sufficient time before the host vehicle reaches the first feature.

In the first further driving mode, a torque for longitudinal movement of the host vehicle may be controlled autonomously. In the second further driving mode, a torque for longitudinal movement of the host vehicle may be controlled autonomously. In the first further driving mode and the second further driving mode, the host vehicle may be controlled differently than in the autonomous driving mode. For example, in the first further driving mode and the second further driving mode, the steering and/or the torque for longitudinal movement of the host vehicle may be controlled differently than in the autonomous driving mode. The first further driving mode and the second further driving mode may each be configured to prevent the host vehicle travelling past the first feature whilst being controlled autonomously.

In the first further driving mode, the host vehicle may be to be decelerated. In the second further driving mode, the host vehicle may be to be decelerated. Advantageously, the host vehicle can be decelerated when the host vehicle encounters or is about to encounter the first feature. This can prolong the time before the host vehicle reaches the first feature.

In the first further driving mode, the host vehicle may be to be decelerated at a first deceleration rate. In the second further driving mode, the host vehicle may be to be decelerated at a second deceleration rate, different to the first deceleration rate. Advantageously, the host vehicle can decelerate at a different rate depending on the proximity of the first feature to the host vehicle. In some embodiments, the first acceleration rate and the second acceleration rate may be an average acceleration rate in the first further driving mode and the second further driving mode.

In the first further driving mode, the host vehicle may be to be decelerated to a stop. In the second further driving mode, the host vehicle may be to be decelerated to a stop. Advantageously, the host vehicle can autonomously come to a complete stop.

In the first further driving mode, a steering of the host vehicle may be controlled autonomously. In the second further driving mode, a steering of the host vehicle may be controlled autonomously. Advantageously, the host vehicle can be manoeuvred autonomously even after transition out of the autonomous driving mode, unless a user of the host vehicle takes control.

The output means may be for outputting a request signal to request the user to transition the host vehicle from the first further driving mode or the second further driving mode to a manual driving mode in advance of the host vehicle reaching the first feature. The control means may be arranged to cause the output means to output the request signal in dependence on the detection signal. Advantageously, the user can take control of the host vehicle to control the host vehicle past the first feature.

The control means may be arranged to cause the output means to output the request signal after the host vehicle has started transitioning from the autonomous driving mode to the first further driving mode or to the second further driving mode. Advantageously, the user can take control of the host vehicle following the request to the user.

The transition from the autonomous driving mode to the first further driving mode may comprise a first portion during which the control means is arranged to cause the output means to output the request signal, and a second portion during which the host vehicle is to be decelerated at a faster rate than in the first portion. The transition from the autonomous driving mode to the second further driving mode may comprise a first portion during which the control means is arranged to cause the output means to output the request signal, and a second portion during which the host vehicle is to be decelerated at a faster rate than in the first portion.

The duration of the first portion of the transition may be greater in the transition from the autonomous driving mode to the first further driving mode than in the transition from the autonomous driving mode to the second further driving mode. Advantageously, the user may be given longer to take control of the host vehicle without significant deceleration of the host vehicle where the host vehicle is further away from the first feature.

The detection signal may be indicative of detection of a first preceding feature associated with the navigable path, the first preceding feature indicative of a presence of the first feature. In some embodiments the detection signal is indicative of detection of the first feature by virtue of being indicative of detection of the first preceding feature.

The first preceding feature may comprise an advance marker. The advance marker may be indicative of a travel time to the first feature. The travel time may be from the host vehicle. The travel time may be from the advance marker. In some embodiments, the advance marker may be indicative of a travel distance to the first feature. The travel distance may be from the host vehicle. The travel distance may be from the advance marker. Advantageously, indicia or text on the advance marker can provide information indicative of the travel time or the travel distance to the first feature.

The first transition signal may be to cause the host vehicle to transition from the autonomous driving mode to the first further driving mode when the host vehicle is between the advance marker and the first feature. Advantageously, the host vehicle can transition out of the autonomous driving mode on detection of the advance marker, even if the first feature has not been detected directly.

In some embodiments, the first preceding feature comprise a start marker. The start marker may be indicative of the presence of the first feature. The start marker may be indicative of the presence of the first feature within a predetermined distance of the start marker.

The first transition signal may be to cause the host vehicle to transition from the autonomous driving mode to the first further driving mode after the host vehicle has passed the start marker. Advantageously, the host vehicle can transition out of the autonomous driving mode in advance of the host vehicle reaching the first feature.

The second transition signal may be to cause the host vehicle to complete the transition from the autonomous driving mode to the second further driving mode before the host vehicle reaches the first feature. Advantageously, the host vehicle can transition out of the autonomous driving mode in advance of the host vehicle reaching the first feature.

The detection signal may be indicative of detection of a second preceding feature associated with the navigable path, the second preceding feature being a start marker between the first preceding feature and the first feature and indicative of the presence of the first feature.

Where the first preceding feature is the advance marker, the first transition signal may be to cause the host vehicle to transition from the autonomous driving mode to the first further driving mode when the host vehicle is between the advance marker and the start marker. Therefore, the host vehicle can transition out of the autonomous driving mode in advance of the first feature.

The output means may be for outputting an availability signal to indicate to the user an availability of the autonomous driving mode. The control means may be arranged to cause the output means to output the availability signal in dependence on the detection signal and a determination that the host vehicle has passed the first feature. Advantageously, the autonomous driving mode can be reactivated once the host vehicle has passed the first feature. In some embodiments, the control means may be arranged to cause the output means to output the availability signal in dependence on a timeout duration since the host vehicle has passed the first feature.

The control means may be arranged to prevent activation of the autonomous driving mode when the host vehicle is within a predetermined distance of the first feature.

The input means may be for receiving a further detection signal indicative of a detection of a second feature associated with the navigable path of the host vehicle and indicative of an end of the first feature. The control means may be arranged to cause the output means to output the availability signal in dependence on the further detection signal. Advantageously, the host vehicle may be determined to have passed the first feature on passing the second feature. Thus, the autonomous driving mode can be activated (or available for activation) on detection of the second feature.

According to an aspect of the invention, there is provided a system comprising: the controller of any preceding claim, as a first controller, arranged to output the transition signal; a sensing means for detecting the first feature and arranged to output the detection signal to the first controller in dependence thereon, and for detecting a travel time from the host vehicle to the first feature and arranged to output the time signal to the first controller in dependence thereon; and a vehicle controller for receiving the transition signal and to cause the host vehicle to transition from the autonomous driving mode to the first further driving mode or from the autonomous driving mode to the second further driving mode in dependence thereon. Advantageously, the host vehicle can be transitioned out of the autonomous driving mode appropriately when the first feature is detected.

The sensing means may comprise a camera. The sensing means may comprise a radar. The sensing means may comprise a range detection means. It will be understood that the term "range detection means" will be understood to mean any sensing means for detecting sensor data indicative of a range of a target object from the host vehicle. The range detection means may be a rangefinder. The range detection means may be a laser rangefinder. The range detection means may be a Lidar sensor. Advantageously, the system can be used to detect features associated with the navigable path in a range of different conditions, such as different weather conditions. The sensing means may comprise at least two different sensing means.

The sensing means may be for detecting the second feature.

According to an aspect of the invention, there is provided a method comprising: detecting a first feature associated with a navigable path of a host vehicle; receiving a travel time from the host vehicle to the first feature; if the travel time to the first feature is greater than a first predetermined time, transitioning the host vehicle from an autonomous driving mode to a first further driving mode, in dependence on the detection of the first feature; and if the travel time to the first feature is less than the first predetermined time, transitioning the host vehicle from the autonomous driving mode to a second further driving mode, different from the first further driving mode, in dependence on the detection of the first feature.

According to an aspect of the invention, there is provided a method comprising: detecting a first feature associated with a navigable path of a host vehicle; receiving a travel distance from the host vehicle to the first feature; if the travel distance to the first feature is greater than a first predetermined distance, transitioning the host vehicle from an autonomous driving mode to a first further driving mode, in dependence on the detection of the first feature; and if the travel distance to the first feature is less than the first predetermined distance, transitioning the host vehicle from the autonomous driving mode to a second further driving mode, different from the first further driving mode, in dependence on the detection of the first feature. Therefore, the method can transition the host vehicle out of the autonomous driving mode if the first feature is detected.

The method may comprise determining the travel time in dependence on the detection of the first feature. The method may comprise determining the travel distance in dependence on the detection of the first feature.

Thresholds for Component Control

According to an aspect of the invention, there is provided a controller arranged to operably cause an output of a first component control signal indicative of a control request to cause a first component of a host vehicle to perform a requested action different from a current action of the first component and associated with a manoeuvre of the host vehicle in dependence on a primary control attempt by a user of the host vehicle, a secondary control attempt by the user of the host vehicle to control a second component for movement of the host vehicle, a first predetermined threshold and a second predetermined threshold.

According to an aspect of the invention, there is provided a controller comprising input means for receiving a first request signal indicative of a primary control attempt by a user of a host vehicle to control a first component of the host vehicle to perform a requested action different from a current action of the first component and associated with a manoeuvre of the host vehicle, and for receiving a second request signal indicative of a secondary control attempt by the user of the host vehicle to control a second component for movement of the host vehicle, output means for outputting a first component control signal to cause the first component to perform the requested action, and control means arranged to determine if the first request signal is indicative of the primary control attempt being greater than a first predetermined threshold, and to cause the output means to output the first component control signal if the first request signal is indicative of the primary control attempt being greater than a first predetermined threshold, and to determine if the second request signal is received, and if the first request signal is indicative of the primary control attempt being greater than a second predetermined threshold, and to cause the output means to output the first component control signal if the second request signal is received, and if the first request signal is indicative of the primary control attempt being greater than a second predetermined threshold, wherein the second predetermined threshold is different to the first predetermined threshold. Advantageously, a different predetermined threshold can be used if both a primary control attempt and a secondary control attempt are received from the user, compared to if only the primary control attempt is received from the user.

The controller as described above, wherein:
the input means comprises an electrical input for receiving the signal;
the output means comprises an electrical output for outputting the signal; and
the control means comprises one or more control devices such as electronic processing devices.

The first component may be a component for movement of the host vehicle. In other words the first component may be a movement component.

The first component control signal may be to cause the first component to move from a current state for performing the current action to a requested state for performing the requested action over a predetermined period of time. The predetermined period of time may be at least one second.

The second predetermined threshold may be less than the first predetermined threshold. Advantageously, the controller may output the first component control signal at a lower level of the primary control attempt where a secondary control attempt is also received. Without the secondary control attempt, the controller may be arranged to require a higher level of the primary control attempt to issue the first component control signal.

The first component may be a steering component operable to cause a change in a direction of travel of the host vehicle. Advantageously, the host vehicle can use the first predetermined threshold if only a steering request is received at the steering component. The host vehicle can use the second predetermined threshold if, in addition to the steering request, the secondary control attempt is received. The steering component may comprise a steering column associated with the host vehicle. The steering component may comprise one or more steered wheels associated with the host vehicle. The steering component may comprise a steering wheel associated with the host vehicle.

The second component may be for a host vehicle component of a different type from the first component. Where the first component is a component for lateral movement, such as a steering component, the second component may be a component for longitudinal movement, such as a torque component, for example as a braking component or an acceleration component.

The first predetermined threshold may comprise a plurality of different thresholds, each of a different type. The second predetermined threshold may comprise a plurality of different thresholds, each of a different type. Where the first predetermined threshold and the second predetermined threshold each comprise a plurality of different thresholds of different types, at least some of the thresholds comprised in the first predetermined threshold may be the same at least some of the thresholds comprised in the second predetermined threshold.

The first predetermined threshold may comprise a first torque limit threshold, indicative of a steering torque to be applied by the user as the primary control attempt to a steering wheel of the host vehicle. The first torque limit threshold may be no greater than 10 Nm. The first torque limit threshold may be greater than 5 Nm. The second predetermined threshold may comprise a second torque limit threshold, indicative of a steering torque to be applied by the user as the primary control attempt to a steering wheel of the host vehicle. The second toque limit threshold may be no greater than 8 Nm. The second torque limit threshold may be no greater than 5 Nm. The second torque limit threshold may be no greater than 3 Nm. The second torque limit threshold may be at least 0.5 Nm. The second torque limit threshold may be at least 2 Nm. Each of the predetermined thresholds may comprise a torque limit threshold, indicative of a steering torque to be applied by the user as the primary control attempt to a steering wheel of the host vehicle.

The first predetermined threshold may comprise a first torque integral limit threshold, indicative of an integrated steering torque to be applied by the user as the primary control attempt to a steering wheel of the host vehicle. The first torque integral limit threshold may be no greater than 1 Nms. The first torque integral limit threshold may be no greater than 0.3 Nms. The first torque integral limit threshold may be no greater than 0.2 Nms. The second predetermined threshold may comprise a second torque integral limit threshold, indicative of an integrated steering torque to be applied by the user as the primary control attempt to a steering wheel of the host vehicle. The second torque integral limit threshold may be no greater than 1 Nms. The second torque integral limit threshold may be no greater than 0.3 Nms. The second torque integral limit threshold may be no greater than 0.2 Nms. Each of the predetermined thresholds may comprise a torque limit threshold, indicative of a steering torque to be applied by the user as the primary control attempt to a steering wheel of the host vehicle. Where the first predetermined threshold and the second predetermined threshold each comprise a plurality of different thresholds of different types, the first torque integral limit threshold may be the same as the second torque integral limit threshold. Advantageously, use of a torque integral limit threshold may ensure that consistent steering control attempts are more likely to result in the output of the first component control signal than a single steering control attempt of a higher level than the consistent steering control attempt.

The torque integral limit threshold may be indicative of the integrated steering torque to be applied by the user over an integration window, the integration window having a duration of less than five seconds. The duration may be less than three seconds. The duration may be no greater than one second.

The control means may be arranged to determine if the first request signal is indicative of the primary control attempt being greater than the first predetermined threshold for longer than a first threshold duration, and to cause the output means to output the first component control signal in dependence thereon. Advantageously, the use of the first threshold duration can ensure that a consistent control attempt is more likely to result in the output of the first component control signal than a single control attempt of a higher level than the consistent control attempt, in a similar way as to the use of the torque integral limit threshold for steering control attempts. The above may relate to steering control attempts.

The first threshold duration may be less than one second. The first threshold duration may be no greater than 0.5 seconds.

The output means may be for outputting a second component control signal to cause the second component to perform a further requested action. The control means may be arranged to determine if the second request signal is indicative of the secondary control attempt being greater than a third predetermined threshold, and to cause the output means to output the second component control signal in dependence thereon. Advantageously, both the first component and the second component can perform requested actions in dependence on different thresholds depending on the control attempts made. The control means may be arranged to cause the output means to output the second component control signal in dependence on the first request signal and the second predetermined threshold.

The second component may be a component for longitudinal movement, such as a speed control component operable to cause a change in a speed of the host vehicle.

The speed control component may be a braking component. The third predetermined threshold may be a braking threshold, indicative of a braking force to be applied by the user as the secondary control attempt to a brake input of the host vehicle. The braking threshold may be a pedal travel distance threshold where the brake input is a brake pedal. The braking threshold may be a braking torque threshold at a wheel of the host vehicle. The braking threshold may be a regeneration torque threshold for an energy regeneration system of the host vehicle. The braking threshold may be a brake pressure threshold. The braking pressure threshold may be determined at a plurality of different points.

The speed control component may be a positive torque request component, such as an acceleration component.

The third predetermined threshold may be an acceleration threshold, indicative of an acceleration request to be applied by the user as the secondary control attempt to an acceleration input of the host vehicle. The acceleration input may be an acceleration pedal. The acceleration threshold may be a pedal travel distance threshold. The acceleration threshold may be an acceleration torque threshold at a wheel of the host vehicle. The acceleration threshold may be an acceleration torque threshold at a drivetrain component of the host vehicle.

The input means may be for receiving a detection signal indicative of detection of a hand of the user on a steering wheel of the host vehicle. The control means may be arranged to cause the output means to output the first component control signal in dependence on the detection signal. Advantageously, the presence of the hand of the user on the steering wheel can impact whether to control the first component to perform the requested action indicated by the primary control attempt via the first request signal.

Where the detection signal indicative of detection of the hand of the user on the steering wheel is received, the control means may be arranged to determine if the first request signal is indicative of the primary control attempt being greater than a fourth predetermined threshold. The control means may be arranged to cause the output means to output the first component control signal if the first request signal is indicative of the primary control attempt being greater than the fourth predetermined threshold. The fourth predetermined threshold may be different to the first predetermined threshold and the second predetermined threshold. Advantageously, the presence of the hand of the user on the steering wheel can impact whether to control the first component to perform the requested action indicated by the primary control attempt via the first request signal.

The fourth predetermined threshold may be less than at least one of the first predetermined threshold and the second predetermined threshold. Advantageously, the presence of the hand on the steering wheel can result in a lower threshold when the control means is deciding whether to cause the output means to output the first component control signal. The fourth predetermined threshold may be less than both the first predetermined threshold and the second predetermined threshold.

The input means may be for receiving a further detection signal indicative of detection of a further hand of the user on the steering wheel of the host vehicle. The control means may be arranged to cause the output means to output the first component control signal in dependence on the further detection signal.

The control means may be arranged to determine if the first request signal is indicative of the primary control attempt being greater than a fifth predetermined threshold. The control means may be arranged to cause the output means to output the component control signal determine if the first request signal is indicative of the primary control attempt being greater than the fifth predetermined threshold. The fifth predetermined threshold may be different to the first predetermined threshold and to the second predetermined threshold. Advantageously, two hands on the steering wheel can be treated differently to one hand on the steering wheel.

The fifth predetermined threshold may be less than at least one of the first predetermined threshold, the second predetermined threshold and the fourth predetermined threshold. Advantageously, the presence of both hands on the steering wheel can result in an even lower threshold when the control means is deciding whether to cause the output means to output the first component control signal. The fifth predetermined threshold may be less than each of the first predetermined threshold, the second predetermined threshold and the fourth predetermined threshold.

The output means may be for outputting a transition signal to cause the host vehicle to transition out of an autonomous driving mode. The control means may be arranged to cause the output means to output the transition signal in dependence on the first request signal. In other words, the host vehicle may be travelling in the autonomous driving mode at the time of the primary control attempt by the user. The control means may be arranged to cause the output means to output the transition signal when the requested action is different from the current action by more than one or more predetermined thresholds.

The transition signal may be a first transition signal to cause the host vehicle to transition out of the autonomous driving mode to a manual driving mode over a period of at least 0.5 seconds. The period may be at least two seconds. The period may be at least five seconds. In other words, the first transition signal may be to cause the host vehicle to transition out of the autonomous driving mode to the manual driving mode gradually.

The transition signal may be a second transition signal to cause the host vehicle to transition out of the autonomous driving mode to a manual driving mode over a period of less than 0.5 seconds. The second transition signal may be to cause the host vehicle to transition out of the autonomous driving mode to the manual driving mode substantially instantaneously.

The control means may be arranged to control the output means to output the second transition signal in dependence on the first request signal. Advantageously, the controller can transition out of the autonomous driving mode more quickly in response to some primary control attempts, for example a hard braking command.

It will be understood that in the manual driving mode, at least one of a lateral control and a longitudinal control of the car will be performed by the user.

According to an aspect of the invention, there is provided a system comprising the controller of any preceding claim, arranged to output the first component control signal, actuator means for receiving the first component control signal from the controller to cause the first component of the host vehicle to perform the requested action, and input apparatus for receiving the primary control attempt by the user of the host vehicle and arranged to output the first request signal to the controller in dependence on the primary control attempt. Advantageously, the first component of the host vehicle can perform the requested action in accordance with the operation of the controller.

The system as described above, wherein:
the actuator means comprises an actuator.

The actuator means may be a torque control actuator for controlling a torque of the host vehicle. The torque control actuator may be a brake control actuator. The torque control actuator may be an acceleration control actuator.

The input apparatus may be for receiving the secondary control attempt by the user and may be arranged to output the second request signal to the controller in dependence om the secondary control attempt.

According to an aspect of the invention, there is provided a method comprising receiving a primary control attempt by a user of a host vehicle to control a first component of the host vehicle to perform a requested action different from a current action of the first component and associated with a manoeuvre of the host vehicle. The method comprises determining if a secondary control attempt is received, the secondary control attempt by the user of the host vehicle to control a second component for movement of the host vehicle. If the secondary control attempt is not received, the method comprises determining if a characteristic of the primary control attempt is greater than a first predetermined threshold, and controlling the first component to perform the requested action if the characteristic of the primary control attempt is greater than the first predetermined threshold. If the secondary control attempt is received, the method comprises determining if the characteristic of the primary control attempt is greater than a second predetermined threshold, different to the first predetermined threshold, and controlling the first component to perform the requested action if the characteristic of the primary control attempt is greater than the second predetermined threshold.

The characteristic may be a torque characteristic. The characteristic may be a torque integral characteristic. It will be understood that substantially any aspect of the primary control attempt related to the requested action of the first component may be considered the characteristic of the primary control attempt.

Override Driving Mode Transition with Steering Request

According to an aspect of the invention, there is provided a controller arranged to operably cause a switch from an autonomous driving mode of a host vehicle to a transition driving mode in dependence on a transition request signal indicative of a transition request by a user of the host vehicle and to operably cause a switch from the transition driving mode to a further driving mode in dependence on a steering request signal indicative of a steering request by the user of the host vehicle. The controller may be arranged to operably switch from the transition driving mode to the further driving mode if the steering request signal is indicative of the steering request being greater than a predetermined threshold.

According to an aspect of the invention, there is provided a controller, comprising input means for receiving a transition request signal indicative of a transition request by a user of a host vehicle to transition out of an autonomous driving mode of the host vehicle, and control means arranged to switch from the autonomous driving mode to a transition driving mode, in which the host vehicle is steered autonomously, in dependence on the transition request signal, receive a steering request signal indicative of a steering request by the user of the host vehicle, determine if the steering request signal is indicative of the steering request being greater than a predetermined threshold, and switch from the transition driving mode to a further driving mode, in which the host vehicle is steered in dependence on the steering request signal, in dependence on whether the steering request signal is indicative of the steering request being greater than the predetermined threshold. Advantageously, the host vehicle can be transitioned from the transition driving mode to the further driving mode if the user makes a steering request. The user's steering request can be used to steer the host vehicle.

The controller as described above, wherein:
the input means comprises an electrical input for receiving the signal; and
the control means comprises one or more control devices such as electronic processing devices.

The transition driving mode may be arranged to switch to the further driving mode over a period of time of at least three seconds in the absence of the steering request signal indicative of the steering request being greater than the predetermined threshold. If the steering request signal is indicative of the steering request being greater than the predetermined threshold, the control means may be arranged to switch the transition driving mode to the further driving mode in less than 0.5 seconds. Advantageously, when in the transition driving mode, the host vehicle can obey some steering requests with at most a short delay. The control means may be arranged to switch the transition driving mode to the further driving mode substantially instantly.

The transition driving mode may be arranged to control a reduction in the speed of the host vehicle. The reduction in the speed of the host vehicle may be a coasting of the host vehicle. In the transition driving mode, the acceleration of the host vehicle may not be controlled autonomously. In the transition driving mode, the host vehicle may be configured not to accelerate. In the transition driving mode, the host vehicle may be steered substantially not in dependence on the steering request signal.

The further driving mode may be a manual driving mode in which a lateral movement, for example steering, of the host vehicle is controlled by the user. In the manual driving mode, a longitudinal movement, for example a torque control of the host vehicle, may be controlled by the user. The torque control may comprise an acceleration control and/or a braking control.

The predetermined threshold may comprise a torque limit threshold, indicative of a steering torque to be applied by the user as the steering request to a steering wheel of the host vehicle. Advantageously, the host vehicle can obey steering requests greater than the torque limit threshold.

The control means may be arranged to determine if the steering request signal is indicative of the steering request being greater than the torque limit threshold for longer than a predetermined duration. The control means may be arranged to switch from the transition driving mode to the further driving mode if the steering request signal is indicative of the steering request being greater than the torque limit threshold for longer than the predetermined duration. Advantageously, the host vehicle can obey steering requests greater than the torque limit threshold for longer than the predetermined duration, which can ensure brief and inadvertent, but high torque, steering requests (such as a knock of the steering wheel) can be ignored.

The predetermined threshold may comprise a torque integral limit threshold, indicative of an integrated steering torque to be applied by the user as the steering request to a steering wheel of the host vehicle.

The torque integral limit threshold may be indicative of the integrated steering torque to be applied by the user over an integration window. Advantageously, brief and inadvertent, but high torque, steering requests (such as a knock of the steering wheel) can be ignored. The integration window may have a duration of up to three seconds. The integration window may have a duration of less than three seconds.

The control means may be arranged to cause a predetermined delay between receipt of the transition request signal and switching from the autonomous driving mode to the transition driving mode, wherein the predetermined delay is of a duration of at least 0.5 seconds.

Each of the thresholds described above can be further limited, for example numerically, substantially as described in relation to other aspects of the invention.

According to an aspect of the invention, there is provided a system, comprising the controller of any preceding claim, arranged to switch between the autonomous driving mode and the transition driving mode and between the transition driving mode and the further driving mode, and an input apparatus for receiving the transition request from the user and arranged to output the transition request signal to the controller in dependence thereon and for receiving the steering request from the user and arranged to output the steering request signal to the controller in dependence thereon. Advantageously the inputs in the form of the transition request and the steering request at the input apparatus may cause the host vehicle to switch from the autonomous driving mode to the further driving mode via the transition driving mode.

The input apparatus may comprise a plurality of input devices. The input apparatus may comprise a first input device for receiving the transition request and a second input device for receiving the steering request.

The input apparatus may be for operation by a hand of the user to cause the input apparatus to output the transition request signal. Thus, the user can make the transition request easily using their hand. The input apparatus may comprise an input switch. The input switch may be a button.

At least a portion of the input apparatus may be arranged to be provided at a steering wheel of the host vehicle. Thus, the portion of the input apparatus is within easy reach of the user, particularly as the user is preparing to take control of the host vehicle in the transition driving mode and the further driving mode.

The input apparatus may be arranged to cause a predetermined delay between a first receipt of the transition request from the user and output of the transition request signal, wherein the predetermined delay is of a duration of at least 0.5 seconds. The input apparatus may be arranged to cause the predetermined delay between the first receipt of the transition request and output of the transition request signal in dependence on a current driving mode of the host vehicle. Advantageously, the predetermined delay can be used for some autonomous driving modes of the host vehicle.

The input apparatus may be for operation by a hand of the user to cause the input apparatus to output the steering request signal. Thus, the user can make the steering request easily using their hand. The input apparatus may comprise a steering wheel.

During the transition from the transition driving mode to the further driving mode, the system may be arranged to limit a rate of change of the steering of the host vehicle to a rate threshold, wherein the rate threshold is determined in dependence on the steering request signal. Advantageously, this ensures a smooth transition from steering control of the host vehicle autonomously by the host vehicle and steering control of the host vehicle by the user.

The rate threshold may be a torque rate threshold. Where the steering request signal is indicative of the steering request having a torque value less than a first torque band threshold, the torque rate threshold may be determined to be a first torque rate threshold. Where the steering request signal is indicative of the steering request having a torque value greater than the first torque band threshold, but less than a second torque band threshold, the torque rate threshold may be determined to be a second torque rate threshold. Where the steering request signal is indicative of the steering request having a torque value greater than a or the second torque band threshold, the torque rate threshold may be determined to be a third torque rate threshold. The first torque band threshold may be greater than 1 Nm. The first torque band threshold may be less than 5 Nm. The second torque band threshold may be greater than the first torque band threshold. The second torque band threshold may be greater than 3 Nm. The second torque band threshold may be greater than 5 Nm. The second torque band threshold may be less than 9 Nm. The first torque rate threshold may be greater than 3 Nm/s. The first torque rate threshold may be at least 8 Nm/s. The first torque rate threshold may be less than 15 Nm/s. The second torque rate threshold may be greater than 10 Nm/s. The second torque rate threshold may be greater than 14 Nm/s. The second torque rate threshold may be less than 20 Nm/s. The third torque rate threshold may be greater than 15 Nm/s. The third torque rate threshold may be less than 25 Nm/s.

It will be understood that the system or controller described in other aspects of the invention herein may be arranged to limit the rate of change of the steering of the host vehicle to a rate threshold during transition to the manual driving mode in which the host vehicle is to be steered in dependence on a steering request from the user.

According to an aspect of the invention, there is provided a method comprising receiving a transition request by a user of a host vehicle to transition out of an autonomous driving mode of the host vehicle, transitioning the host vehicle from the autonomous driving mode to a transition driving mode, in which the host vehicle is steered autonomously, in dependence on the transition request, receiving a steering request by the user of the host vehicle, and transitioning the host vehicle from the transition driving mode to a further driving mode, in which the host vehicle is steered in dependence on the steering request, in dependence on whether a characteristic of the steering request is greater than a predetermined threshold.

In the transition driving mode, the host vehicle may be configured to transition to the further driving mode within a predetermined period of time. If the steering request is received prior to expiration of the predetermined period of time, the host vehicle may transition to the further driving mode on receipt of the steering request. In other words, the host vehicle may transition to the further driving mode before expiration of the predetermined period of time if the steering request is received.

The host vehicle may be transitioned from the transition driving mode to the further driving mode in dependence on whether a steering torque to be applied by the user as the steering request to a steering wheel of the host vehicle is greater than a torque limit threshold.

The host vehicle may be transitioned from the transition driving mode to the further driving mode in dependence on whether the steering torque of the steering request is greater than the torque limit threshold for longer than a predetermined duration.

The host vehicle may be transitioned from the transition driving mode to the further driving mode in dependence on whether an integrated steering torque to be applied by the user as the steering request to a steering wheel of the host vehicle is greater than a torque integral limit threshold.

The torque limit threshold, the predetermined duration and the torque integral limit threshold may be substantially as described hereinbefore.

Vehicle-Initiated Transition Out of Autonomous Driving Mode

According to an aspect of the invention, there is provided a controller arranged to operably cause a host vehicle to switch from an autonomous driving mode to a transition driving mode in dependence on one or more of a vehicle characteristic, a user characteristic and an environment characteristic and to cause the host vehicle to switch from the transition driving mode to a further driving mode in dependence on a confirmation by a user of the host vehicle to transition out of a current driving mode of the host vehicle. The controller may be arranged to autonomously switch from the autonomous driving mode to the transition driving mode in the absence of an active user request to transition from the autonomous driving mode to the transition driving mode. In the transition driving mode, the host vehicle is steered autonomously.

According to an aspect of the invention, there is provided a controller comprising input means for receiving one or more state signals each indicative of one or more of a vehicle characteristic, a user characteristic and an environment characteristic. The controller comprises control means arranged to switch from an autonomous driving mode to a transition driving mode, in which the host vehicle is steered autonomously, in dependence on the one or more state signals. The control means is arranged to receive a confirmation signal indicative of a confirmation by a user of the host vehicle to transition out of a current driving mode of the host vehicle. The control means is arranged to switch from the transition driving mode to a further driving mode in dependence on the confirmation signal. Advantageously, the user of the host vehicle can escape the transition driving mode, which can be autonomously initiated as a result of one or more of the vehicle characteristic, the user characteristic and the environment characteristic, by inputting a confirmation to transition out of the current driving mode of the host vehicle. In response to the confirmation, in the firm of the confirmation signa, the control means can switch from the transition driving mode to the further driving mode. In the further driving mode, the host vehicle may be steered by the user.

The controller as described above, wherein:
the input means comprises an electrical input for receiving the signal; and
the control means comprises one or more control devices such as electronic processing devices.

The control means may be arranged to switch from the autonomous driving mode to the transition driving mode autonomously. That is, there may be no user active request to transition from the autonomous driving mode to the transition driving mode.

The confirmation signal may be indicative of at least one of a steering confirmation, a torque confirmation, a braking confirmation and a driving mode change confirmation by the user of the host vehicle. The torque confirmation may be an acceleration confirmation, for example indicative of a depression of an accelerator pedal of the host vehicle. Advantageously, the confirmation signal can also be a control request for the host vehicle for controlling a movement of the host vehicle.

The controller may comprise output means. The output means may be for outputting a notification signal to notify the user to confirm the switch from the transition driving mode to the further driving mode of the host vehicle. The output means may comprise an electrical output for outputting the signal. The control means may be arranged to cause the output means to output the notification signal in dependence on the one or more state signals. Advantageously, the user can be notified or requested to confirm the switch from the transition driving mode to the further driving mode. The notification signal may be output by the output means if the one or more state signals are such that they will trigger the switch from the autonomous driving mode to the transition driving mode. The notification signal may be output by the output means in dependence on the switch from the autonomous driving mode to the transition driving mode.

The input means may be for receiving a capability signal indicative of a capability of the user to take control of the host vehicle after the host vehicle has transitioned out of the autonomous driving mode. The control means is arranged to switch from the transition driving mode to the further driving mode in dependence on the capability signal. Thus, the host vehicle may switch from the transition driving mode to the further driving mode if the user is determined to be capable to take control of the host vehicle. The capability signal and the capability may be substantially as described hereinbefore.

According to an aspect of the invention, there is provided a system, comprising the controller of any preceding claim, and an input apparatus for receiving the confirmation from the user to transition out of the current driving mode of the host vehicle and arranged to output the confirmation signal to the controller if the confirmation from the user to transition out of the current driving mode is received.

In the transition driving mode, the controller may be configured to decelerate the host vehicle autonomously. Advantageously, the transition driving mode may result in deceleration of the host vehicle until the host vehicle switches from the transition driving mode to the further driving mode.

In the transition driving mode, the controller may be configured to decelerate the host vehicle autonomously at a deceleration rate less than a maximum deceleration rate of the host vehicle. Advantageously, the host vehicle may decelerate autonomously in the transition driving mode at a level not uncomfortable to the user of the host vehicle. The deceleration rate may be less than half the maximum deceleration rate of the host vehicle.

In the transition driving mode, the controller may be configured to decelerate the host vehicle autonomously at a maximum deceleration rate of the host vehicle. Advantageously, the host vehicle may be brought to a stop as quickly as possible. The controller may be configured to determine the deceleration rate in dependence on the one or more state signals. In other words, there may be some situations where the controller can choose between deceleration at the maximum deceleration rate or deceleration at the deceleration rate less than the maximum deceleration rate in dependence on the one or more state signals.

The system may comprise notification means for receiving the notification signal from the controller to cause the notification means to indicate to the user to confirm the transition from the transition driving mode to the further driving mode of the host vehicle in dependence on the notification signal. Advantageously, the user can be notified via the notification means. The notification means may comprise a notification unit. The notification means may be a display means. The notification means may be substantially as described hereinbefore in relation to other aspects of the invention.

The further driving mode may be a manual driving mode. In the manual driving mode, the host vehicle may be steered by the user. The manual driving mode may be substantially as described hereinbefore in relation to other aspects of the invention.

The controller may be arranged such that, in the further driving mode, the host vehicle is steered in dependence on a steering request signal. The steering request signal may be determined in dependence on the steering confirmation signal. The steering request signal may be the steering confirmation signal.

According to an aspect of the invention, there is provided a method comprising receiving one or more of a vehicle characteristic, a user characteristic and an environment characteristic, transitioning the host vehicle from an autonomous driving mode to a transition driving mode, in which the host vehicle is steered autonomously, in dependence on one or more of the one or more of the vehicle characteristic, the user characteristic and the environment characteristic, receiving a confirmation by a user of the host vehicle to transition out of a current driving mode of the host vehicle, and switching the host vehicle from the transition driving mode to a further driving mode in dependence on the confirmation. Advantageously, the host vehicle can be switched from the transition driving mode to the further driving mode substantially only if the user confirms the switch of driving mode.

The method may comprise indicating to the user to request the transition from the transition driving mode to the further driving mode of the host vehicle in dependence on the one or more of the one or more of the vehicle characteristic, the user characteristic and the environment characteristic. The method may comprise indicating to the user to request the transition from the transition driving mode to the further driving mode of the host vehicle in dependence on transitioning the host vehicle from the autonomous driving mode to the transition driving mode.

The method may comprise transitioning the host vehicle from the transition driving mode to the further driving mode in dependence on a capability of the user to take control of the host vehicle after the host vehicle has transitioned to the further driving mode. The capability may be determined substantially as described hereinbefore in relation to other aspects of the invention, such as via a capability signal.

The method may comprise causing the host vehicle to decelerate autonomously in the transition driving mode. In the transition driving mode, the host vehicle may be configured to coast. In other words, in the transition driving mode, a speed of the host vehicle may be configured to not exceed a speed of the host vehicle in the autonomous driving mode.

Common Elements

According to an aspect of the invention, there is provided a vehicle comprising a controller according to an aspect of the invention as described hereinbefore, a system according to an aspect of the invention as described hereinbefore or arranged to perform a method according to an aspect of the invention as described hereinbefore.

According to an aspect of the invention, there is provided computer software which, when executed by a processing means, is arranged to perform a method according to an aspect of the invention. The computer software may be stored on a computer readable medium. The computer software may be tangibly stored on a computer readable medium. The computer readable medium may be non-transitory.

According to an aspect of the invention, there is provided a non-transitory, computer-readable storage medium storing instructions thereon that when executed by one or more processors causes the one or more processors to carry out a method according to an aspect of the invention.

SAE International's J3016 defines six levels of driving automation for on-road vehicles. The term autonomous driving mode as used herein will be understood to cover any of the SAE levels one to five. In an embodiment, the autonomous driving modes disclosed herein will be understood to be of at least SAE level three. In other words, the automated driving system of the host vehicle will control all aspects of the dynamic driving task.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which:

FIGS. 22A to 22C show a plurality of navigable paths in which an embodiment of the present invention can have utility;

DETAILED DESCRIPTION

Figure 1:
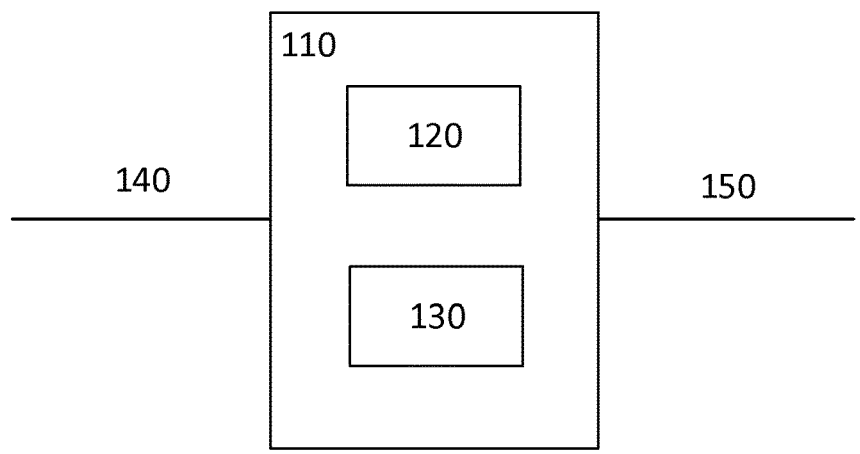
FIG. 1 shows a schematic representation of a controller in accordance with an embodiment of the present invention.

A controller 110 or control unit 110 in accordance with an embodiment of the invention is shown in FIG. 1.

The controller 110 comprises a control means 120, input means 140 and output means 150. In some embodiments, the controller 110 comprises a memory means 130 such as one or more memory devices 130 for storing data therein. The input means 140 may comprise an electrical input for receiving a signal in the form of one or more state signals. The one or more state signals are indicative of a suitability of a host vehicle to initiate an autonomous driving mode. In some embodiments, the one or more state signals are each indicative of one or more of a vehicle characteristic, a user characteristic and an environment characteristic, as will be explained. The output means 150 may comprise an electrical output for outputting an availability signal. The availability signal is indicative of an availability of the autonomous driving mode of the host vehicle. The control means 120 may be formed by one or more electronic processing devices such as an electronic processor. The processor may operably execute computer readable instructions stored in the one or more memory devices 130. The control means 120 is arranged to control the output means 150 to output the availability signal in dependence on the one or more state signals. Therefore, the suitability of the host vehicle to operate in an autonomous driving mode may be used to determine whether to indicate to the user, through the availability signal, that the autonomous driving mode is available. In other words, when at least one of a vehicle characteristic, a user characteristic and an environment characteristic associated with the host vehicle are such that it is not suitable to initiate the autonomous driving mode of the host vehicle, the user is not made aware of the availability of the autonomous driving mode. In some embodiments, the control means 120 is arranged to initiate the autonomous driving mode in dependence on the output of the availability signal to the user. In some embodiments, the input means 140 and the output means 150 may be combined such as by being formed by an I/O unit or interface unit. For example, the controller 110 may comprise an interface to a network forming a communication bus of the host vehicle. The interface bus may be an Internet Protocol (IP) based communication bus such as Ethernet, although embodiments of the invention are not limited in this respect.

In the autonomous driving mode described herein, at least one of a lateral control in the form of steering and a longitudinal control in the form of drivetrain torque or locomotion torque of the host vehicle are controlled autonomously. It will be understood that the drivetrain torque may include either or both of an acceleration torque to accelerate the host vehicle or a braking torque to decelerate the host vehicle. In some embodiments, the steering, acceleration torque and braking torque of the host vehicle are controlled autonomously.

In some embodiments, the input means 140 is arranged to receive an initiation signal. The initiation signal is indicative of a user's request to initiate the autonomous driving mode. Typically, the user requests to initiate the autonomous driving mode in response to an awareness of the availability signal by the user. In some embodiments, the output means 150 is arranged to output a driving mode signal. The driving mode signal is to cause the host vehicle to initiate the autonomous driving mode. In embodiments, the control means 120 is arranged to control the output means 150 to output the driving mode signal in dependence on the initiation signal.

In some embodiments, the control means 120 is arranged to determine a transition phase of the autonomous driving mode. During the transition phase, control of a vehicle movement of the host vehicle is transitioned away from the user to an autonomous driving control means in the form of an autonomous driving control unit. At the end of the transition phase, the autonomous driving control means is arranged to autonomously control the vehicle movement. In some embodiments, a duration of the transition phase is determined in dependence on the one or more state signals.

In some embodiments, the output means 150 is arranged to output a progress signal. The progress signal is indicative of a progress through the transition phase. The control means 120 is arranged to control the output means 150 to output the progress signal during the transition phase. The control means 120 may be arranged to determine the duration of the transition phase. The duration of the transition phase may be determined during the transition phase. In some embodiments, the duration of the transition phase may be determined at a plurality of different times during the transition phase.

In some embodiments, one or more of the state signals indicative of one or more of the vehicle characteristics, the user characteristics and the environment characteristics is indicative of a driving environment of the host vehicle. The driving environment may be indicative of a type of navigable path. The driving environment may be indicative of a state of the navigable path. For example, the one or more state signals may be indicative of the host vehicle driving on a highway, devoid of pedestrians.

In some embodiments, at least one of the one or more state signals is indicative of a vehicle characteristic or an environment characteristic in the form of a speed. The speed may be a wheel speed. The speed may be a powertrain speed. For example, the powertrain speed may be a motor speed. The powertrain speed may be an engine speed. The powertrain speed may be a drive shaft speed. The speed may be associated with the host vehicle. In other words, the speed may be a speed of the host vehicle. In some embodiments, at least one of the one or more state signals is indicative of a speed of at least one target vehicle. The at least one target vehicle is different from the host vehicle. In some embodiments, the control means 120 may be arranged to control the output means 150 to output the availability signal if the state signal(s) are indicative of a speed of the host vehicle being less than a predetermined threshold. In other words, the user of the host vehicle may be made aware of the availability of the autonomous driving mode of the host vehicle if the speed of the host vehicle is below the predetermined threshold speed.

In some embodiments, at least one of the one or more state signals is indicative of vehicle characteristic in the form of a detection range of one or more sensors associated with the host vehicle. The one or more sensors (not shown in FIG. 1) may be in data communication with the controller 110 via the input means 140. The one or more sensors may comprise at least one of a radar sensor, an ultrasound sensor, a laser sensor and a camera. It will be understood that the detection range of the one or more sensors may be influenced by an environment characteristic associated with the host vehicle, such as a weather condition of the environment of the host vehicle. For example, the detection range of the camera may be significantly decreased in foggy conditions. The control means 120 may be arranged to control the output means 150 to output the availability signal if the state signal(s) are indicative of the detection range of the one or more sensors being greater than a predetermined range threshold. In other words, the autonomous driving mode may be unavailable to the user of the host vehicle if the detection range of the one or more sensors does not meet the predetermined range threshold.

In some embodiments, at least one of the one or more state signals is indicative of an environment characteristic in the form of a weather condition. The weather condition may be a current weather condition of the host vehicle, or may be an upcoming weather condition to be encountered by the host vehicle at a predetermined point along the navigable path. For example, at least one of the one or more state signals may be indicative of rain falling on the host vehicle. In another example, the weather condition may be the presence of snow or ice on the ground. The weather condition may be at least one of a temperature, a humidity, a wind speed, a visibility, a pressure and a precipitation indicator. The control means 120 may be arranged to control the output means 150 to output the availability signal if the state signal(s) are indicative of the weather condition being one amongst a plurality of predetermined acceptable weather conditions. In other words, the autonomous driving mode may be unavailable to the user of the host vehicle if the weather condition is not an acceptable weather condition.

In some embodiments, at least one of the one or more state signals is indicative of a user characteristic in the form of an awareness of the user of the host vehicle. The input means 140 may be for receiving the at least one of the one or more state signals indicative of the awareness of the user from one or more user sensors (not shown in FIG. 1). The one or more user sensors may comprise at least one of a camera and a physiological sensor to capture data indicative of the awareness of the user. The control means 120 may be arranged to control the output means 150 to output the availability signal is the state signal(s) are indicative of the user's awareness being above a predetermined awareness threshold. In other words, the autonomous driving mode may be unavailable to the user of the host vehicle if the user is not sufficiently aware to be able to resume control of the host vehicle from the autonomous driving mode if required. In some circumstances, the control means 120 may be arranged to control the output means 150 to output a driving mode control signal to cause the host vehicle to operate in a further autonomous driving mode if the user is determined as not sufficiently aware to be able to control the host vehicle.

In some embodiments, the input means 140 is arranged to receive a frequency signal. The frequency signal is indicative of a frequency of previous activation of the autonomous driving mode of the host vehicle. The control means 120 may be arranged to control the output means 150 to output the availability signal in dependence on the frequency signal. In some embodiments, the control means 120 is arranged to determine the frequency signal as having a first value if a frequency of previous activation of the autonomous driving mode is greater than a frequency threshold. The control means 120 may be arranged to determine the frequency signal as having a second value if a frequency of previous activation of the autonomous driving mode is lower than the frequency threshold. In some embodiments, the control means 120 is arranged to control the output means 150 to output the availability signal more frequently when the frequency signal is indicative of a more frequent previous activation of the autonomous driving mode of the host vehicle. In other words, the control means 120 may be arranged to control the output means 150 to output the availability signal less frequently for a user who less frequently activates the autonomous driving mode of the host vehicle. Therefore, only users of the host vehicle who frequently make use of the autonomous driving mode of the host vehicle can be frequently advised of the availability of the autonomous driving mode through the availability signal.

Figure 2:
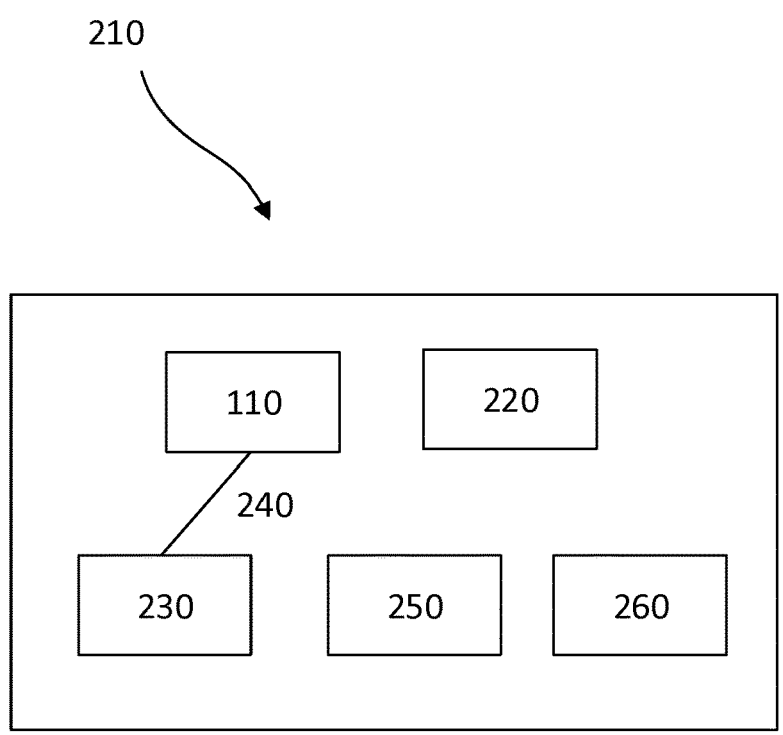
FIG. 2 shows a schematic representation of a system incorporating a controller in accordance with an embodiment of the present invention.

A system 210 in accordance with an embodiment of the invention is shown in FIG. 2.

The system 210 comprises the controller 110 as described hereinbefore with reference to FIG. 1 and notification means 220. In some embodiments, the system 210 comprises sensing means 230 in the form of a sensor unit 230, sensor output means 240 and sensor control means 250. The controller 110 is arranged to output the availability signal as described hereinbefore. The notification means 220 is for receiving the availability signal from the controller 110. The notification means 220 is to indicate to the user that the autonomous driving mode is available in dependence on the received availability signal from the controller 110. In some embodiments, the notification means 220 is a sensory output unit 220. In some embodiments, the sensory output unit 220 comprises an illumination unit 220. In some embodiments, the notification means 220 comprises a display means. Optionally, the notification means 220 comprises at least one of a tactile output means and an audio output means. In some embodiments, the notification means 220 is arranged to receive the driving mode signal. The notification means 220 is configured to indicate to the user that the autonomous driving mode is to be initiated for the host vehicle in dependence on receipt of the driving mode signal. In some embodiments, the notification means 220 is arranged to indicate to the user the progress through the transition phase in dependence on receipt of the progress signal from the controller 110.

In some embodiments, the sensing means 230 is arranged to determine at least one of the vehicle characteristic, the user characteristic or the environment characteristic. The sensor output means 240 may comprise an electrical output for outputting the one or more state signals to the controller 110. The sensor control means 250 may be formed by one or more electronic processing devices such as an electronic processor. The processor may operably execute computer readable instructions stored in the one or more sensor memory devices 260. The sensor control means 250 is arranged to control the sensor output means 240 to output the one or more state signals to the controller 110 in dependence on the at least one of the vehicle characteristic, the user characteristic and the environment characteristic determined by the sensing means 230.

In some embodiments, the sensing means 230 may comprise one or more cameras, laser sensors, radar sensors, ultrasound sensors and physiological sensors.

Figure 3:
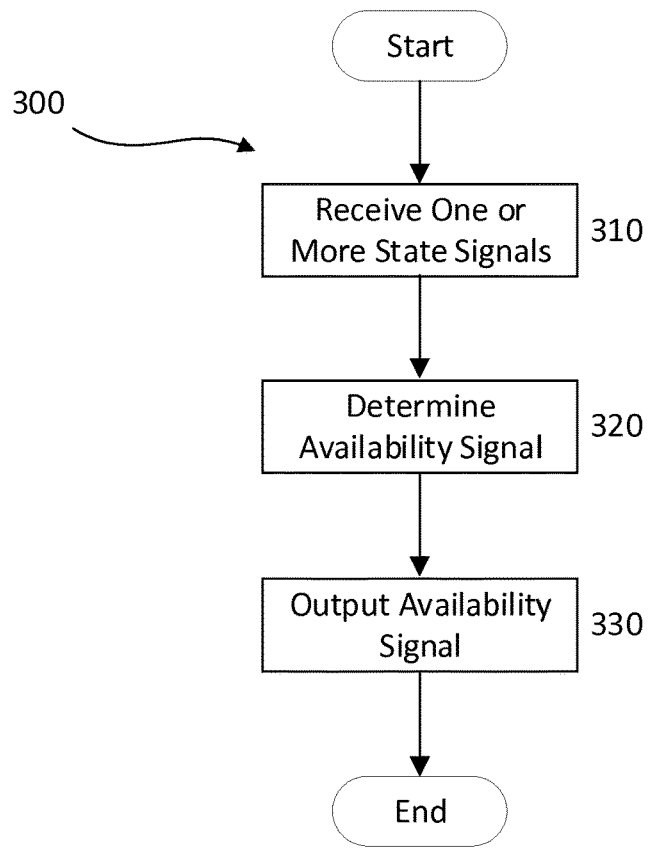
FIG. 3 shows a flow diagram illustrating a method in accordance with an embodiment of the present invention.

A method 300 according to an embodiment of the invention is shown in FIG. 3. The method 300 is a method of controlling the host vehicle. In particular, the method 300 is a method of controlling the output of the availability signal indicative of an availability of the autonomous driving mode of the host vehicle. The method 300 may be performed by the controller 110 and system 210 described hereinbefore with reference to FIGS. 1 and 2.

The method 300 broadly comprises steps of receiving 310 a signal indicative of a suitability of initiation of an autonomous driving mode of a host vehicle and, in dependence thereon, determining 320 an availability signal indicative of an availability of the autonomous driving mode and controlling an output 330 of the availability signal.

Referring to FIG. 3, the illustrated embodiment of the method 300 comprises a step of receiving 310 one or more state signals each indicative of one or more of a vehicle characteristic, a user characteristic and an environment characteristic from the input means 140. In some embodiments, the one or more state signals are received from the sensing means 230 via the sensor output means 240. The one or more state signals may be indicative of a speed of the host vehicle or a path type of the navigable path along which the host vehicle is travelling or is arranged to travel.

In step 320 the availability signal is determined in dependence on the one or more state signals. The availability signal is indicative of an availability of an autonomous driving mode of a host vehicle. In some embodiments, the availability signal is determined as indicative that an autonomous driving mode of the host vehicle is available if the one or more state signals meet predetermined criteria. For example, the availability signal may be determined as indicative that an autonomous driving mode of the host vehicle is available if the speed of the host vehicle is less than a predetermined speed threshold and/or if the path type of the navigable path along which the host vehicle is travelling or is arranged to travel is of a predetermined path type, for example, substantially free of pedestrians.

Other navigable path type conditions which may instead or additionally be considered to determine whether to output the availability signal are the presence of temporary road barriers, such as roadworks, specific path surroundings such as bridges or tunnels, and others, the speed limit on the navigable path, the speed of other traffic on the navigable path. For example, the availability signal may be determined not to be output in the presence of temporary road barriers, such as roadworks, specific path surroundings such as bridges or tunnels, and others, the speed limit on the navigable path being above a predetermined threshold, the speed of other traffic on the navigable path being above a predetermined threshold.

Other vehicle characteristics which may instead or additionally be considered to determine whether to output the availability signal are at least one of an indication of the host vehicle condition, such as tyre pressure, oil level, fuel level, whether the host vehicle is towing, loaded weight of the host vehicle and state of health of one or more components of the host vehicle. For example, the availability signal may be determined not to be output if a tyre pressure is outside a predetermined acceptable range, an oil level is below a predetermined threshold, a fuel level is below a predetermined threshold, the host vehile is towing, a loaded weight of the host vehicle exceeds a predetermined threshold or a state of health of one or more components of the host vehicle is outside a predetermined acceptable state of health.

Other user characteristics which may instead or additionally be considered to determine whether to output the availability signal are at least one of a presence of one or more hands of the user on the steering wheel, an awareness of the user, such as a blink characteristic of the user, a physiological status of the user and a legality of the user to drive the host vehicle. For example, the availability signal may be determined not to be output in the presence of fewer than one or more hands of the user on the steering wheel, if an awareness of the user is below a predetermined awareness threshold, if a physiological status of the user is outside a predetermined acceptable physiological state of the user, or if the user is not legally entitled to drive the host vehicle.

Other environment characteristics which may instead or additionally be considered to determine whether to output the availability signal are at least one of a weather condition in the vicinity of the host vehicle or the navigable path measured in the past, at the present time, or expected in the future, a temperature and humidity. For example, the availability signal may be determined not to be output if a weather condition in the vicinity of the host vehicle at a present time is different from a predetermined acceptable weather condition, or if the weather condition is the same as a predetermined unacceptable weather condition, or if a temperature of the environment of the host vehicle is outside a predetermined acceptable temperature range, or if a humidity of the environment of the host vehicle is outside a predetermined acceptable humidity range.

In step 330, the output means 150 is controlled by the control means 120 to output the availability signal. The availability signal may be output as at least one of a tactile output (sometimes referred to as a haptic output), a visual output and an audio output to the user. In some embodiments, the availability signal is output to the notification means 220 to cause the at least one of the tactile output, the visual output and the audio output. Therefore, the availability signal causes the user to become aware that the autonomous driving mode of the host vehicle is available.

In some embodiments, the method comprises receiving a request from the user to initiate the autonomous driving mode following output of the availability signal. The method may comprise outputting a driving mode control signal to a driving mode control means. The driving mode control signal is to cause the driving mode control means to initiate the autonomous driving mode. The user may request initiation of the autonomous driving mode by one or more input devices, operable by a hand of the user. In some embodiments, the one or more input devices are switches, such as buttons, on the steering wheel of the host vehicle. The steering wheel may comprise two switches, each to be operated by a different hand of the user. Therefore, the user may request initiation of the autonomous driving mode via operation of the two switches on the steering wheel of the host vehicle after the user has been made aware of the availability of the autonomous driving mode.

In some embodiments, the method comprises determining whether to make the user aware that the autonomous driving mode is currently available in dependence on a frequency of previous activation of the autonomous driving mode of the host vehicle. In some embodiments, where the frequency of previous activation is above a first threshold, the method may determine to make the user aware that the autonomous driving mode is available in a first proportion of instances. Where the frequency of previous activation is below a second threshold (the same or below the first threshold), the method may determine to make the user aware that the autonomous driving mode is available in a second proportion of instances, different from the first proportion. In some embodiments, the second proportion is less than the first proportion. Therefore, users who infrequently make use of the autonomous driving mode are made aware only relatively infrequently that the autonomous driving mode is available, even when the other conditions for availability of the autonomous driving mode are satisfied.

In some embodiments, the method comprises initiating the autonomous driving mode via a transition phase in which control of the host vehicle moves away from the user and to a control means of the host vehicle. The method may comprise modifying a vehicle movement during the transition phase in preparation for the end of the transition phase. For example, a steering of the host vehicle may be modified during the transition phase to substantially centre the host vehicle within a lane of the navigable path. In some embodiments, a braking torque of the host vehicle may be controlled autonomously during the transition phase to substantially distance the host vehicle from a further vehicle ahead of the host vehicle along the navigable path. During the transition phase, the host vehicle will also continue to respond to movement control inputs from the user. As the transition phase progresses, the host vehicle becomes less responsive to user control until the host vehicle is controlled fully autonomously in the autonomous driving mode. The user is informed of progress through the transition phase by the transition signal described hereinbefore.

Where the autonomous driving mode is initiated via a transition phase, the autonomous driving mode may be fully initialised if the user request is maintained during the transition phase. The method may comprise determining if the user request is maintained during the transition phase. The method may comprise ceasing initiation of the autonomous driving mode if the user request is interrupted during the transition phase.

As a result of the method 300, the host vehicle can advantageously inform, via the availability signal, that the autonomous driving mode is available. In some embodiments, the host vehicle informs the user, such as the driver or other occupant of the host vehicle that the autonomous driving mode is available.

In some embodiment of the inventions disclosed herein, the autonomous driving mode may be initiated in other ways. For example, the autonomous driving mode may be initialised without first making the user aware of the availability of the autonomous driving mode, but simply in response to a request from the user to initiate the autonomous driving mode.

The operation of the autonomous driving mode will now be described.

Figure 4:
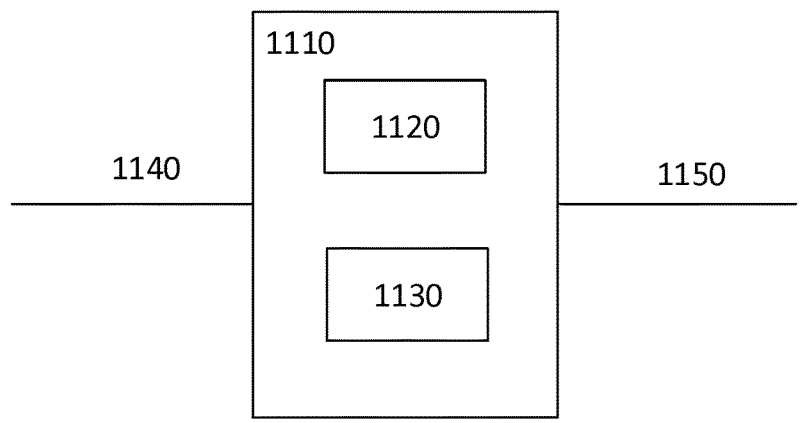
FIG. 4 shows a schematic representation of a controller in accordance with an embodiment of the present invention.

A controller 1110 or control unit 1110 in accordance with an embodiment of the present invention is shown in FIG. 4. The controller 1110 is substantially similar to the controller 110 described with reference to FIG. 1 hereinbefore apart from the hereinafter described differences.

The controller 1110 comprises a control means 1120, input means 1140 and output means 1150. In some embodiments, the controller 1110 comprises a memory means 1130 such as one or more memory devices 1130 for storing data therein. The input means 1140 may comprise an electrical input for receiving a signal in the form of a fall-back signal. The input means 1140 may comprise an electrical input for receiving a signal in the form of a keep-alive signal. Therefore, the input means 1140 may be for receiving the fall-back signal and the keep-alive signal. The fall-back signal is indicative of an action to be performed by a component associated with a host vehicle. The action is associated with a manoeuvre of the host vehicle, as will be explained. The output means 1150 may comprise an electrical output for outputting a component control signal. The component control signal is indicative of a control request to cause the component associated with the host vehicle to perform an action associated with a manoeuvre of the host vehicle. The control means 1120 may be formed by one or more electronic processing devices such as an electronic processor. The processor may operably execute computer readable instructions stored in the one or more memory devices 1130. The control means 1120 is arranged to determine if a keep-alive signal is received by the input means 1140 within a predetermined period of time from a time of receipt of a fall-back signal by the input means 1140. The control means 1120 is arranged to control the output means 1150 to output the component control signal in dependence on the fall-back signal if the keep-alive signal is not determined to be received by the input means 1140 within the predetermined period of time. Therefore, instructions for the component associated with the host vehicle, and indicated by the fall-back signal, can be used in the event that the subsequent communication of the keep-alive signal is not received within an expected time period. In some embodiments, the keep-alive signal can be another fall-back signal, comprising further instructions for the component associated with the host vehicle. In other embodiments, the keep-alive signal can be different from the fall-back signal, indicative of a control request for a component associated with the host vehicle. In embodiments where the keep-alive signal is indicative of a control request for the component associated with the host vehicle, the control request may be for an action to be performed by the component associated with the host vehicle in preference to the action indicated by the fall-back signal. In other words, in the event of a loss of the communication link to the input means 1140 of the controller 1110, the control means 1120 of the controller 1110 is arranged to implement the last received instructions indicated by the fall-back signal. In some embodiments, the fall-back signal is indicative of one or more actions to be performed by the component associated with the host vehicle, the one or more actions together associated with a manoeuvre of the host vehicle to bring the host vehicle to a stop. In some embodiments, the input means 1140 and the output means 1150 may be combined such as by being formed by an I/O unit or interface unit. For example, the controller 1110 may comprise an interface to a network forming a communication bus of the host vehicle. The interface bus may be an Internet Protocol (IP) based communication bus such as Ethernet, although embodiments of the invention are not limited in this respect.

As described hereinbefore, the component associated with the host vehicle may be a component for movement of the host vehicle. The component for movement may be a component for longitudinal motion of the host vehicle, such as a component for torque. The torque component may be a component for braking or a component for locomotion, such as a motor or engine. The component for movement may be a component for lateral motion of the host vehicle, such as a component for steering.

In some embodiments, the input means 1140 is arranged to receive a command signal indicative of a request for an action to be performed by the component associated with the host vehicle. The control means 1120 is arranged to control the output means 1150 to output the component control signal in dependence on the command signal. In some embodiments, the input means 1140 is arranged to receive the command signal via the same communication link as the keep-alive signal. In some embodiments, the keep-alive signal comprises the command signal. Therefore, the controller 1110 can be configured to receive the command signal as the keep-alive signal via the input means 1140.

In some embodiments, the input means 1140 is arranged to receive a further fall-back signal indicative of a further action to be performed by the component instead of the action indicated by the previous fall-back signal. In such examples, the keep-alive signal comprises further fall-back signal. Therefore, the controller 1110 can be configured to receive the further fall-back signal as the keep-alive signal via the input means 1140.

In some embodiments, the output means 1150 is arranged to output a further component control signal to cause a further component associated with the host vehicle to perform an action associated with the manoeuvre of the host vehicle. The control means 1120 may be arranged to control the output means 1150 to output the further component control signal in dependence on the fall-back signal if the keep-alive signal is not determined to be received by the input means 1140 within the predetermined period of time. In this example, the predetermined period of time is one second. The predetermined period of time may be indicative of a predetermined number of processing cycles for the control means 1120.

In some embodiments, the input means 1140 is arranged to receive the keep-alive signal over a first communication link, such as a FlexRay network. The output means 1150 is arranged to output the component control signal over a second communication link, such as a Controller Area Network (CAN). In particular, the second communication link is different to the first communication link. Therefore, even if there is a failure in the first communication link, the component control signal can still be sent over the second communication link. In some embodiments, the controller 1110 can be arranged to send and receive signals over both the first communication link and the second communication link. In other words, the input means 1140 may be arranged to receive signals over the first communication link and the second communication link, and the output means 1150 may be arranged to output signals over the first communication link and the second communication link.

In some embodiments, the control means 1120 is arranged to generate a plurality of component control signals. Each of the plurality of component control signals are to cause the component of the host vehicle to perform a different portion of the action indicated by the fall-back signal. The plurality of component control signals are generated in dependence on the fall-back signal. The control means 1120 is arranged to control the output means 1150 to output each of the plurality of component control signals. Therefore, a manoeuvre of the host vehicle which requires a plurality of actions by one or more components of the host vehicle can be performed if the keep-alive signal is not received by the input means 1140 within the predetermined period of time. In some embodiments, the plurality of component control signals are output in sequence. In some embodiments, the plurality of component control signals are each output separately.

In some embodiments, the action of the component is associated with a stopping manoeuvre of the host vehicle. The stopping manoeuvre may be performed over a distance greater than a minimum stopping distance of the host vehicle. Therefore, the host vehicle may be brought to a stop if the keep-alive signal is not received by the input means 1140 within the predetermined period of time.

Figure 5:
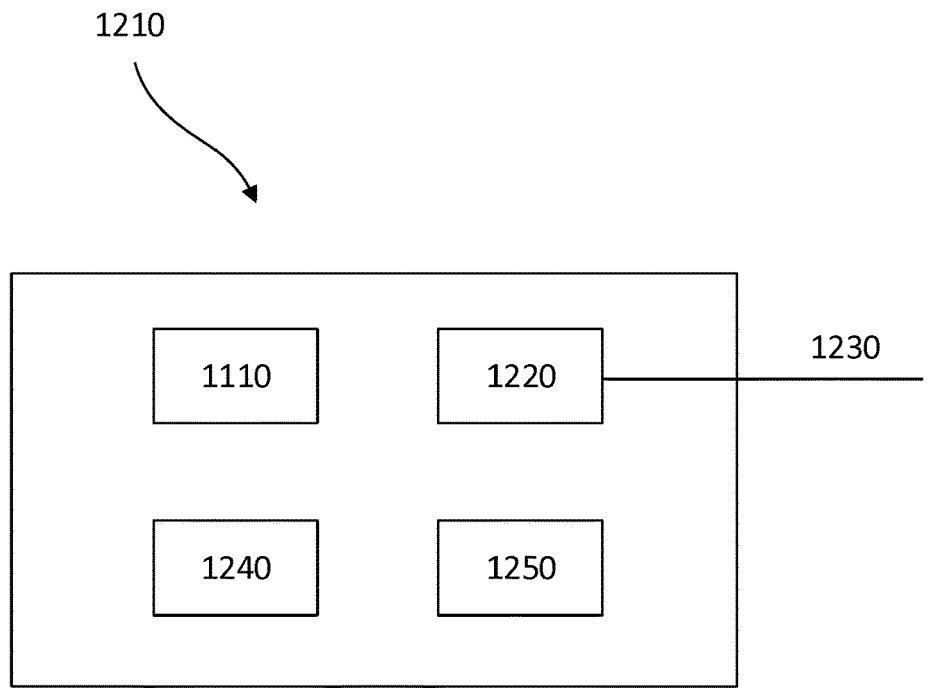
FIG. 5 shows a schematic representation of a system incorporating a controller in accordance with an embodiment of the present invention.

A system 1210 in accordance with an embodiment of the invention is shown in FIG. 5.

The system 1210 comprises the controller 1110 as described hereinbefore with reference to FIG. 1, as a first controller 1110 and a second controller 1220. The first controller 1110 is arranged to receive the fall-back signal as described hereinbefore. The first controller 1110 is arranged to output the component control signal as described hereinbefore. The second controller 1220 is arranged to generate the fall-back signal to be received by the first controller 1110. In some embodiments, the system 1210 comprises input means 1230 for receiving one or more state signals. The second controller 1220 is arranged to generate the fall-back signal in dependence on the one or more state signals received from the input means 1230. The one or more state signals are each indicative of at least one of a vehicle characteristic, a user characteristic and an environment characteristic. In some embodiments, the one or more state signals are together indicative of a speed of the host vehicle and a speed and relative location of one or more objects in the vicinity of the host vehicle. The one or more objects in the vicinity of the host vehicle may be stationary objects or moving objects, such as other vehicles.

In some embodiments, the system 1210 comprises component control means 1240. The component control means 1240 is arranged to control the component associated with the host vehicle to perform the action associated with the manoeuvre of the host vehicle in dependence on the component control signal.

In some embodiments, the system 1210 comprises further component control means 1250 arranged to control the further component associated with the host vehicle to perform an action associated with the manoeuvre of the host vehicle. In some embodiments, the further component is of a different type to the component. In other embodiments, the further component is of the same type as the component. Therefore, the system 1210 can control multiple components with the same first controller 1110.

Figure 6:
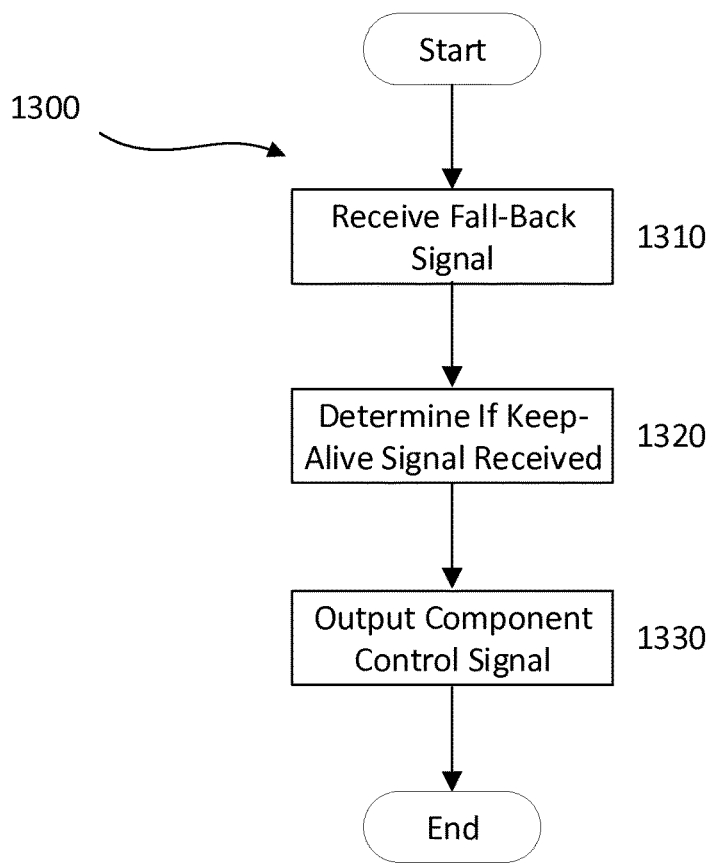
FIG. 6 shows a flow diagram illustrating a method in accordance with an embodiment of the present invention.

A method 1300 according to an embodiment of the invention is shown in FIG. 6. The method 1300 is a method of controlling the host vehicle. In particular, the method 1300 is a method of controlling the output of a component control signal to cause a component associated with the host vehicle to perform an action associated with a manoeuvre of the host vehicle. The method 1300 may be performed by the controller 1110 and the system 1210 described hereinbefore with reference to FIGS. 4 and 5.

The method 1300 broadly comprises steps of receiving 1310 a fall-back signal indicative of an action to be performed by a component of the host vehicle, determining 1320 is a keep-alive signal is received within a predetermined period of time from a time of receipt of the fall-back signal, and outputting 1330 a component control signal in dependence on the fall-back signal if the keep-alive signal is not received within the predetermined period of time.

Referring to FIG. 6, the illustrated embodiment of the method 1300 comprises a step of receiving 1310 a fall-back signal indicative of an action to be performed by a component associated with a host vehicle, the action associated with a manoeuvre of the host vehicle. In some embodiments, the fall-back signal is received via an input means 1140 of the controller 1110. The fall-back signal may be determined in dependence on one or more state signals each indicative of at least one of a vehicle characteristic, a user characteristic and an environment characteristic.

In step 1320, it is determined if a keep-alive signal is received within a predetermined period of time from a time of receipt of the fall-back signal. The keep-alive signal is indicative of a continued operation of a communication link for receiving the keep-alive signal. In some embodiments, the predetermined period of time is less than one second. In some embodiments, the keep-alive signal is indicative of a continued operation of a communication link for receiving the fall-back signal.

In step 1330, a component control signal is output in dependence on the fall-back signal and if the keep-alive signal is not received within the predetermined period of time. The component control signal is configured to cause the component associated with the host vehicle to perform the action associated with the manoeuvre of the host vehicle.

In some embodiments, if the keep-alive signal is not received within the predetermined period of time, the component control signal output. The component control signal is determined in dependence on the fall-back signal.

Figure 7:
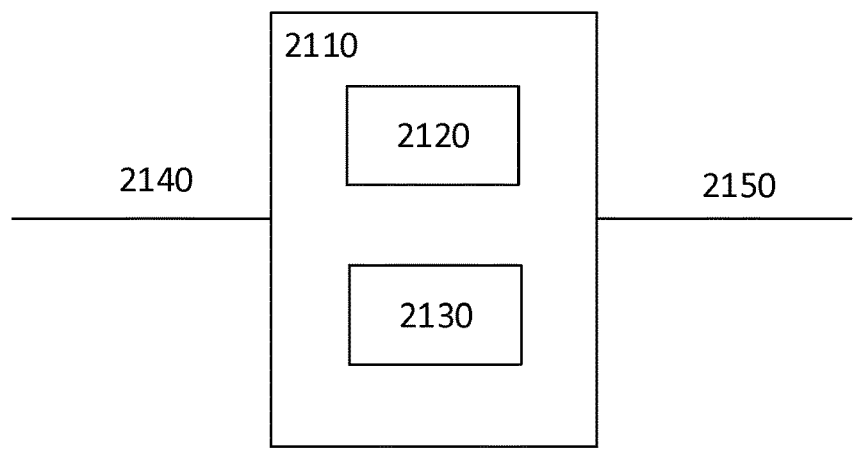
FIG. 7 shows a schematic representation of a controller in accordance with an embodiment of the present invention.

A further aspect of the operation of the autonomous driving mode will now be described. A controller 2110 or control unit 2110 in accordance with an embodiment of the invention is shown in FIG. 7.

The controller 2110 is associated with a host vehicle travelling at a host vehicle speed in a first lane of a multi-lane navigable path, and comprises a control means 2120, input means 2140 and output means 2150. In some embodiments, the controller 2110 comprises a memory means 2130 such as one or more memory devices 2130 for storing data therein. The input means 2140 may comprise an electrical input for receiving a signal in the form of a second speed signal. The second speed signal is indicative of a further vehicle speed of a further vehicle in a second lane of the multi-lane navigable path. In some embodiments, the electrical input is also for receiving a signal in the form of a first speed signal. The first speed signal is indicative of the host vehicle speed of the host vehicle travelling in the first lane of the multi-lane navigable path. The output means 2150 may comprise an electrical output for outputting a speed change signal. The speed change signal is to cause the host vehicle to control a speed of the host vehicle from the host vehicle speed towards the further vehicle speed. The control means 2120 may be formed by one or more electronic processing devices such as an electronic processor. The processor may operably execute computer readable instructions stored in the one or more memory devices 2130. The control means 2120 is arranged to control the output means 2150 to output the speed change signal in dependence on the second speed signal. Therefore, the speed of the host vehicle can be changed in dependence on the speed of traffic in a different lane to the host vehicle, for example, in preparation for a lane-change manoeuvre of the host vehicle. In some embodiments, the input means 2140 and the output means 2150 may be combined such as by being formed by an I/O unit or interface unit. For example, the controller 2110 may comprise an interface to a network forming a communication bus of the host vehicle. The interface bus may be an Internet Protocol (IP) based communication bus such as Ethernet, although embodiments of the invention are not limited in this respect.

In some embodiments, the second speed signal is indicative of a relative speed of the further vehicle to the host vehicle. In other embodiments, the second speed signal is indicative of an absolute speed of the further vehicle relative to the navigable path.

In some embodiments, the control means 2120 is arranged to determine the speed change signal in dependence on the second speed signal. For example, the speed change signal may be indicative of a further speed to which the speed of the host vehicle should be changed. The further speed may be determined in dependence on the second speed signal. In some embodiments, the further speed is the further vehicle speed. In some embodiments, the control means 2120 is arranged to determine the speed change signal in dependence on the first speed signal, as well as the second speed signal. In some embodiments, the control means 2120 is arranged to determine the speed change signal if the second speed signal (and optionally the first speed signal) is indicative of the further vehicle speed differing from the host vehicle speed by more than a predetermined threshold.

In some embodiments, the speed change signal is to cause the host vehicle to accelerate. In some embodiments, the speed change signal is to cause the host vehicle to decelerate. In some embodiments, the speed change signal is to cause the host vehicle to decelerate and subsequently accelerate. Therefore, when the host vehicle is following another vehicle in the first lane, a distance between the host vehicle and the other vehicle in the first lane can first be increased by deceleration of the host vehicle, giving the host vehicle sufficient room to accelerate before moving into the second lane.

In some embodiments, the input means 2140 is arranged to receive a space availability signal. The space availability signal is indicative of a presence of a space in front of or behind the further vehicle. A size of the space is sufficient to accommodate the host vehicle. The control means 2120 is arranged to cause the output means 2150 to output the speed change signal in dependence on the space availability signal. Therefore, in some embodiments, the speed change signal can be output if there is a space of sufficient size to accommodate the host vehicle in front of or behind the further vehicle in the second lane. In some embodiments, the control means 2120 is arranged to determine if the space availability signal is indicative of the presence of the space in front of or behind the further vehicle of the size sufficient to accommodate the host vehicle. A space may be determined to be of sufficient size to accommodate the host vehicle in dependence on the speed of the further vehicle and/or the speed of the host vehicle. Therefore, if the identified space is of a sufficient size, given the speed of the host vehicle and/or the further vehicle, the speed change signal may be output by the output means 2150. In some embodiments, the control means 2120 may be arranged to determine the size of the space in dependence on the first speed signal, the second speed signal and the space availability signal.

In some embodiments, the space is an expected space. In other words, the space availability signal is indicative of the presence of the expected space at a predetermined future time point. In another embodiment, the space is a current space, that is the space availability signal is indicative of the presence of the current space at a current time point.

In some embodiments, the speed change signal is to cause the host vehicle to control the speed of the host vehicle towards the further vehicle speed while the host vehicle is travelling in the first lane. In other words, the host vehicle at least initiates a change of speeds whilst travelling in the first lane. In some embodiments, the speed change signal is to cause the host vehicle to move from the first lane to the second lane. The host vehicle may move from the first lane to the second lane at a speed different from the host vehicle speed.

In some embodiments, the second speed signal is indicative of an average speed of a plurality of further vehicles in the second lane. The second speed signal may be indicative of an average speed of a subset of the plurality of further vehicles in the second lane.

In some embodiments, the control means 2120 is arranged to determine if the second speed signal is indicative of a further vehicle speed being different to the host vehicle speed. The control means 2120 is arranged to cause the output means 2150 to output the speed change signal in dependence on determining if the second speed signal is indicative of the further vehicle speed being different to the host vehicle speed. For example, the control means 2120 is arranged to cause the output means 2150 to output the speed change signal if the second speed signal is indicative of the further vehicle speed being different to the host vehicle speed by a predetermined threshold. In some embodiments, the control means 2120 is arranged to cause the output means 2150 to output the speed change signal if the second speed signal is indicative of the further vehicle speed being greater than the host vehicle speed by the predetermined threshold.

In some embodiments, the input means 2140 is for receiving a request signal. The request signal is indicative of a request by a user of the host vehicle to move the host vehicle into the second lane. The control means 2120 is arranged to cause the output means 2150 to output the speed change signal in dependence on the request signal. In other words, the speed of the host vehicle may be changed from the host vehicle speed towards the further vehicle speed in response to the request from the user to move the host vehicle into the second lane.

In some embodiments, the output means 2150 is arranged to output a notification signal. The notification signal is to cause a notification means in the form of a notification output device, such as a notification display, of the host vehicle to indicate that the host vehicle will move into the second lane. The control means 2120 is arranged to control the output means 2150 to output the notification signal in dependence on the second speed signal.

Figure 8:
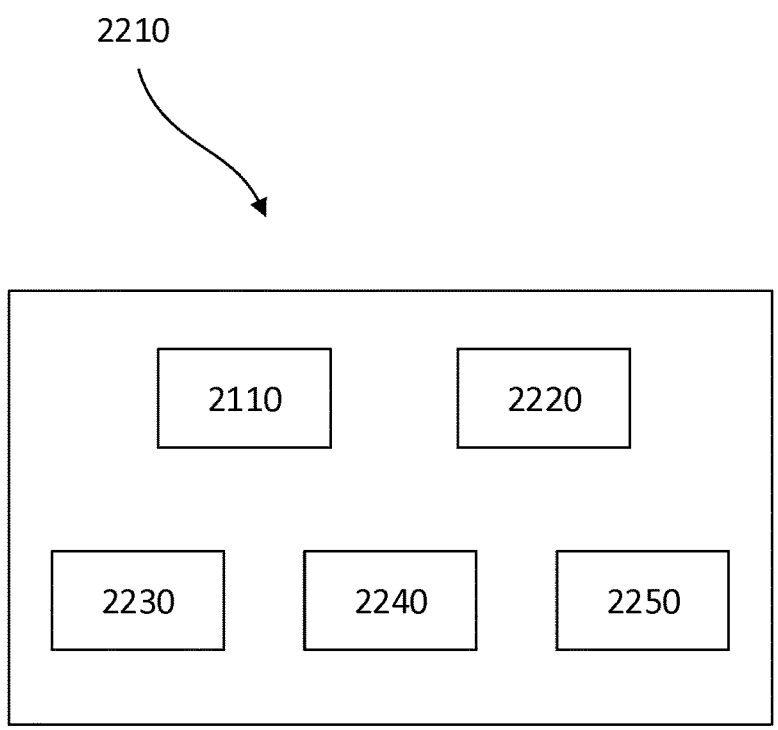
FIG. 8 shows a schematic representation of a system incorporating a controller in accordance with an embodiment of the present invention.

A system 2210 in accordance with an embodiment of the invention is shown in FIG. 8.

The system 2210 comprises the controller 2110 as described hereinbefore with reference to FIG. 7, sensing means 2220 and actuator means 2230. In some embodiments, the system 2210 comprises an indicator switch 2240 and notification means 2250. The controller 2110 is arranged to output the speed control signal as described hereinbefore. In some embodiments, the sensing means 2220 is in the form of a sensor unit 2220. The sensing means 2220 is for detecting the further vehicle speed of the further vehicle. In some embodiments, the sensing means 2220 is for detecting the further vehicle speed of a plurality of further vehicles. In some embodiments, the sensing means 2220 is for detecting the further vehicle speed of a plurality of further vehicles travelling in one or more of the ego lane and an adjacent lane to the lane in which the host vehicle is travelling. The sensing means 2220 is arranged to output the second speed signal to the controller in dependence on the further vehicle speed. In some embodiments, the actuator means 2230 is in the form of an actuator. The actuator means 2230 is for receiving the speed change signal from the controller 2110 and is to cause the host vehicle to change speeds from the host vehicle speed towards the further vehicle speed. The indicator switch 2240 is for receiving the request from the user of the host vehicle to move from the first lane to the second lane. The indicator switch 2240 is arranged to output the request signal to the controller 2110 in dependence on receiving the request from the user of the host vehicle to move from the first lane to the second lane. In some embodiments, the notification means 2250 is in the form of a notification output device, such as an electronic display device. The notification means 2250 is for receiving the notification signal and is arranged to indicate that the host vehicle will move into the second lane in dependence on the notification signal. In some embodiments, the notification means 2250 comprises an indicator light. In some embodiments, the system 2210 is configured to be operating in an autonomous driving mode when the controller 2110 outputs the speed change signal.

Figure 9:
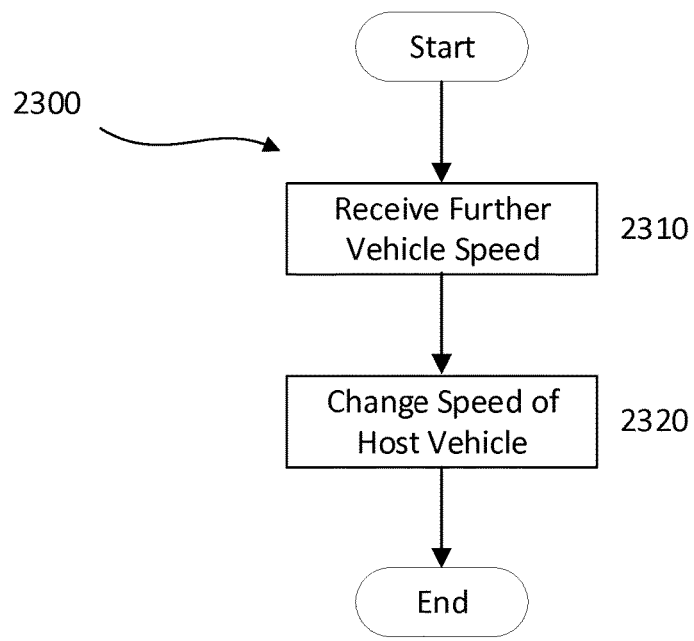
FIG. 9 shows a flow diagram illustrating a method in accordance with an embodiment of the present invention.

A method 2300 in accordance with an embodiment of the invention is shown in FIG. 9. The method 2300 is a method of controlling the host vehicle. In particular, the method 2300 is a method of controlling a speed of the host vehicle in dependence on a further vehicle speed of a further vehicle travelling in a different lane to the host vehicle. The method 2300 may be performed by the controller 2110 and system 2210 described hereinbefore with reference to FIGS. 7 and 8.

The method 2300 broadly comprises the steps of receiving 2310 a further vehicle speed of a further vehicle in a second lane of a multi-lane navigable path and, in dependence thereon, changing 2320 a speed of the host vehicle from a host vehicle speed towards the further vehicle speed.

Referring to FIG. 9, the illustrated embodiment of the method 2300 comprises a step of receiving 2310, at a host vehicle travelling at a host vehicle speed in a first lane of a multi-lane navigable path, a further vehicle speed of a further vehicle in a second lane of the multi-lane navigable path. In some embodiments, the further vehicle speed is indicated by a second speed signal received from sensing means 2220 at the controller 2110.

In step 2320, the speed of the host vehicle is changed from the host vehicle speed towards the further vehicle speed in dependence on the further vehicle speed. In some embodiments, the further vehicle speed is a relative speed of the further vehicle to the host vehicle. In some embodiments, the speed of the host vehicle is changed in dependence on the host vehicle speed and the further vehicle speed.

In some embodiments, the step 2320 of changing the speed of the host vehicle is performed in dependence on whether the further vehicle speed is different to the host vehicle speed by more than a predetermined threshold. For example, the step 2320 of changing the speed of the host vehicle may be performed if the further vehicle speed exceeds the host vehicle speed by at least the predetermined threshold.

In some embodiments, the method 2300 comprises receiving the host vehicle speed of the host vehicle, and the step 2320 of changing the speed of the host vehicle is performed in dependence on the host vehicle speed and the further vehicle speed.

In some embodiments, the method 2300 comprises receiving a request by a user of the host vehicle to move the host vehicle into the second lane. In some embodiments, the step 2320 of changing the speed of the host vehicle from the host vehicle speed towards the further vehicle speed is performed in dependence on the received request by the user.

In some embodiments, the method 2300 comprises indicating that the host vehicle will move into the second lane.

In some embodiments, the method 2300 comprises receiving an indication of a presence of a space in front of or behind the further vehicle, the space having a size sufficient to accommodate the host vehicle. The step 2320 of changing the speed of the host vehicle may be performed in dependence on the received indication of the presence of the space.

In some embodiments, the method 2300 comprises determining if the size of the space is sufficient to accommodate the host vehicle in dependence on the host vehicle speed and the further vehicle speed. The step 2320 of changing the speed of the host vehicle may be performed if the size of the space is determined to be sufficient to accommodate the host vehicle therein.

In some embodiments, the second lane is adjacent the first lane. In some embodiments, the host vehicle and the further vehicle are travelling in the same direction.

Figure 10:
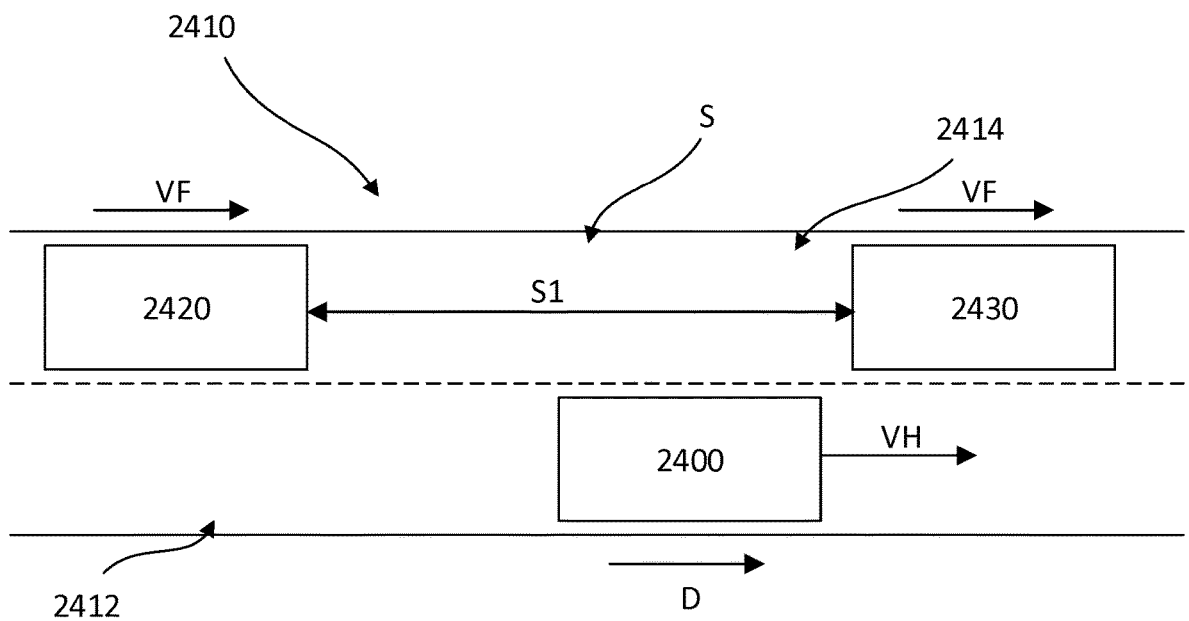
FIG. 10 shows a schematic representation of a situation in which an embodiment of the present invention can have utility.

A host vehicle 2400 in accordance with an embodiment of the invention is shown in FIG. 10. The host vehicle 2400 comprises the controller 2110 and the system 2210 and is arranged to perform the method 2300 thereon. Referring to FIG. 10, the illustrated embodiment of the host vehicle 2400 is travelling on a multi-lane navigable path 2410 in the form of a multi-lane highway road 2410. The multi-lane navigable path 2410 comprises a first lane 2412 and a second lane 2414. The host vehicle 2400 is travelling in the first lane of the multi-lane navigable path 2410. At least one further vehicle 2420, 2430 in the form of a first further vehicle 2420 and a second further vehicle 2430 are travelling in the second lane 2414 of the multi-lane navigable path 2410. A space S is provided between the first further vehicle 2420 and the second further vehicle 2430. Each of the host vehicle 2400 and the at least one further vehicle 2420, 2430 are travelling in direction D along the navigable path 2410. In this way, the space S is provided in front of the first further vehicle 2420 and is provided behind the second further vehicle 2430. The space has a size S1. The host vehicle 2410 is moving in the first lane at a speed VH. The at least one further vehicle 2420, 2430 are moving in the second lane 2414 at a speed VF. In this example, the speed VF is an average of the speed of the first further vehicle 2420 and the speed of the second further vehicle 2430. In this particular example, the first further vehicle 2420 and the second further vehicle 2430 are both moving in the second lane 2414 at the speed VF. The speed VF of the at least one further vehicle 2420, 2430 and the speed VH of the host vehicle 2410 are different, such that the host vehicle 2410 is moving relative to the at least one further vehicle 2420, 2430. In this example, the speed VH is slower than the speed VF. The host vehicle 2400 changes speed from the speed VH to move towards the speed VF of the at least one further vehicle 2420, 2430. Therefore, the host vehicle 2400 can move into the space S at a speed closer to the speed VF of the at least one further vehicle 2420, 2430 than the original speed VH of the host vehicle 2400. As described hereinbefore, the host vehicle 2400 may move out of the first lane 2412 and into the space S in the second lane 2414 autonomously. The host vehicle 2400 may determine if the size S1 of the space S is sufficient to accommodate the host vehicle 2400.

Figure 11:
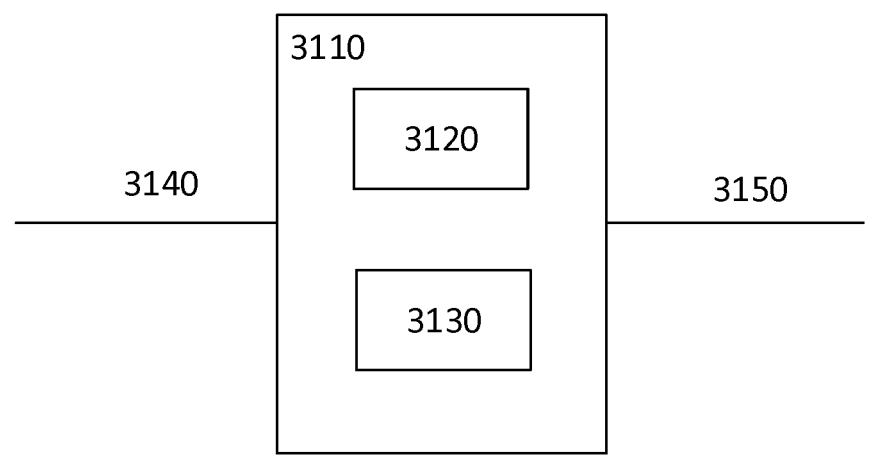
FIG. 11 shows a schematic representation of a controller in accordance with an embodiment of the present invention.

A further aspect of the operation of the autonomous driving mode will now be described. In particular, in one embodiment, there follows a description of a disengagement of the autonomous driving mode. A controller 3110 or control unit 3110 in accordance with an embodiment of the invention is shown in FIG. 11.

The controller 3110 is associated with a host vehicle for operating in an autonomous driving mode, and comprises a control means 3120, input means 3140 and output means 3150. In some embodiments, the controller 3110 comprises a memory means 3130 such as one or more memory devices 3130 for storing data therein. The input means 3140 may comprise an electrical input for receiving a signal in the form of a first request signal. The first request signal is indicative of a first request from a user of the host vehicle to transition the host vehicle out of the autonomous driving mode. In some embodiments, the electrical input is also for receiving a signal in the form of a second request signal. The second request signal is indicative of a second request from the user of the host vehicle to transition the host vehicle out of the autonomous driving mode. The output means 3150 may comprise an electrical output for outputting a first transition signal. The first transition signal is to cause the host vehicle to transition out of the autonomous driving mode. The control means 3120 may be formed by one or more electronic processing devices such as an electronic processor. The processor may operably execute computer readable instructions stored in the one or more memory devices 3130.

The control means 3120 is arranged to cause the output means 3150 to output the first transition signal in dependence on the first request signal and the second request signal. Therefore, both a first request and a second request from the user are required to transition the host vehicle out of the autonomous driving mode. In some embodiments, the input means 3140 and the output means 3150 may be combined such as by being formed by an I/O unit or interface unit. For example, the controller 3110 may comprise an interface to a network forming a communication bus of the host vehicle. The interface bus may be an Internet Protocol (IP) based communication bus such as Ethernet, although embodiments of the invention are not limited in this respect.

In some embodiments, the input means 3140 is for receiving a further request signal. The further request signal is indicative of a further request from the user to transition out of the autonomous driving mode. The output means 3150 is for outputting a second transition signal. The second transition signal is to cause the host vehicle to transition from the autonomous driving mode to a further driving mode in a shorter period of time than with the first transition signal. The control means 3120 is arranged to cause the output means 3150 to output the second transition signal in dependence on the further request signal and in dependence on a determination that the first request signal is indicative of the first request from the user to transition out of the autonomous driving mode and that the second request signal is indicative of the second request from the user to transition out of the autonomous driving mode. Therefore, when the user has already initiated transition out of the autonomous driving mode by making the first request and the second request, the process may be completed more quickly by additionally making the further request to transition out of the autonomous driving mode.

In some embodiments, the further request from the user comprises a vehicle movement request, such as at least one of a steering request and a torque request, for example a braking request or an acceleration request.

In some embodiments, the control means 3120 is arranged to determine if the first request signal is indicative of the first request from the user having a duration of at least a predetermined first threshold. The control means 3120 is arranged to cause the output means 3150 to output the first transition signal if the first request signal is indicative of the duration of the first request from the user being at least the predetermined first threshold. In this example, the predetermined first threshold is three seconds, but can be different.

In some embodiments, the control means 3120 is arranged to determine if the second request signal is indicative of the second request from the user having a duration of at least a predetermined second threshold. The control means 3120 is arranged to cause the output means 3150 to output the first transition signal if the second request signal is indicative of the duration of the second request from the user being at least the predetermined second threshold. In this example, the predetermined second threshold is the same as the predetermined first threshold.

In some embodiments, the control means 3120 is arranged to determine if the first request signal and the second request signal are received concurrently. The control means 3120 is arranged to cause the output means 3150 to output the first transition signal if the first request signal and the second request signal are received concurrently. In some embodiments, the first request signal and the second request signal are determined to be received concurrently if the first request signal and the second request signal are indicative of a first request from the user overlapping, at least partially with a second request from the user.

Figure 12:
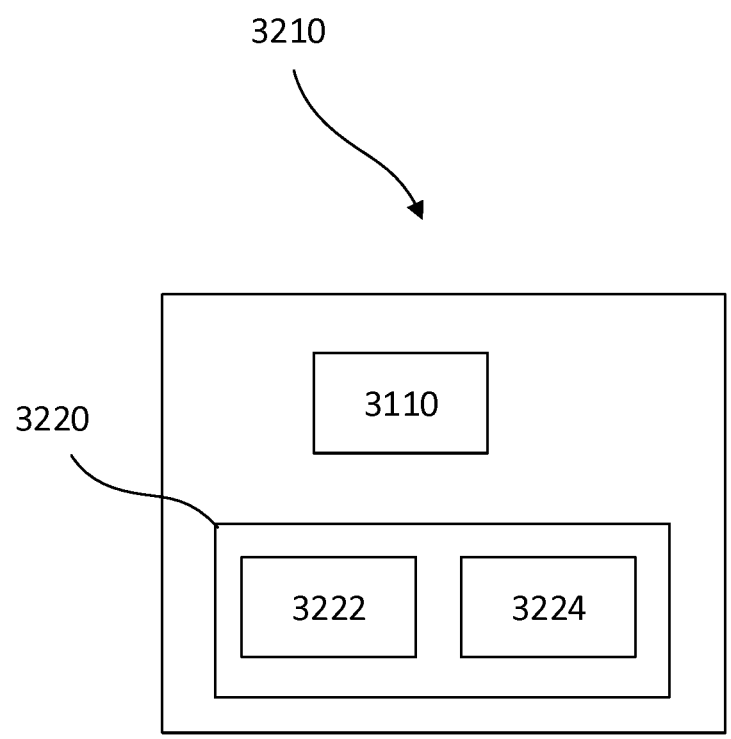
FIG. 12 shows a schematic representation of a system incorporating a controller in accordance with an embodiment of the present invention.

A system 3210 in accordance with an embodiment of the invention is shown in FIG. 12.

The system 3210 comprises the controller 3110 as described hereinbefore with reference to FIG. 11, and an input apparatus 3220. In some embodiments, the input apparatus 3220 comprises a first input apparatus 3222 and a second input apparatus 3224. As described hereinbefore, the controller 3110 is arranged to output the first transition signal. The input apparatus 3220 is operable by the user to output the first request signal to the controller 3110. The input apparatus 3220 is operable separately by the user to output the second request signal to the controller 3110. Therefore, the input apparatus 3220 may be for receiving the first request from the user to transition out of the autonomous driving mode and may be for receiving the second request from the user to transition out of the autonomous driving mode. In some embodiments, the input apparatus 3220 is arranged to be provided at a steering-control in the form of a steering wheel of the host vehicle. Where the input apparatus 3220 comprises the first input apparatus 3222 and the second input apparatus 3224, at least one of the first input apparatus 3222 and the second input apparatus 3224 may be provided at the steering-control of the host vehicle. In some embodiments, both the first input apparatus 3222 and the second input apparatus 3224 are arranged to be associated with the steering-control of the host vehicle. In some embodiments, the first input apparatus 3222 comprises a first input device 3222 in the form of a first push-button switch 3222. In some embodiments, the second input apparatus 3224 comprises a second input device 3224 in the form of a second push-button switch 3224. In some embodiments, the input apparatus 3220 is operable by a first hand of the user to output the first request signal and operable by a second hand of the user to output the second request signal. In some embodiments, the input apparatus 3220 is configured to be operable by the hands of the user when the hands of the user are on the steering-control of the host vehicle. In some embodiments, the input apparatus 3220 is operable by the thumb of the first hand of the user when the first hand is on the steering-control to output the first request signal. The input apparatus 3220 is operable by the thumb of the second hand of the user when the second hand is on the steering-control to output the second request signal. In embodiments, the input apparatus is arranged in a central portion of the steering-control, away from a rim portion of the steering-control.

Figure 13:
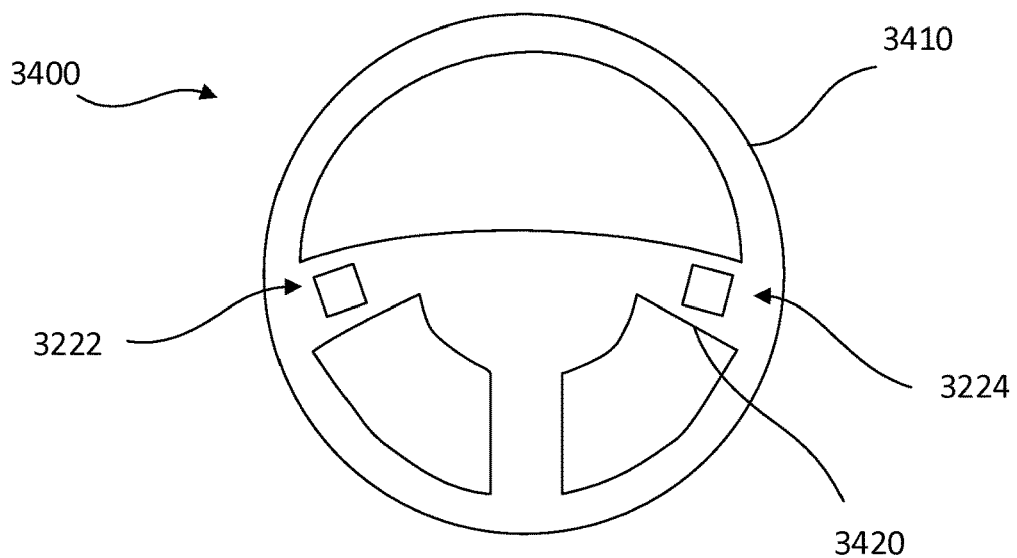
FIG. 13 shows a steering control in accordance with an embodiment of the present invention.

A steering-control 3400 in the form of a steering wheel 3400 in accordance with an embodiment of the invention is shown in FIG. 13. The steering-control 3400 is generally circular in profile and comprises a rim portion 3410 and a central portion 3420 within the rim portion 3410. As is well-known, in use of the steering-control 3400, the hands of the user rotate the steering-control 3400 by engagement with the rim portion 3410 of the steering-control 3400. As described previously, the steering-control 3400 is provided with the first input apparatus 3222 and the second input apparatus 3224. In this example, the first input apparatus 3222 and the second input apparatus 3224 are arranged in the central portion 3420 of the steering-control 3400.

Figure 14:
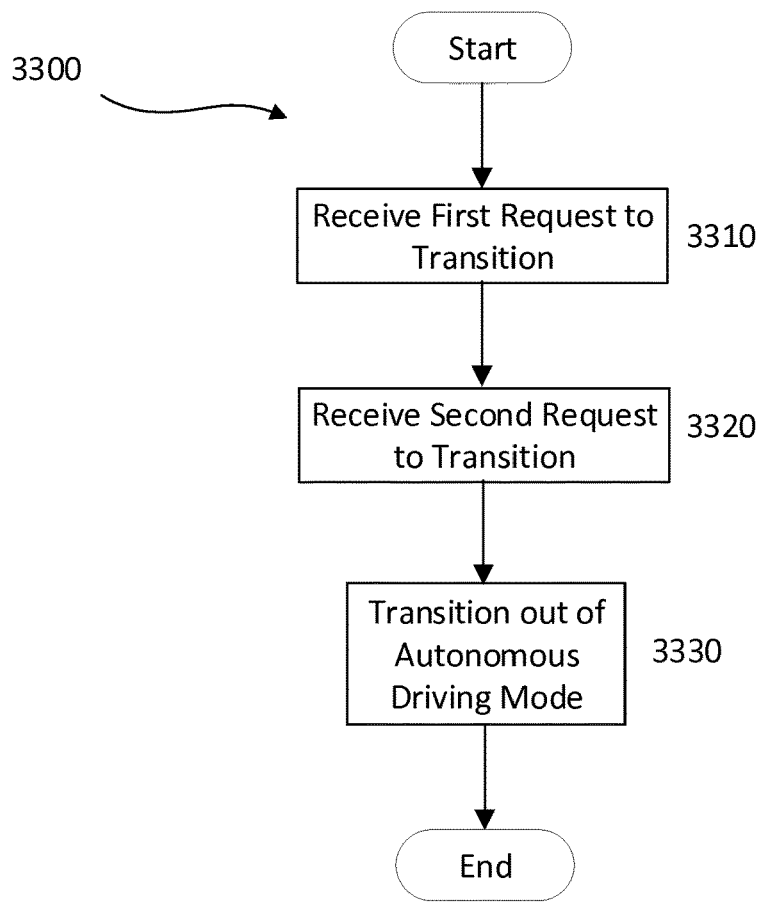
FIG. 14 shows a flow diagram illustrating a method in accordance with an embodiment of the present invention.

A method 3300 in accordance with an embodiment of the invention is shown in FIG. 14. The method 3300 is a method of controlling the host vehicle. In particular, the method 3300 is a method of controlling a transition out of an autonomous driving mode of the host vehicle in dependence on a first request of the user to transition out of the autonomous driving mode and a second request of the user to transition out of the autonomous driving mode. The method 3300 may be performed by the controller 3110 and system 3210 described hereinbefore with reference to FIGS. 11 and 12.

The method 3300 broadly comprises the steps of receiving 3310, 3320 a first request and a second request from the user to transition out of the autonomous driving mode and, in dependence thereon, outputting 3330 a first transition request to cause the host vehicle to transition out of the autonomous driving mode.

Referring to FIG. 14, the illustrated embodiment of the method 3300 comprises a step of receiving 3310 a first request from a user of the host vehicle to transition out of an autonomous driving mode of the host vehicle. In some embodiments, the first request is received via an input apparatus 3220 on a steering-control 3400 of the host vehicle.

In step 3320, a second request from the user of the host vehicle to transition out of the autonomous driving mode is received. In some embodiments, the second request is received from the input apparatus 3220 on the steering-control 3400 of the host vehicle.

In step 3330, the transition request to cause the host vehicle to transition out of the autonomous driving mode is output in dependence on the first request and the second request. In some embodiments, the method 3300 comprises transitioning out of the autonomous driving mode. In some embodiments, the method comprises determining is at least one of the first request and the second request have a duration of at least a predetermined threshold. The transition request is output if at least one, or in some embodiments both, of the first request and the second request have a duration of at least the predetermined threshold. In some embodiments, the method 3300 comprises determining if the first request and the second request are received concurrently. The transition request is output if the first request and the second request are received concurrently. In some embodiments, the method 3300 determines that the first request and the second request are received concurrently if the first request and the second request overlap at least partially.

Figure 15:
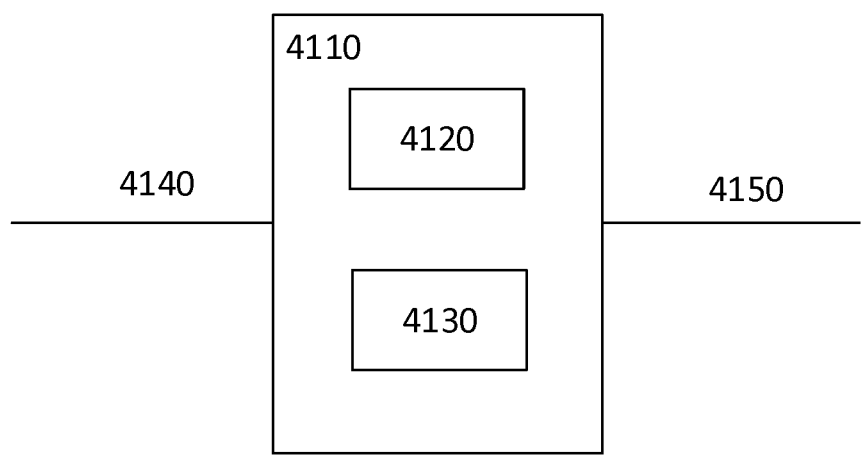
FIG. 15 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 4110 or control unit 4110 in accordance with an embodiment of the invention is shown in FIG. 15.

The controller 4110 is associated with a host vehicle for operating in an autonomous driving mode, and comprises a control means 4120, input means 4140 and output means 4150. In some embodiments, the controller 4110 comprises a memory means 4130 such as one or more memory devices 4130 for storing data therein. The input means 4140 may comprise an electrical input for receiving a signal in the form of a request signal. The request signal is indicative of a request from a user of the host vehicle to transition the host vehicle out of the autonomous driving mode. The electrical input is also for receiving a signal in the form of a capability signal. The capability signal is indicative of a capability of the user to take control of the host vehicle after the host vehicle has transitioned out of the autonomous driving mode. The output means 4150 may comprise an electrical output for outputting a transition signal. The transition signal is to cause the host vehicle to transition out of the autonomous driving mode. The control means 4120 may be formed by one or more electronic processing devices such as an electronic processor. The processor may operably execute computer readable instructions stored in the one or more memory devices 4130. The control means 4120 is arranged to cause the output means 4150 to output the transition signal in dependence on the request signal and the capability signal. Therefore, in this example, the host vehicle will transition out of the autonomous driving mode in dependence on both the request from the user and the capability of the user to take control of the host vehicle after the host vehicle has transitioned out of the autonomous driving mode. In some embodiments, the input means 4140 and the output means 4150 may be combined such as by being formed by an I/O unit or interface unit. For example, the controller 4110 may comprise an interface to a network forming a communication bus of the host vehicle. The interface bus may be an Internet Protocol (IP) based communication bus such as Ethernet, although embodiments of the invention are not limited in this respect.

In some embodiments, the control means 4120 is arranged to determine the capability of the user to take control of the host vehicle in dependence on the capability signal. The control means 4120 is arranged to determine that the user is requesting to transition out of the autonomous driving mode in dependence on the request signal. The control means 4120 is arranged to cause the output means 4150 to output the transition signal if the user is determined to be requesting to transition out of the autonomous driving mode and if the user is determined to be capable to take control of the host vehicle.

In some embodiments, the control means 4120 is arranged to prevent the output means 4150 from outputting the transition signal if the user is determined to be incapable of taking control of the host vehicle.

In some embodiments, the user may be determined to be capable of taking control of the host vehicle based on an awareness level of the user. In other words, the capability signal is indicative of an awareness level of the user. In some embodiments, the awareness level is a numerical scale, for example from 0 to 10, where 0 is not aware at all, such as asleep, and 10 is fully aware. In some embodiments, the capability signal is indicative of a gaze state of the user. The gaze state may comprise a blink characteristic of the user, and/or a pupil characteristic, such as a pupil movement characteristic, and/or a gaze direction of the user. In other words, in some examples, the user may be determined to be capable to take control of the host vehicle in dependence on the gaze direction of the user.

In some embodiments, the user may be determined to be incapable of taking control of the host vehicle based on the awareness level of the user.

In some embodiments, the capability signal is indicative of one or more images of an eye of the user. The control means 4120 is arranged to determine the capability of the user to take control of the host vehicle in dependence on a blink characteristic of the eye of the user. The blink characteristic of the eye of the user is determined in dependence on the one or more images of the eye.

In some embodiments, the request signal is indicative of an input by the user to an input apparatus to request transition out of the autonomous driving mode. In some examples, the input by the user may be a tactile input, such as a button-press.

Figure 16:
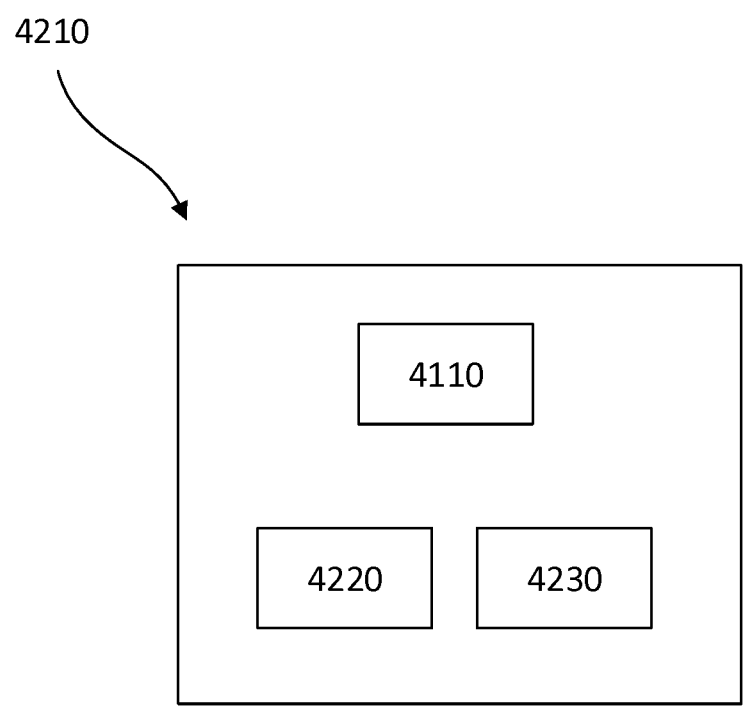
FIG. 16 shows a schematic representation of a system incorporating a controller in accordance with an embodiment of the present invention.

A system 4210 in accordance with an embodiment of the invention is shown in FIG. 16.

The system 4210 comprises the controller 4110 as described herein with reference to FIG. 15, a first sensing means 4220 in the form of a first sensor 4220 and a second sensing means 4230 in the form of a second sensor 4230. The controller 4110 is arranged to output the transition signal as described hereinbefore. The first sensor 4220 is responsive to the request from the user to transition out of the autonomous driving mode of the host vehicle. The first sensor 4220 is arranged to output the request signal to the controller 4110 in dependence on the request from the user. The second sensor 4230 is responsive to the capability of the user to take control of the host vehicle after the host vehicle has transitioned out of the autonomous driving mode. The second sensor 4230 is arranged to output the capability signal to the controller 4110 in dependence on the capability of the user.

In some embodiments, the first sensor 4220 comprises an input device 4220. The input device 4220 is operable by a hand of the user to generate the request signal. In some embodiments, the input device 4220 is arranged to be provided at a steering wheel of the host vehicle, for example as shown in FIG. 13 in relation to the input apparatus 3220 described with reference to FIG. 12. Similarly, in some embodiments, the input device 4220 of the present embodiment comprises two buttons.

In some embodiments, the second sensor 4230 comprises a touch sensor 4230. The touch sensor 4230 is arranged to detect a presence of a hand of the user on the steering wheel of the host vehicle. In some embodiments, the touch sensor 4230 is a capacitive touch sensor 4230. In some embodiments, the second sensor 4230 comprises a physiological sensor. The physiological sensor is arranged to capture data indicative of a current awareness of the user. For example, the physiological sensor may be a heart rate sensor. In some embodiments, the physiological sensor comprises a camera. The camera is arranged to capture data indicative of a current awareness of the user. In some examples, the camera is an infrared camera. The infrared camera can see through some sunglasses worn by the user to continue to detect an eye characteristic of the user, for example a blink characteristic.

In some embodiments, the second sensor 4230 comprises a torque input sensor (not shown in FIG. 16). The torque input sensor is arranged to detect a steering input by the user on a steering control, such as a steering wheel, of the host vehicle. In this way, a steering input by the user of the host vehicle is indicative of the capability of the user to take control of the host vehicle after the host vehicle has transitioned out of the autonomous driving mode.

Figure 17:
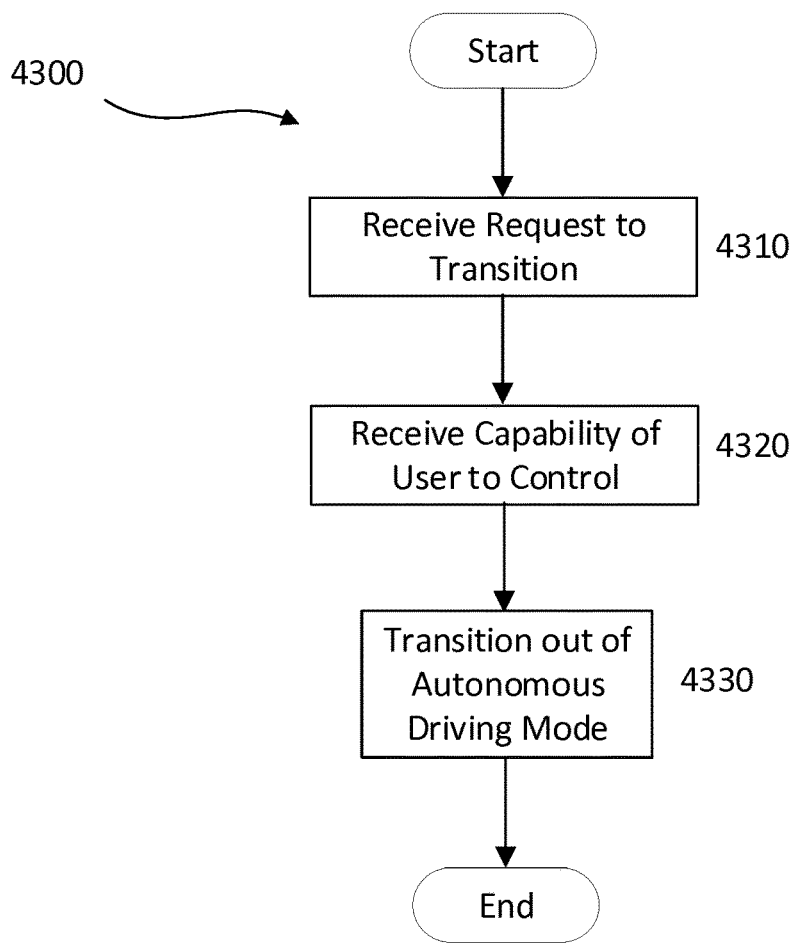
FIG. 17 shows a flow diagram illustrating a method in accordance with an embodiment of the present invention.

A method 4300 in accordance with an embodiment of the invention is shown in FIG. 17. The method 4300 is a method of controlling the host vehicle. In particular, the method 4300 is a method of controlling a transition out of an autonomous driving mode of the host vehicle in dependence on a request of the user to transition out of the autonomous driving mode and a capability of the user to take control of the host vehicle. The method 4300 may be performed by the controller 4110 and system 4210 described hereinbefore with reference to FIGS. 15 and 16.

The method 4300 broadly comprises the steps of receiving 4310 a request from the user to transition out of the autonomous driving mode, receiving 4320 a capability of the user to take control of the host vehicle after the host vehicle has transitioned out of the autonomous driving mode and, in dependence thereon, transitioning 4330 the host vehicle out of the autonomous driving mode.

Referring to FIG. 17, the illustrated embodiment of the method 4300 comprises a step of receiving 4310 a request from a user to transition out of an autonomous driving mode of a host vehicle.

In step 4320, a capability of the user to take control of the host vehicle after the host vehicle has transitioned out of the autonomous driving mode is received.

In step 4330, the host vehicle is transitioned out of the autonomous driving mode in dependence on the request from the user and the capability of the user to take control of the host vehicle.

Figure 18:
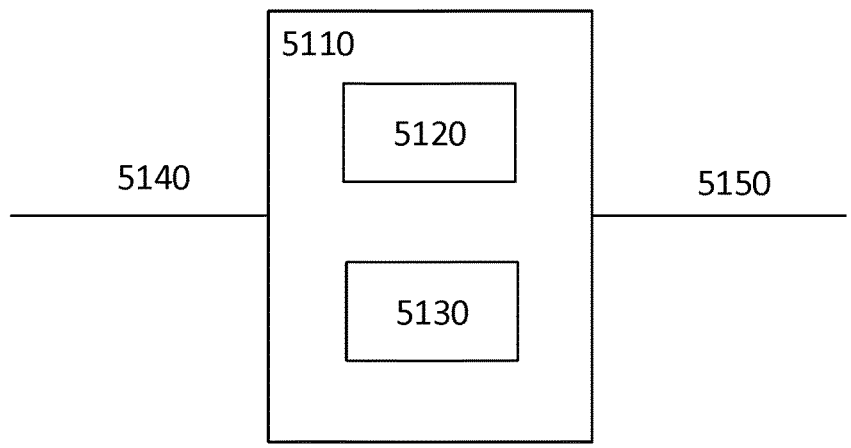
FIG. 18 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 5110 or control unit 5110 in accordance with an embodiment of the invention is shown in FIG. 18.

The controller 5110 is associated with a host vehicle for operating in an autonomous driving mode, and comprises a control means 5120, input means 5140 and output means 5150. In some embodiments, the controller 5110 comprises a memory means 5130 such as one or more memory devices 5130 for storing data therein. The input means 5140 may comprise an electrical input for receiving a signal in the form of a feedback signal. The feedback signal is indicative of a resistance experienced by a steering wheel of a host vehicle in response to a force for moving the steering wheel. The force is applied to the steering wheel. The output means 5150 may comprise an electrical output for outputting a user readiness signal. The user readiness signal is indicative of a presence of a hand of a user on the steering wheel. The control means 5120 may be formed by one or more electronic processing devices such as an electronic processor. The processor may operably execute computer readable instructions stored in the one or more memory devices 5130. The control means 5120 is arranged to cause the output means 5150 to output the user readiness signal in dependence on the feedback signal. Therefore, in this example, the presence of the hand of the user on the steering wheel can be determined by applying a force to the steering wheel and detecting the resistance experienced by the steering wheel. It will be understood that when a hand is present on the steering wheel, this can result in an additional resistance to movement of the steering wheel in response to an input force. In some embodiments, the input means 5140 and the output means 5150 may be combined such as by being formed by an I/O unit or interface unit. For example, the controller 5110 may comprise an interface to a network forming a communication bus of the host vehicle. The interface bus may be an Internet Protocol (IP) based communication bus such as Ethernet, although embodiments of the invention are not limited in this respect.

In some embodiments, the output means 5150 is arranged to output a steering wheel movement control signal. The steering wheel movement control signal is to cause the steering wheel of the host vehicle to at least attempt to move. The control means 5120 is arranged to cause the output means 5150 to output the steering wheel movement control signal. The steering wheel movement control signal is to cause the force on for moving the steering wheel. In some embodiments, the steering wheel movement control signal is configured to cause the steering wheel to attempt to perform a rotational movement. Therefore, the steering wheel may attempt to rotate. It will be understood that the presence of the hand of the user on the steering wheel will resist against rotational movement of the steering wheel. In this way, the presence of the hand of the user on the steering wheel can be determined based on the resistance experienced by the steering wheel to the at least attempted movement of the steering wheel. The steering wheel movement control signal is a request for movement of the steering wheel.

In some embodiments, the control means 5120 is arranged to control the input means 5140 to output any feedback signal to the control means 5120 only after the steering wheel movement control signal is output. In this way, the controller 5110 is arranged only to receive the feedback signal indicative of the resistance experienced by the steering wheel of the host vehicle in response to the force for moving the steering wheel when the controller 5110 has also caused movement of the steering wheel via the steering wheel movement control signal.

In some embodiments, the steering wheel movement control signal is configured to cause the steering wheel to apply a predetermined torque. In some embodiments, the steering wheel movement control signal is configured to cause the steering wheel to attempt to perform a first movement in a first direction. The steering wheel movement control signal is configured to cause the steering wheel to attempt to perform a second movement in a second direction. The second direction is opposite the first direction. In some embodiments, the steering wheel movement control signal is configured to cause the steering wheel to attempt to move away from a first position and to return to the first position.

In some embodiments, the steering wheel movement control signal is such as to cause the force to be sufficiently low as to make the attempt to move the steering wheel substantially imperceptible to the user. In other words, the force is such as to cause the steering wheel to attempt to move an amount substantially imperceptible to the user.

In some embodiments, the steering wheel movement control signal is configured to attempt to apply a rotational movement of up to a predetermined amount, to cause a substantially imperceptible change to a direction of travel of the host vehicle.

In some embodiments, the steering wheel movement control signal is solely for use to determine the presence of the hand of the user on the steering wheel. In some embodiments, the steering wheel movement control signal is configured to cause the steering wheel to attempt to move by up to a predetermined amount. In some embodiments the attempt at movement of the steering wheel results in movement of the steering wheel in the absence of the presence of the hand of the user on the steering wheel. In some embodiments, the attempt at movement of the steering wheel results in movement of the steering wheel with the presence of the hand of the user on the steering wheel.

In some embodiments, the input means 5140 is arranged to receive a detection signal. The detection signal is indicative of a further detection of contact with the user on the steering wheel. The control means 5120 is arranged to cause the output means 5150 to output the user readiness signal in dependence on the feedback signal and the detection signal.

In some embodiments, the control means 5120 is arranged to determine if the feedback signal is indicative of the resistance experienced by the steering wheel being greater than a predetermined resistance threshold. The control means 5120 is arranged to cause the output means 5150 to output the user readiness signal if the feedback signal is determined to be indicative of the resistance experienced by the steering wheel being greater than the predetermined resistance threshold.

Figure 19:
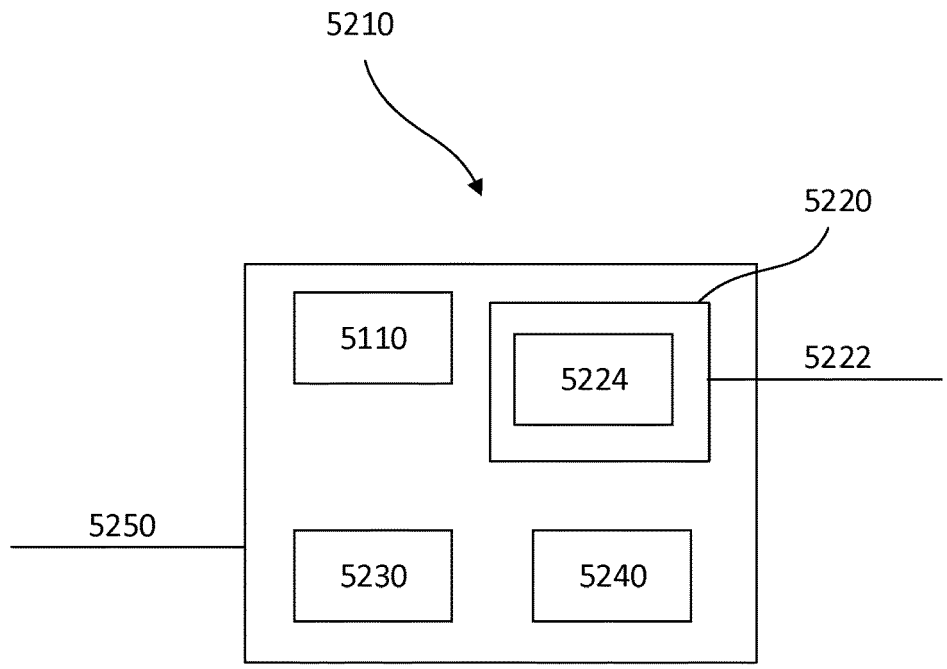
FIG. 19 shows a schematic representation of a system incorporating a controller in accordance with an embodiment of the present invention.

A system 5210 in accordance with an embodiment of the invention is shown in FIG. 19.

The system 5210 comprises the controller 5110 as described herein with reference to FIG. 18 as a first controller 5110, and a second controller 5220. In some embodiments, the system 5210 comprises actuator means 5230. In some embodiments, the system 5210 comprises a touch sensor 5240. In some embodiments, the system 5210 comprises input means 5250. The first controller 5110 is arranged to output the user readiness signal as described hereinbefore. The second controller 5220 is in data communication with the first controller 5110. The second controller 5220 comprises output means 5222 in the form of second controller output means 5222 and control means 5224 in the form of second controller control means 5224. The second controller output means 5222 may comprise an electrical output for outputting a signal in the form of a mode change signal. The mode change signal is to cause the host vehicle to transition out of an autonomous driving mode. In some embodiments, the second controller 5220 comprises a memory means (not shown in FIG. 19) such as one or more memory devices for storing data therein. The second controller control means 5224 may be formed by one or more electronic processing devices such as an electronic processor. The processor may operably execute computer readable instructions stored in the one or more memory devices. The second controller control means 5224 is arranged to cause the second controller output means 5222 to output the mode change signal in dependence on the user readiness signal.

In some embodiments, the actuator means 5230 may be in the form of an actuator unit 5230. The actuator means 5230 is for receiving the steering wheel movement control signal. The actuator means 5230 is configured to apply the force to the steering wheel of a host vehicle in dependence on the steering wheel movement control signal. In some embodiments, the actuator means 5230 is a motor.

In some embodiments, the touch sensor 5240 is to be provided at the steering wheel. The touch sensor 5240 is arranged to output the detection signal in response to the further detection of contact with the user on the steering wheel. In some embodiments, the touch sensor 5240 is a capacitive touch sensor 5240.

In some embodiments, the input means 5250 is for receiving a steering signal indicative of a path change request when the host vehicle is operating in the autonomous driving mode. The path change request is indicative of a steering command of the host vehicle, determined by an autonomous driving controller for controlling the host vehicle in the autonomous driving mode. In some embodiments, the system 5210 comprises actuator means, such as an actuator unit to cause the host vehicle to steer in accordance with a steering instruction. The actuator means referred to here may be the same or different to the actuator means described hereinbefore. The second controller control means 5224 is arranged to determine the steering instruction in dependence on the steering wheel movement control signal. The steering wheel movement control signal is configured to cause the steering wheel to attempt to move by more than an amount necessary in dependence on the steering signal alone. In other words, the steering wheel of the host vehicle is configured to move (or attempt to move) by more than necessary merely as part of the normal navigation of the host vehicle to stay on the navigable path along which the host vehicle is travelling.

Figure 20:
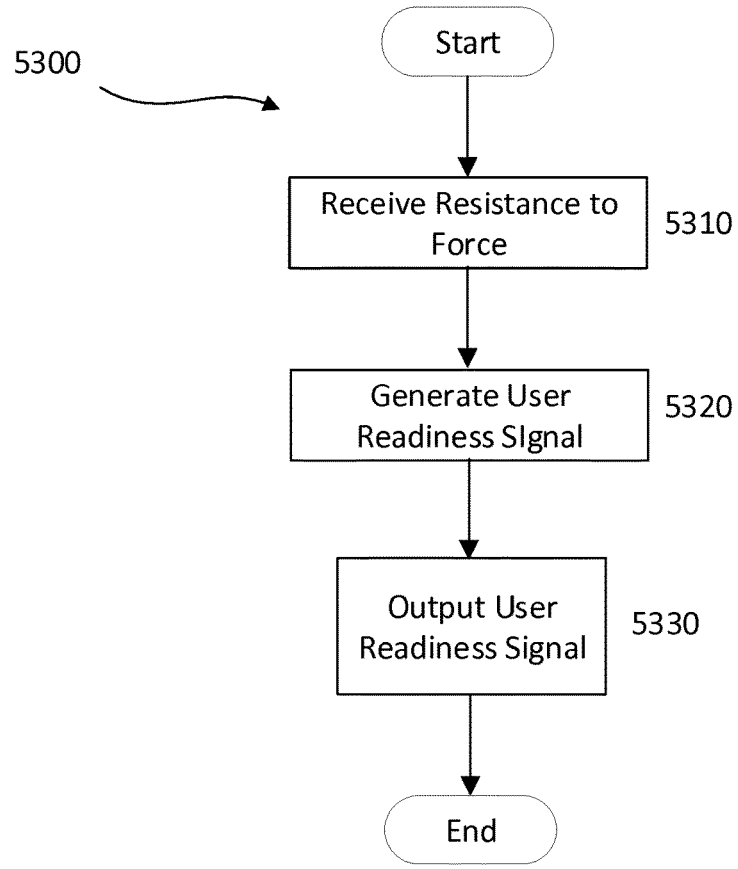
FIG. 20 shows a flow diagram illustrating a method in accordance with an embodiment of the present invention.

A method 5300 in accordance with an embodiment of the invention is shown in FIG. 20. The method 5300 is a method of controlling a host vehicle. Specifically, the method 5300 is a method of determining a readiness of the user of the host vehicle in dependence on a resistance experienced by a steering wheel of the host vehicle to a force for moving the steering wheel applied to the steering wheel. The method 5300 may be performed by the controller 5110 and system 5210 described hereinbefore with reference to FIGS. 18 and 19.

The method 5300 broadly comprises the steps of receiving 5310 a resistance to a force for moving a steering wheel of a host vehicle, and generating 5320 and outputting 5330 a user readiness signal in dependence on the received resistance.

Referring to FIG. 20, the illustrated embodiment of the method 5300 comprises a step of receiving 5310 a feedback signal indicative of a resistance experienced by a steering wheel of a host vehicle in response to a force for moving the steering wheel applied to the steering wheel.

In step S320, a user readiness signal indicative of a presence of a hand of a user on the steering wheel is generated in dependence on the feedback signal. In some embodiments, the step S320 may comprise generating the user readiness signal if the feedback signal is indicative of the resistance being greater than a predetermined resistance threshold.

In step S330, the user readiness signal is output.

In some embodiments, the method 5300 comprises outputting a steering wheel movement control signal to cause the steering wheel of the host vehicle to attempt to move, whereby to generate the force for moving the steering wheel.

In some embodiments, the method 5300 comprises receiving a detection signal indicative of a further detection of contact with the user on the steering wheel. The method 5300 comprises generating the user readiness signal in dependence on the feedback signal and the detection signal.

Figure 21:
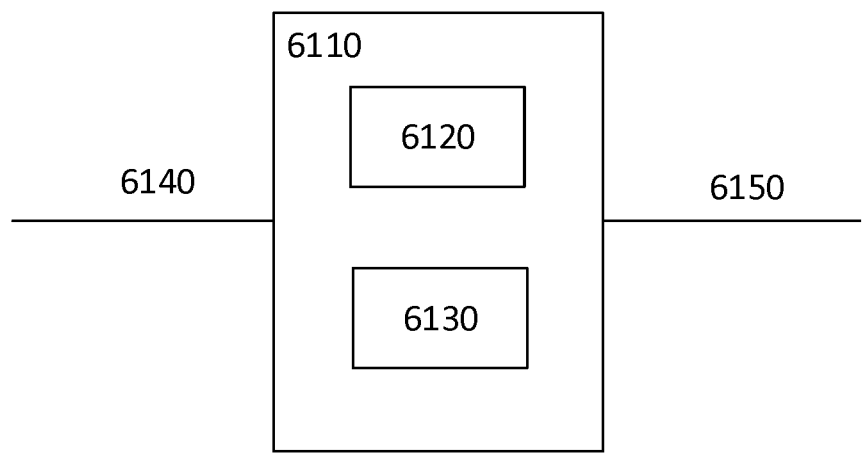
FIG. 21 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 6110 or control unit 6110 in accordance with an embodiment of the invention is shown in FIG. 21. The controller 6110 is for use with any of the navigable path layouts described in more detail with reference to FIGS. 22A to 22C hereinafter. The controller 6110 is associated with a host vehicle for operating in an autonomous driving mode, and comprises a control means 6120, input means 6140 and output means 6150. In some embodiments, the controller 6110 comprises a memory means 6130 such as one or more memory devices 6130 for storing data therein. The input means 6140 may comprise an electrical input for receiving a signal in the form of a detection signal. The detection signal is indicative of detection of a first feature associated with a navigable path of the host vehicle. The input means 6140 may comprise an electrical input for receiving a signal in the form of a time signal, and/or a distance signal. The time signal is indicative of a travel time from the host vehicle to the first feature. The distance signal is indicative of a travel distance from the host vehicle to the first feature. In some embodiments, the detection signal may comprise the time signal and/or the distance signal. In other words, both the time signal and/or the distance signal and the detection signal can be received together at the input means 6140. The output means 6150 may comprise an electrical output for outputting a transition signal. The transition signal is to cause the host vehicle to transition from an autonomous driving mode to a further driving mode. The control means 6120 may be formed by one or more electronic processing devices such as an electronic processor. The processor may operably execute computer readable instructions stored in the one or more memory devices 6130. The control means 6120 is arranged to cause the output means 6150 to output a first transition signal in dependence on the detection signal if the time signal and/or the distance signal is indicative of the travel time or travel distance respectively to the first feature being greater than a first predetermined threshold (time or distance). The first transition signal is to cause the host vehicle to transition from the autonomous driving mode to a first further driving mode. The control means 6120 is arranged to cause the output means 6150 to output a second transition signal in dependence on the detection signal if the time signal and/or the distance signal is indicative of the travel time or travel distance respectively to the first feature being less than the first predetermined threshold (time or distance). The second transition signal is to cause the host vehicle to transition from the autonomous driving mode to a second further driving mode, different from the first further driving mode. Therefore, in this example, the travel distance and/or travel time from the host vehicle to the first feature can be used to determine the further driving mode into which the host vehicle is transitioned from the autonomous driving mode. In some embodiments, the input means 6140 and the output means 6150 may be combined such as by being formed by an I/O unit or interface unit. For example, the controller 6110 may comprise an interface to a network forming a communication bus of the host vehicle. The interface bus may be an Internet Protocol (IP) based communication bus such as Ethernet, although embodiments of the invention are not limited in this respect. In some embodiments, the control means 6120 may be arranged to cause the host vehicle to transition between driving modes directly, rather than through the transition signal from the output means 6150. The first further driving mode and the second further driving mode are each different from the autonomous driving mode, for example because both the first further driving mode and the second further driving mode are arranged to request the user to take control of the host vehicle before the host vehicle reaches the first feature.

The first feature is described in more detail with reference to FIGS. 22A to 22C hereinafter.

In some embodiments, the first transition signal is to cause the host vehicle to complete the transition from the autonomous driving mode to the first further driving mode before the host vehicle reaches the first feature. In some embodiments, a duration of the transition from the autonomous driving mode to the first further driving mode is greater than a duration of the transition from the autonomous driving mode to the second further driving mode. In this way, when the first feature is closer to the host vehicle, the host vehicle is arranged to transition out of the autonomous driving mode more quickly.

In some embodiments, a torque for longitudinal movement of the host vehicle (for example braking and/or acceleration) is controlled autonomously in the first further driving mode and the second further driving mode. In some embodiments, the host vehicle is arranged to be decelerated in the first further driving mode and the second further driving mode.

In some embodiments, the host vehicle is to be decelerated at a first deceleration rate in the first further driving mode, and the host vehicle is to be decelerated at a second deceleration rate in the second further driving mode. Therefore, the host vehicle can decelerate at different rates in the first further driving mode compared with the second further driving mode. In some embodiments, the host vehicle is arranged to be decelerated to a stop in the first further driving mode and the second further driving mode.

In some embodiments, a steering of the host vehicle is controlled autonomously in the first further driving mode and the second further driving mode.

In some embodiments, the output means 6150 is for outputting a request signal. The request signal is to request the user to transition the host vehicle from the first further driving mode or the second further driving mode to a manual driving mode in advance of the host vehicle reaching the first feature. The control means 6120 is arranged to cause the output means 6150 to output the request signal in dependence on the detection signal. In other words, the user can be requested to take control of the host vehicle on detection of the first feature.

In some embodiments, the control means 6120 is arranged to cause the output means 6150 to output the request signal after the host vehicle has started to transition from the autonomous driving mode to the first further driving mode or to the second further driving mode. In other words, the user can be requested to take control of the host vehicle while the host vehicle is operating in the first further driving mode or the second further driving mode.

In some embodiments, the transition from the autonomous driving mode to the first further driving mode comprises a first portion during which the control means 6120 is arranged to cause the output means 6150 to output the request signal, and a second portion during which the host vehicle is to be decelerated at a faster rate than in the first portion. In some embodiments, the transition from the autonomous driving mode to the second further driving mode comprises a first portion during which the control means 6120 is arranged to cause the output means 6150 to output the request signal, and a second portion during which the host vehicle is to be decelerated at a faster rate than in the first portion. The duration of the first portion of the transition is greater in the transition from the autonomous driving mode to the first further driving mode than in the transition from the autonomous driving mode to the second further driving mode.

In some embodiments, the output means 6150 is for outputting an availability signal. The availability signal is to indicate to the user an availability of the autonomous driving mode. The control means 6120 is arranged to cause the output means 6150 to output the availability signal in dependence on the detection signal and a determination that the host vehicle has passed the first feature. In some embodiments, the availability signal may be to indicate to the user that the autonomous driving mode is unavailable if the host vehicle has detected but not passed the first feature.

In some embodiments, the control means 6120 is arranged to determine that the host vehicle has passed the first feature in dependence on a further detection signal received by the input means 6140. The further detection signal is indicative of a detection of a second feature associated with the navigable path (and described further in relation to FIGS. 22A and 22B hereinafter), and indicative of an end of the first feature.

A plurality of navigable path layouts are shown in FIGS. 22A to 22C. FIG. 22A shows a navigable path 6410 in the form of a road 6410. In some embodiments, the navigable path 6410 is a multi-lane navigable path 6410. In some embodiments, the navigable path comprises a first lane 6412, a second lane 6414, a third lane 6416 and a fourth lane 6418. A host vehicle 6420 is travelling along the navigable path 6410 in a direction D. In this particular example, the host vehicle 6420 is travelling in the fourth lane 6418 of the navigable path 6410. The navigable path 6410 has a first feature 6430 associated therewith. In some embodiments, the first feature 6430 is associated with a driving restriction 6430. In some embodiments, the first feature 6430 comprises the driving restriction 6430. The driving restriction 6430 is associated with at least a portion of the navigable path 6410, for example a plurality of lanes 6412, 6414, 6416 of the navigable path 6410. In some embodiments, the driving restriction 6430 is indicative of a closure of at least a portion of the navigable path 6410. In some embodiments, the driving restriction 6430 is roadworks 6430. In some embodiments, the driving restriction 6430 comprises one or more road traffic cones 6432. In some embodiments, the driving restriction 6430 comprises a temporary path marking, such as one or more of a temporary lane marking, a lane end sign and a temporary barrier, for example a temporary central reservation barrier. In other words, the driving restriction 6430 can be any feature of or associated with the navigable path 6410 which can require the host vehicle 6420 to be operated in a different driving mode to a current driving mode of the host vehicle 6420. For example, when the host vehicle 6420 is operated in an autonomous driving mode, it may be desirable or required that the host vehicle 6420 is operated in a different driving mode to the autonomous driving mode, for example a manual driving mode as described herein, when the host vehicle 6420 moves past or through the driving restriction 6430.

In some embodiments, the navigable path 6410 has associated therewith a first preceding feature 6440. The first preceding feature 6440 is indicative of the presence of the first feature 6430. In some embodiments, the first preceding feature 6440 comprises an advance marker 6440. In some embodiments, the advance marker 6440 is indicative of a travel time to the first feature 6430. In some embodiments, the advance marker 6440 is indicative of a travel distance to the first feature 6430. It will be understood that the travel time or the travel distance may be from the host vehicle 6420 or from the advance marker 6440. Therefore, the first preceding feature 6440 can provide advance notice that the first feature 6430 is upcoming on the navigable path 6410, allowing the host vehicle 6420 to prepare for the first feature 6430.

In some embodiments, the navigable path 6410 has associated therewith a second preceding feature 6450 indicative of the presence of the first feature 6430. In some embodiments, the second preceding feature comprises a start marker 6450. Therefore, the start marker 6450 can be indicative of the start of the first feature 6430. In some embodiments, the start marker 6450 is indicative of the start of the first feature 6430 being closer than from the advance marker 6440.

In some embodiments, the navigable path 6410 has associated therewith a second feature 6460. The second feature 6460 is located beyond the first feature 6430 on the navigable path 6410 and is indicative of an end of the first feature 6430. In some embodiments, the second feature 6460 may comprise an end marker 6460. Therefore, when the host vehicle 6420 passes the second feature 6460, it may be possible for the host vehicle 6420 to return to a previous driving mode in which the host vehicle 6420 was operating prior to encountering the first feature 6430.

In the example shown in FIG. 22A, the host vehicle 6420 can be operating in an autonomous driving mode prior to entering the portion of the navigable path 6410 shown in FIG. 22A. The host vehicle 6420 first detects the first preceding feature 6440, which is indicative of the presence of the first feature 6430 ahead of the host vehicle 6420 along the navigable path 6410. Were the host vehicle 6420 to be operating in a manual driving mode or another driving mode different from the autonomous driving mode, the host vehicle 6420 is prevented from entering the autonomous driving mode after detection of the first preceding feature 6440.

The host vehicle 6420 next detects the second preceding feature 6450 in the form of the start marker 6450 in advance of the host vehicle 6420 reaching the start marker 6450. In some embodiments, the host vehicle 6420 determines a location of the start marker 6450 based on the first preceding feature 6440. The host vehicle 6420 is arranged to switch from the autonomous driving mode to a transition driving mode in advance of the start marker 6450. In this example, the host vehicle 6420 is arranged to switch to the transition driving mode a predetermined distance in advance of the start marker 6450. In the transition driving mode, the user of the host vehicle 6420 is requested to take control of the host vehicle 6420 to navigate the host vehicle 6420 past the first feature. If the user fails to take control of the host vehicle 6420 by the time the host vehicle reaches the start marker 6450, the host vehicle 6420 is arranged to decelerate to bring the host vehicle 6420 to a complete stop in advance of the host vehicle 6420 reaching the first feature 6430. It will be understood that some deceleration of the host vehicle 6420 may occur in the transition driving mode, such as coasting or engine-braking, but that the deceleration of the host vehicle 6420 to bring the host vehicle 6420 to the complete stop may be greater.

As described previously, once the host vehicle 6420 has passed the first feature 6430, the host vehicle 6420 may be transitioned (manually or automatically) back into the autonomous driving mode. In some embodiments, the host vehicle 6420 is deemed to have passed the first feature 6430 when the host vehicle 6420 has passed the end marker 6460. In some embodiments, the host vehicle 6420 is deemed to have passed the first feature 6430 when no further features are detected by the host vehicle 6420 for a predetermined time or a predetermined distance after the first feature 6430. In some embodiments, an availability of the autonomous driving mode may be indicated to the user in dependence on a determination that the host vehicle has passed the first feature 6430.

It will be understood that the detection of the first feature 6430, the first preceding feature 6440, the second preceding feature 6450 and the second feature 6460 can be achieved using sensing means, such as one or more sensor units associated with the host vehicle 6420. For example, the host vehicle 6420 may comprise one or more cameras, laser sensors, radar sensors, and ultrasound sensors, along with sensor processing means in the form of an image processor, configured to observe the navigable path 6410 and to detect one or more of the first feature 6430, the first preceding feature 6440, the second preceding feature 6450 and the second feature 6460. In some embodiments, the detection of the first feature 6430, the first preceding feature 6440, the second preceding feature 6450 and the second feature 6460 is achieved based on map information instead of or in addition to the sensing means.

FIG. 22B shows a further arrangement of features on a navigable path 6410*a*. The features are substantially as described with reference to FIG. 22A, but with the herein noted differences. In FIG. 22B, the navigable path 6410*a* has no associated advance marker 6440 from FIG. 22A. Instead, the start marker 6450*a* associated with the navigable path 6410*a* serves as the first indicator to the host vehicle 6420 of the upcoming first feature 6430. In this way, the host vehicle 6420 can prevent activation of the autonomous driving mode as soon as the start marker 6450*a* is detected. If the host vehicle 6420 is already operating in the autonomous driving mode, the host vehicle 6420 switches from the autonomous driving mode to the transition driving mode at the start marker 6450*a*. In this embodiment, the host vehicle 6420 is arranged to stay in the transition driving mode for a predetermined duration, requesting the user to take control of the host vehicle 6420. As in FIG. 22A, should the user fail to take control of the host vehicle 6420, the host vehicle 6420 is arranged to decelerate to a stop in advance of the first feature 6430.

FIG. 22C shows another arrangement of features on a navigable path 6410*b*. The features are substantially as described with reference to FIG. 22B, apart from the herein noted differences. In FIG. 22B, the start marker 6450*b* is located closer to the first feature 6430 than in FIG. 22A or 22B. In this example, if the host vehicle 6420 is operating in the autonomous driving mode, the host vehicle 6420 switches to the transition driving mode from the start marker 6450*b*. The host vehicle 6420 is arranged to start decelerating the host vehicle 6420 to a stop earlier than in FIG. 22A or 22B to ensure that the host vehicle 6420 is stopped prior to the first feature 6430. Therefore, the length of time or distance for the transition driving mode in which the user is requested to take control of the host vehicle 6420 can be reduced compared to the situation in FIG. 22A or 22B.

Figure 23:
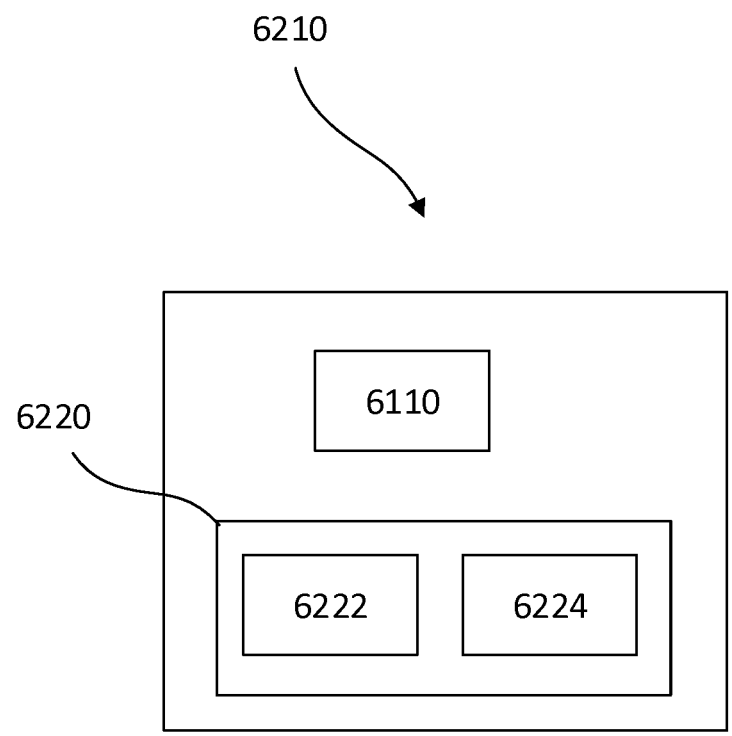
FIG. 23 shows a schematic representation of a system incorporating a controller in accordance with an embodiment of the present invention.

A system 6210 in accordance with an embodiment of the invention is shown in FIG. 23. The system 6210 comprises the controller 6110 as described herein with reference to FIG. 21 as a first controller 6110, a sensing means 6220 and a vehicle controller 6230. The sensing means 6220 is for detecting the first feature and is arranged to output the detection signal to the first controller 6110 in dependence on detection of the first feature. The sensing means 6220 is for detecting a travel time (and/or travel distance) from the host vehicle to the first feature and is arranged to output the time signal (and/or the distance signal) to the first controller 6110 in dependence on detection of the travel time (and/or travel distance). The vehicle controller 6230 is for receiving the transition signal from the first controller 6110 and is to cause the host vehicle to transition from the autonomous driving mode to the first further driving mode or from the autonomous driving mode to the second further driving mode in dependence on the transition signal. The transition signal can be the first transition signal or the second transition signal. The sensing means 6220 may comprise a sensor unit 6220.

In some embodiments, the sensing means 6220 comprises a camera 6220. In some embodiments, the sensing means 6220 comprises a radar. In some embodiments, the sensing means 6220 comprises a range sensing means 6220, for example a range detection means, such as a rangefinder. The rangefinder can be a laser rangefinder or another form of rangefinder. In some embodiments, the sensing means 6220 is arranged to receive navigation data.

In some embodiments, the sensing means 6220 is for detecting the second feature, in addition to the first feature.

Figure 24:
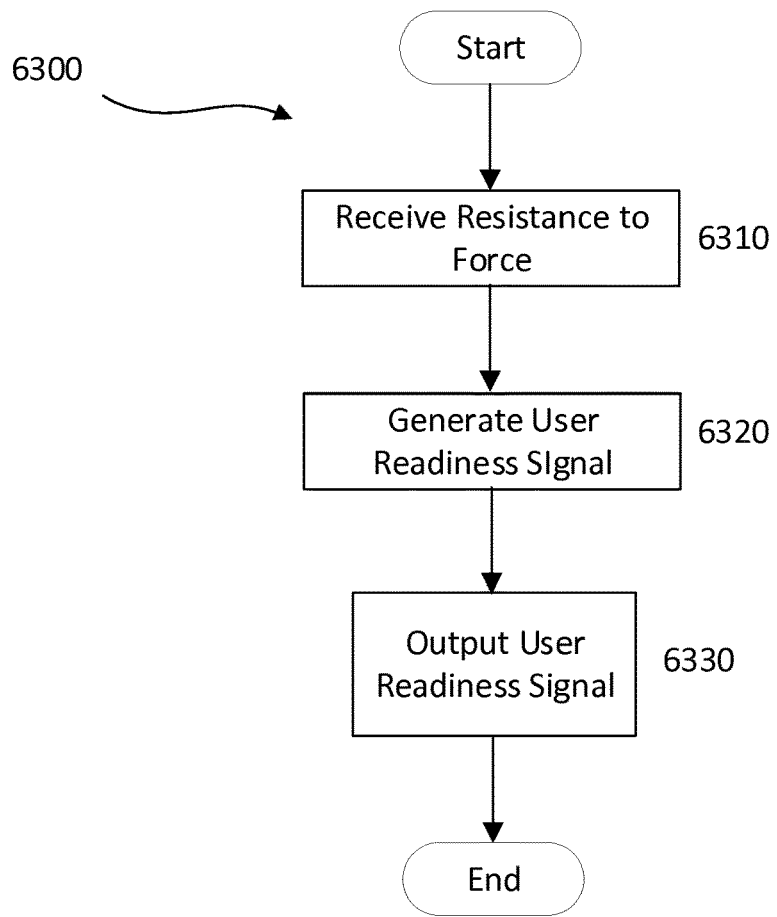
FIG. 24 shows a flow diagram illustrating a method in accordance with an embodiment of the present invention.

A method 6300 in accordance with an embodiment of the invention is shown in FIG. 24. The method 6300 is a method of controlling a host vehicle. Specifically, the method 6300 is a method of transitioning the host vehicle out of an autonomous driving mode in dependence on detection of a first feature associated with a navigable path of the host vehicle. The method 6300 may be performed by the controller 6110 and system 6210 described hereinbefore with reference to FIGS. 21 and 23.

The method 6300 broadly comprises the steps of detecting 6310 a first feature associated with a navigable path of a host vehicle, receiving 6320 a travel time (and/or a travel distance) to the first feature, and, in dependence on the detection of the first feature, transitioning 6330 the host vehicle to a first further driving mode or transitioning 6340 the host vehicle to a second further driving mode.

Referring to FIG. 24, the illustrated embodiment of the method 6300 comprises a step of detecting 6310 a first feature associated with a navigable path of a host vehicle. In step 6320, a travel time and/or a travel distance from the host vehicle to the first vehicle is received. In some embodiments, the step 6320 may occur as part of the step 6310 of detecting the first feature. In some embodiments, the travel time (and/or the travel distance) can be determined in dependence on detection of the first feature.

In step 6330, if the travel time (and/or travel distance) to the first feature is greater than a first predetermined time, the host vehicle is transitioned from an autonomous driving mode to a first further driving mode in dependence on the detection of the first feature.

In step 6340, if the travel time (and/or travel distance) to the first feature is less than the first predetermined time, the host vehicle is transitioned from the autonomous driving mode to a second further driving mode in dependence on the detection of the first feature.

In some embodiments, the method 6300 comprises the step 6350 of determining if the travel time (and/or travel distance) from the host vehicle to the first feature is greater than the first predetermined time.

Figure 25:
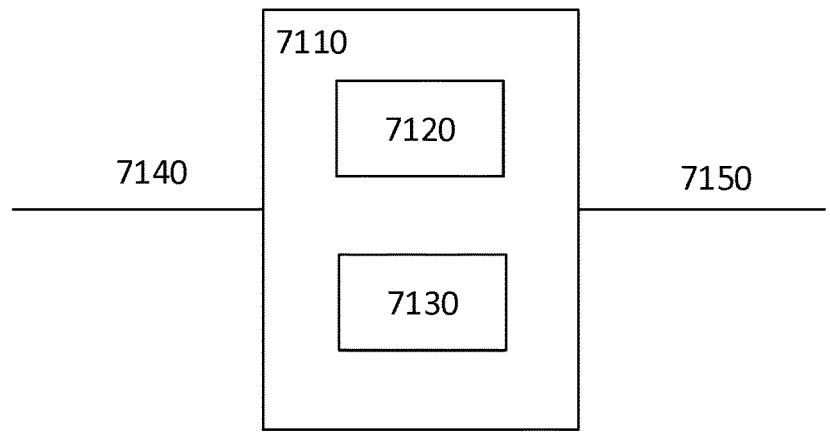
FIG. 25 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 7110 or control unit 7110 in accordance with an embodiment of the invention is shown in FIG. 25.

The controller 7110 comprises a control means 7120, input means 7140 and output means 7150. In some embodiments, the controller 7110 comprises a memory means 7130 such as one or more memory devices 7130 for storing data therein. The input means 7140 may comprise an electrical input for receiving a signal in the form of a first request signal. The first request signal is indicative of a primary control attempt by a user of a host vehicle. The primary control attempt is to control a first component of the host vehicle to perform a requested action. The requested action is different from a current action of the first component and is associated with a manoeuvre of the host vehicle. In some embodiments, the input means 7140 comprises an electrical input for receiving a signal in the form of a second request signal. The second request signal is indicative of a secondary control attempt by the user of the host vehicle to control a second component of the host vehicle. The first component and the second component of the host vehicle are each components for movement of the host vehicle. The output means 7150 may comprise an electrical output for outputting a first component control signal. The first component control signal is to cause the first component to perform the requested action. The control means 7120 may be formed by one or more electronic processing devices such as an electronic processor. The processor may operably execute computer readable instructions stored in the one or more memory devices 7130. The control means 7120 is arranged to control the output means 7150 to output the first component control signal in dependence on the first request signal and receipt of the second request signal. The control means 7120 is arranged to determine if the first request signal is indicative of the primary control attempt being greater than a first predetermined threshold. In other words, the control means 7120 is arranged to determine if the first request signal satisfies a first predetermined criterion, indicated by the first predetermined threshold. The control means 7120 is arranged to cause the output means 7150 to output the first component control signal in dependence on if the first request signal is indicative of the primary control attempt being greater than the first predetermined threshold. The control means 7120 is arranged to determine if the second request signal is received by the input means 7140. If the second request signal is determined to be received, the control means 7120 is arranged to determine if the first request signal is indicative of the primary control attempt being greater than a second predetermined threshold. In other words, the control means 7120 is arranged to determine if the first request signal satisfied a second predetermined criterion, indicated by the second predetermined threshold. The control means 7120 is arranged to cause the output means 7150 to output the first component control signal in dependence on if the second request signal is determined to be received, and if the first request signal is indicative of the primary control attempt being greater than the second predetermined threshold. The second predetermined threshold is different to the first predetermined threshold. Therefore, the controller 7110 can be arranged to cause the host vehicle to operate the first component for movement of the host vehicle following a primary control attempt by the user according to different criteria based on whether the primary control attempt is accompanied by a secondary control attempt. In some embodiments, the control means 7120 is arranged to control the host vehicle in accordance with an autonomous driving mode when the user supplies the first control attempt and the second control attempt. In some embodiments, the input means 7140 and the output means 7150 may be combined such as by being formed by an I/O unit or interface unit. For example, the controller 7110 may comprise an interface to a network forming a communication bus of the host vehicle. The interface bus may be an Internet Protocol (IP) based communication bus such as Ethernet, although embodiments of the invention are not limited in this respect.

In some embodiments, the second predetermined threshold is less than the first predetermined threshold. Therefore, a primary control attempt, not accompanied by a secondary control attempt needs to be stronger in order to result in performance of the requested action by the first component, compared to a primary control attempt accompanied by a secondary control attempt.

In some embodiments, the first component is a steering component operable to cause a change in a direction of travel of the host vehicle. In this way, the primary control attempt can be an attempt by the user of the host vehicle to change a direction of travel of the host vehicle. In some embodiments, the first predetermined threshold and/or the second predetermined threshold comprise a torque limit threshold. In this context, the torque limit threshold is understood to be indicative of a steering torque to be applied by the user as the primary control attempt to change the direction of travel of the host vehicle. In some embodiments, the primary control attempt is applied to a steering wheel of the host vehicle.

In some embodiments, the first predetermined threshold and/or the second predetermined threshold comprise a torque integral limit threshold. The torque integral limit threshold is indicative of an integrated steering torque to be applied by the user as the primary control attempt. The primary control attempt is applied by the user to the steering wheel of the host vehicle. It will be understood that an integrated steering torque is a mathematical integral of the steering torque applied by the user over an integration window. In some embodiments, the integration window is less than five seconds.

In some embodiments, the control means 7120 is arranged to determine if the first request signal is indicative of the primary control attempt being greater than the first predetermined threshold for longer than a first threshold duration. The control means 7120 is arranged to cause the output means 7150 to output the first component control signal in dependence on whether the first request signal is indicative of the primary control attempt being greater than the first predetermined threshold for longer than the first threshold duration. In some embodiments, the first threshold duration is less than two seconds.

Therefore, the use of either the torque integral limit threshold or the first threshold duration described hereinbefore allow the control means 7120 to not output the first component control signal in dependence on a short primary control attempts which is not sufficiently sustained. For example, accidental knocks of the control apparatus by the user of the host vehicle may not result in performance of the requested action by the first component.

In some embodiments, the output means 7150 is for outputting a second component control signal. The second component control signal is to cause the second component to perform a further requested action. The further requested action may be associated with the same manoeuvre as for the requested action of the first component, or may be associated with a different manoeuvre to the manoeuvre associated with the requested action of the first component. The control means 7120 is arranged to determine if the second request signal is indicative of the secondary control attempt being greater than a third predetermined threshold. The control means 7120 is arranged to cause the output means 7150 to output the second component control signal in dependence on whether the second request signal is indicative of the secondary control attempt being greater than the third predetermined threshold. The third predetermined threshold may be different from either of the first predetermined threshold and the second predetermined threshold. Alternatively, the third predetermined threshold may be the same as the first predetermined threshold and/or the second predetermined threshold.

In some embodiments, the second component is a speed control component, such as a torque control component. The speed control component is operable to cause a change in a speed of the host vehicle, for example a ground speed of the host vehicle. In some embodiments, the speed control component comprises a braking component, such as a brake, operable to reduce the speed of the host vehicle.

In some embodiments, the third predetermined threshold is a braking threshold. The braking threshold is indicative of a braking force to be applied by the user as the secondary control attempt to a brake input of the host vehicle.

In some embodiments, the speed control component comprises an acceleration component, such as a torque request component, for example a motor. The torque request component is operable to increase the speed of the host vehicle. In some embodiments, the third predetermined threshold is an acceleration threshold. The acceleration threshold is indicative of an acceleration request to be applied by the user as the secondary control attempt to an acceleration input of the host vehicle.

In some embodiments, the input means 7140 is for receiving a detection signal. The detection signal is indicative of detection of a hand of the user on the steering wheel of the host vehicle, in substantially any way as described hereinbefore. The control means 7120 is arranged to cause the output means 7150 to output the first component control signal in dependence on the detection signal.

In some embodiments, the control means 7120 is arranged to determine if the first request signal is indicative of the primary control attempt being greater than a fourth predetermined threshold. The control means 7120 is arranged to cause the output means 7150 to output the first component control signal in dependence on if the first request signal is indicative of the primary control attempt being greater than the fourth predetermined threshold and in dependence on if the detection signal is indicative of the detection of the hand of the user on the steering wheel. In other words, a different threshold can be used depending on whether the user has at least one hand on the steering wheel.

In some embodiments, the fourth predetermined threshold is less than at least one of the first predetermined threshold and the second predetermined threshold.

In some embodiments, the input means 7140 is for receiving a further detection signal. The further detection signal is indicative of detection of a further hand of the user on the steering wheel of the host vehicle. The control means 7120 is arranged to cause the output means 7150 to output the first component control signal in dependence on the further control signal.

In some embodiments, the control means 7120 is arranged to determine if the first request signal is indicative of the primary control attempt being greater than a fifth predetermined threshold. The control means 7120 is arranged to cause the output means 7150 to output the first component control signal in dependence on if the first request signal is indicative of the primary control attempt being greater than the fifth predetermined threshold and in dependence on if the detection signal and the further detection signal are together indicative of the detection of the hand and the further hand of the user on the steering wheel. In other words, a different threshold can be used depending on whether the user has both hands on the steering wheel.

In some embodiments, the fifth predetermined threshold is less than at least one of the first predetermined threshold, the second predetermined threshold and the fourth predetermined threshold.

In some embodiments, the output means 7150 is for outputting a transition signal. The transition signal is to cause the host vehicle to transition out of an autonomous driving mode of the host vehicle. The control means 7120 is arranged to cause the output means 7150 to output the transition signal in dependence on the first request signal. In some examples, the control means 7120 can be arranged to cause the output means 7150 to output the transition signal if the control means 7120 is to cause the output means 7150 to output the first component control signal. Therefore, the host vehicle can be transitioned out of the autonomous driving mode if the first component control signal is output.

In some embodiments, the transition signal is to cause the host vehicle to transition out of the autonomous driving mode to a manual driving mode over a transition period of time. In some embodiments, the transition period of time may be at least half a second. In some embodiments, the transition period of time may be less than half a second.

Figure 26:
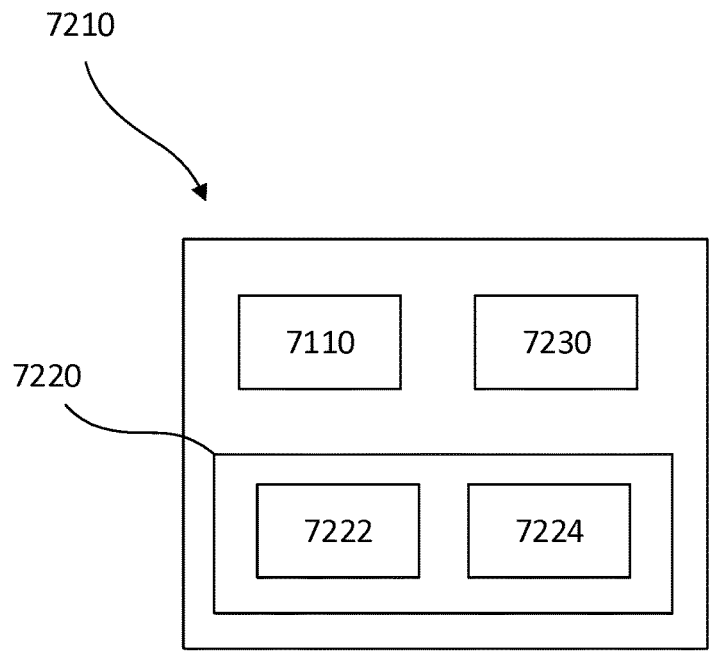
FIG. 26 shows a schematic representation of a system incorporating a controller in accordance with an embodiment of the present invention.

A system 7210 in accordance with an embodiment of the invention is shown in FIG. 26.

The system 7210 comprises the controller 7110 as described hereinbefore with reference to FIG. 25 and arranged to output the first component control signal. In some embodiments, the system 7210 comprises actuator means 7230 in the form of an actuator unit 7230 and input apparatus 7220. The actuator means 7230 is for receiving the first component control signal from the controller 7110. The actuator means 7230 is to cause the first component of the host vehicle to perform the requested action in dependence on the first component control signal. The input apparatus 7220 is for receiving the primary control attempt by the user of the host vehicle and is arranged to output the first request signal to the controller 7110 in dependence on the received primary control attempt. In some embodiments, the input apparatus 7220 comprises a first input device 7222 for receiving the primary control attempt by the user and a second input device 7224 for receiving the secondary control attempt by the user. The second input device 7224 is arranged to output the second request signal to the controller 7110 in dependence on the secondary control attempt. In some embodiments, the first input device 7222 may be a steering component 7222, such as a steering wheel 7222 of the host vehicle. In some embodiments, the second input device 7224 may be a speed control component 7224, such as a braking component 7224, for example a brake pedal 7224, of the host vehicle.

Figure 27:
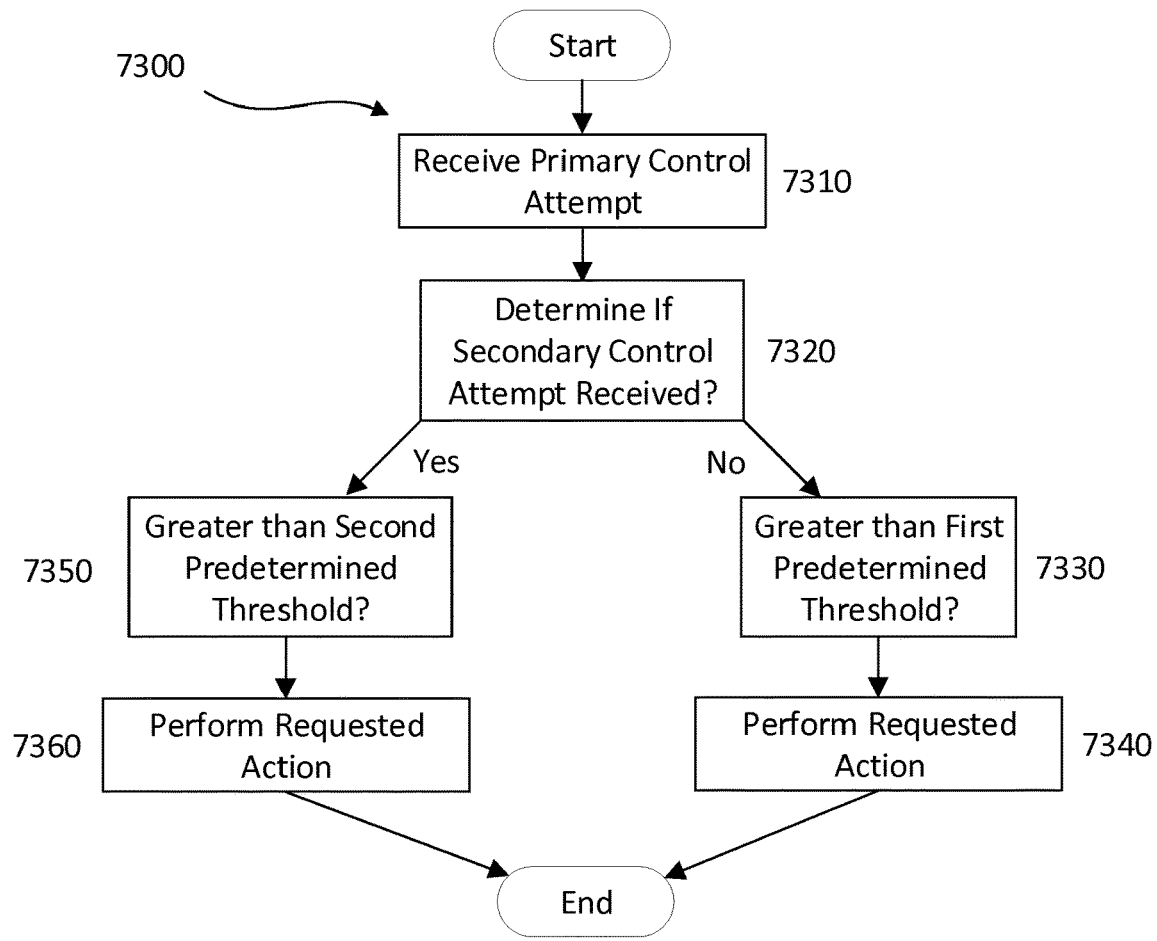
FIG. 27 shows a flow diagram illustrating a method in accordance with an embodiment of the present invention.

A method 7300 according to an embodiment of the invention is shown in FIG. 27. The method 7300 is a method of controlling the host vehicle. In particular, the method 7300 is a method of controlling a first component for movement of the host vehicle to perform a requested action. The method 7300 may be performed by the controller 7110 and system 7210 described hereinbefore with reference to FIGS. 25 and 26.

The method 7300 broadly comprises steps of receiving 7310 a primary control attempt by a user of a host vehicle to control a first component of the host vehicle, determining 7320 if a secondary control attempt by the user of the host vehicle to control a second component of the host vehicle is received, and in dependence thereon, controlling the first component to perform the requested action.

Referring to FIG. 27, the illustrated embodiment of the method 7300 comprises a step of receiving 7310 a primary control attempt by a user of a host vehicle. The primary control attempt is to control a first component of the host vehicle to perform a requested action different from a current action of the first component. The requested action is associated with a manoeuvre of the host vehicle. The first component is a component for movement of the host vehicle.

In step 7320, the receipt of a secondary control attempt is determined. The secondary control attempt is by the user of the host vehicle and is to control a second component for movement of the host vehicle.

If the secondary control attempt is not received in step 7320, in step 7330, whether a characteristic of the primary control attempt is greater than a first predetermined threshold is determined. In step 7340, the first component is controlled to perform the requested action in dependence on whether the characteristic of the primary control attempt is greater than the first predetermined threshold.

If the secondary control attempt is received in step 7320, in step 7350, whether the characteristic of the primary control attempt is greater than a second predetermined threshold is determined. In step 7360, the first component is controlled to perform the requested action in dependence on whether the characteristic of the primary control attempt is greater than the second predetermined threshold.

Figure 28:
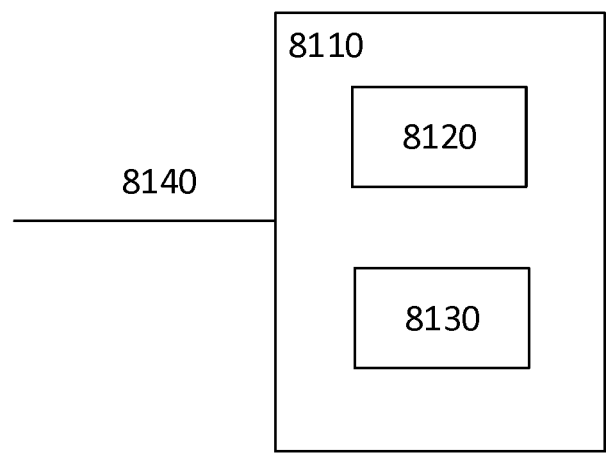
FIG. 28 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 8110 or control unit 8110 in accordance with an embodiment of the invention is shown in FIG. 28.

The controller 8110 comprises control means 8120 and input means 8140. In some embodiments, the controller 8110 comprises a memory means 8130 such as one or more memory devices 8130 for storing data therein. The input means 8140 may comprise an electrical input for receiving a signal in the form of a transition request signal. The transition request signal is indicative of a transition request by a user of a host vehicle to transition out of an autonomous driving mode of the host vehicle. In some embodiments, the input means 8140 comprises an electrical input for receiving a signal in the form of a steering request signal. The steering request signal is indicative of a steering request by the user of the host vehicle. The control means 8120 may be formed by one or more electronic processing devices such as an electronic processor. The processor may operably execute computer readable instructions stored in the one or more memory devices 8130. The control means 8120 is arranged to switch from the autonomous driving mode to a transition driving mode in dependence on the transition request signal. In the transition driving mode, the host vehicle is steered autonomously. The control means 8120 is arranged to receive the steering request signal indicative of the steering request by the user of the host vehicle. The control means 8120 is arranged to determine if the steering request signal is indicative of the steering request being greater than a predetermined threshold. The control means 8120 is arranged to switch from the transition driving mode to a further driving mode in dependence on whether the steering request signal is indicative of the steering request being greater than the predetermined threshold. In the further driving mode, the host vehicle is steered in dependence on the steering request signal. In some embodiments, the control means 8120 is arranged to control the host vehicle in accordance with the autonomous driving mode when the user supplies the transition request. Therefore, the host vehicle can be switched to the further driving mode and out of a driving mode in which the steering of the host vehicle is controlled autonomously in dependence on a steering request signal.

In some embodiments, the control means 8120 is arranged to switch from the transition driving mode to the further driving mode in less than half a second.

In some embodiments, the predetermined threshold comprises a torque limit threshold. The torque limit threshold is indicative of a steering torque to be applied by the used as the steering request to a steering wheel of the host vehicle.

In some embodiments, the control means 8120 is arranged to determine if the steering request signal is indicative of the steering request being greater than the torque limit threshold for longer than a predetermined duration. The control means 8120 is arranged to switch from the transition driving mode to the further driving mode in dependence on if the steering request signal is indicative of the steering request being greater than the torque limit threshold for longer than the predetermined duration.

In some embodiments, the predetermined threshold comprises a torque integral limit threshold. The torque integral limit threshold is indicative of an integrated steering torque to be applied by the user as the steering request to a steering wheel of the host vehicle. In some embodiments, the torque integral limit threshold is indicative of the integrated steering torque to be applied by the user over an integration window. In some embodiments, the integration window has a duration of no more than three seconds.

In some embodiments, the control means 8120 is arranged to cause a predetermined delay between receipt of the transition request signal and switching from the autonomous driving mode to the transition driving mode. In some embodiments, the predetermined delay is of a duration of at least half a second.

It will be understood that in some embodiments, the controller 8110 may comprise output means (not shown in FIG. 28) for outputting a driving mode control signal to cause the host vehicle to switch driving modes. The output means can be substantially as described hereinbefore in relation to other aspects of the invention.

Figure 29:
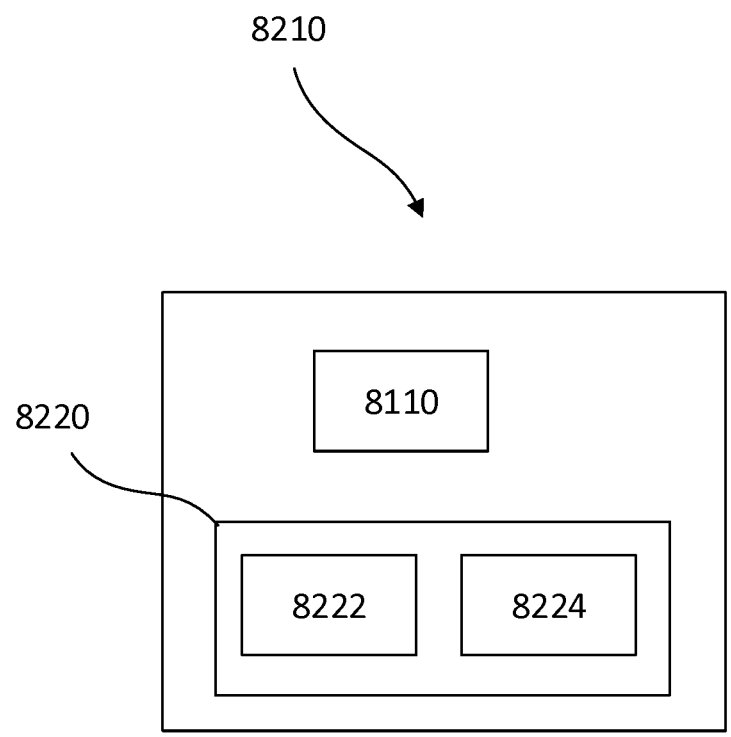
FIG. 29 shows a schematic representation of a system incorporating a controller in accordance with an embodiment of the present invention.

A system 8210 in accordance with an embodiment of the invention is shown in FIG. 29.

The system 8210 comprises the controller 8110 as described hereinbefore with reference to FIG. 28 and arranged to switch between the autonomous driving mode and the transition driving mode. The controller 8110 is arranged to switch between the transition driving mode and the further driving mode. The system 8210 comprises input apparatus 8220. The input apparatus 8220 is for receiving the transition request from the user and is arranged to output the transition request signal to the controller 8110 in dependence on the transition request. The input apparatus 8220 is for receiving the steering request from the user and is arranged to output the steering request signal to the controller 8110 in dependence on the steering request. In some embodiments, the input apparatus 8220 comprises a first input apparatus 8222 for receiving the transition request from the user and a second input apparatus 8224 for receiving the steering request from the user. In some embodiments, the input apparatus 8220 is for operation by a hand of the user to cause the input apparatus 8220 to output the transition request signal. In some embodiments, the input apparatus 8220 in the form of the first input apparatus 8222 comprises an input switch 8222. In some embodiments, at least a portion of the input apparatus 8220 is arranged to be provided at a steering wheel of the host vehicle. In some embodiments, the input apparatus 8220 comprises a steering wheel 8220.

In some embodiments, the input apparatus 8220 is arranged to cause a predetermined delay between a first receipt of the transition request from the user and output of the transition request signal. The predetermined delay is of a duration of at least half a second.

In some embodiments, the input apparatus 8220 is for operation by a hand of the user to cause the input apparatus 8220 to output the steering request signal.

In some embodiments, during the transition from the transition driving mode to the further driving mode, the system 8210 is arranged to limit a rate of change of the steering of the host vehicle to a rate threshold. In some embodiments, the rate threshold is determined in dependence on the steering request signal. Therefore, the host vehicle can be steered only partially in dependence on the steering request signal in the case of significant steering requests, to reduce the likelihood of swerving of the host vehicle.

In some embodiments, the rate threshold is arranged to increase as the host vehicle transitions from the transition driving mode to the further driving mode. In other words, as the host vehicle transitions from the transition driving mode to the further driving mode, the host vehicle may become more fully compliant with a steering request from the user.

In some embodiments, the system 8210 is arranged to reduce a steering of the vehicle from a steering request indicated by the steering request signal by a predetermined amount during the transition from the transition driving mode to the further driving mode. This is an alternative approach to the previously described approach using the rate threshold.

Figure 30:
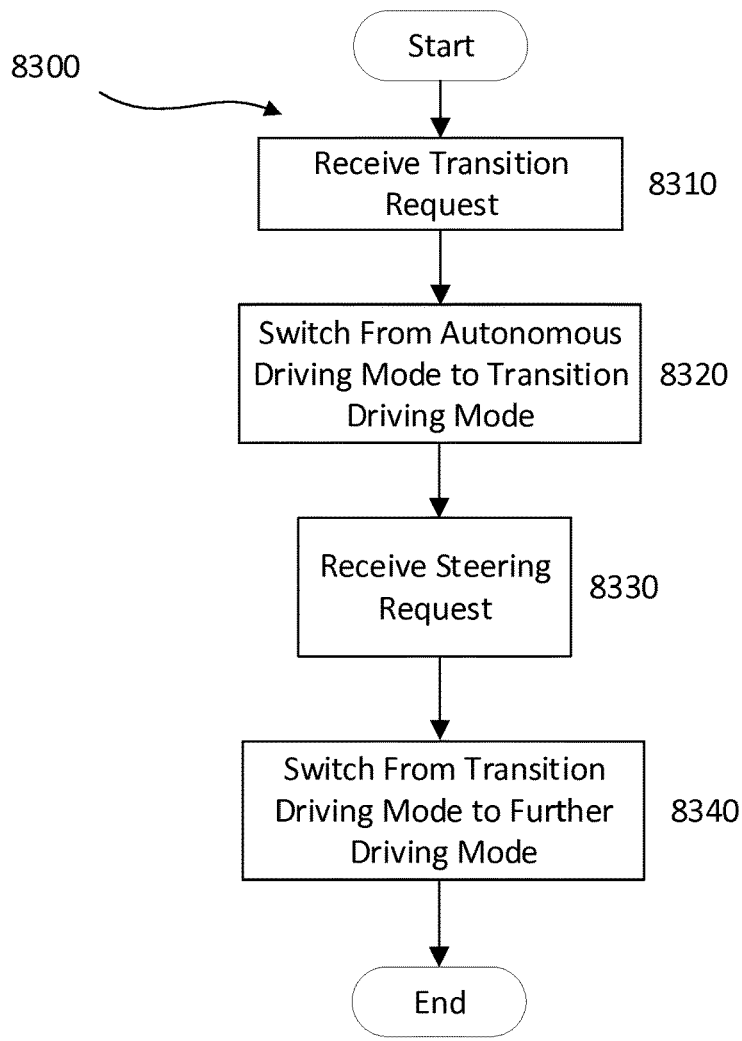
FIG. 30 shows a flow diagram illustrating a method in accordance with an embodiment of the present invention.

A method 8300 according to an embodiment of the invention is shown in FIG. 30. The method 8300 is a method of controlling the host vehicle. In particular, the method 8300 is a method of transitioning the host vehicle out of an autonomous driving mode to a further driving mode in which the host vehicle is steered in dependence on a steering request by a user of the host vehicle. The method 8300 may be performed by the controller 8110 and system 8210 described hereinbefore with reference to FIGS. 28 and 29.

The method 8300 broadly comprises steps of receiving 8310 a transition request by a user of a host vehicle to transition out of an autonomous driving mode, transitioning 8320 the host vehicle from the autonomous driving mode to a transition driving mode, receiving 8330 a steering request by the user of the host vehicle and, in dependence thereon, transitioning 8340 the host vehicle from the transition driving mode to a further driving mode.

Referring to FIG. 30, the illustrated embodiment of the method 8300 comprises a step of receiving 8310 a transition request by a user of a host vehicle. The transition request is to transition out of an autonomous driving mode of the host vehicle. As explained hereinbefore, in the autonomous driving mode, the host vehicle is at least steered autonomously. In some embodiments, a longitudinal movement of the host vehicle may also be controlled autonomously in the autonomous driving mode.

In step 8320, the host vehicle is transitioned or switched from the autonomous driving mode to a further driving mode in dependence on the transition request. In the further driving mode, the host vehicle is steering autonomously. For example, if the transition request satisfies any requirements on the transition request as described hereinbefore, the host vehicle can transition from the autonomous driving mode to the further driving mode.

In step 8330, a steering request by the user of the host vehicle is received. The steering request may be received in any way described hereinbefore.

In step 8340, the host vehicle is transitioned or switched from the transition driving mode to a further driving mode in dependence on whether a characteristic of the steering request is greater than a predetermined threshold. The characteristic of the steering request may be any characteristic of the steering request, for example as described hereinbefore. In the further driving mode, the host vehicle is steered in dependence on the steering request. In some embodiments, the further driving mode may be a manual driving mode in which the host vehicle is steered in dependence on a steering input to a steering wheel of the host vehicle. Therefore, the host vehicle can be transitioned out of the transition driving mode where a suitable steering request is received whilst the host vehicle is in the transition driving mode.

In some embodiments, the host vehicle is transitioned from the transition driving mode to the further driving mode in dependence on whether a steering torque to be applied by the user as the steering request to a steering wheel of the host vehicle is greater than a torque limit threshold. In some embodiments, the host vehicle is transitioned from the transition driving mode to the further driving mode in dependence on whether the steering torque of the steering request is greater than the torque limit threshold for longer than a predetermined duration.

In some embodiments, the host vehicle is transitioned from the transition driving mode to the further driving mode in dependence on whether an integrated steering torque to be applied by the user as the steering request is greater than a torque integral limit threshold. The steering request is to be applied to a steering wheel of the host vehicle.

In some embodiments, the host vehicle will transition or switch out of the transition driving mode to the further driving mode after a predetermined period of time, even if the steering request is not received. In some embodiments, the predetermined period of time is at least three seconds.

Figure 31:
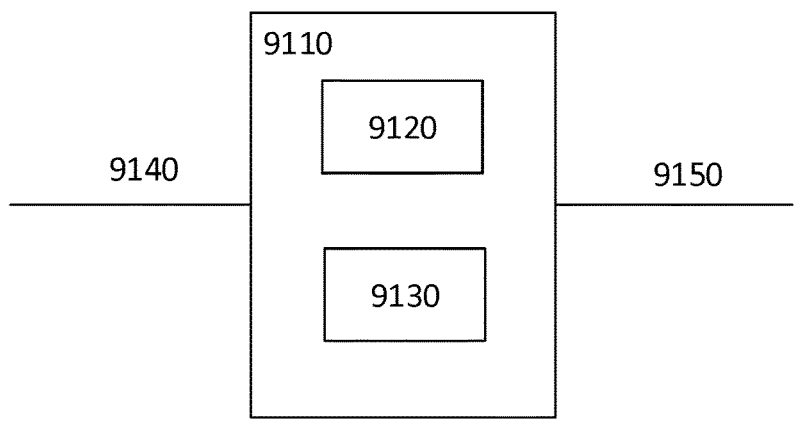
FIG. 31 shows a schematic representation of a controller in accordance with an embodiment of the present invention.

A further aspect of the operation of the autonomous driving mode will now be described. In particular, in one embodiment, there follows a description of a further aspect of a disengagement of the autonomous driving mode. A controller 9110 or control unit 9110 in accordance with an embodiment of the invention is shown in FIG. 31.

The controller 9110 comprises control means 9120 and input means 9140. In some embodiments, the controller 9110 comprises a memory means 9130 such as one or more memory devices 9130 for storing data therein. The input means 9140 may comprise an electrical input for receiving a signal in the form of one or more state signals. The one or more state signals are each indicative of one or more of a vehicle characteristic, a user characteristic and an environment characteristic. In some embodiments, the input means 9140 comprises an electrical input for receiving a signal in the form of a confirmation signal. The confirmation signal is indicative of a confirmation by a user of a host vehicle to transition out of a current driving mode of the host vehicle. The control means 9120 may be formed by one or more electronic processing devices such as an electronic processor. The processor may operably execute computer readable instructions stored in the one or more memory devices 9130. The control means 9120 is arranged to switch from an autonomous driving mode to a transition driving mode in dependence on the one or more state signals. In the transition driving mode, the host vehicle is steered autonomously. The control means 9120 is arranged to receive the confirmation signal indicative of the confirmation by the user of the host vehicle to transition out of the current driving mode of the host vehicle. The control means 9120 is arranged to switch from the transition driving mode to a further driving mode in dependence on the confirmation signal. In some embodiments, in the further driving mode, the host vehicle is steered in dependence on a steering request signal. Therefore, the host vehicle can be transitioned out of the transition driving mode in dependence on the confirmation by the user, even though the transition driving mode was entered from the autonomous driving mode in dependence on the one or more state signals.

In some embodiments, the confirmation signal is indicative of at least one of a steering confirmation, a torque confirmation, a braking confirmation and a driving mode change confirmation by the user of the host vehicle.

In some embodiments, the controller 9110 may comprise output means 9150. The output means 9150 may comprise an electrical output for outputting a notification signal. The notification signal is to notify the user to confirm the switch from the transition driving mode to the further driving mode of the host vehicle. The control means 9120 is arranged to cause the output means 9150 to output the notification signal in dependence on the one or more state signals. In some embodiments, the control means 9120 is arranged to cause the output means 9150 to output the notification signal in dependence on the host vehicle switching from the autonomous driving mode to the transition driving mode.

In some embodiments, the input means 9140 is for receiving a capability signal. The capability signal is indicative of a capability of the user to take control of the host vehicle after the host vehicle has transitioned out of the autonomous driving mode. The capability signal may be determined substantially as described elsewhere in this specification.

In some embodiments, the control means 9120 is arranged to switch from the transition driving mode to the further driving mode in dependence on the capability signal. Therefore, the control means 9120 can switch to the further driving mode if the user is determined to be capable to take control of the host vehicle after the host vehicle has transitioned or switched to the further driving mode.

Figure 32:
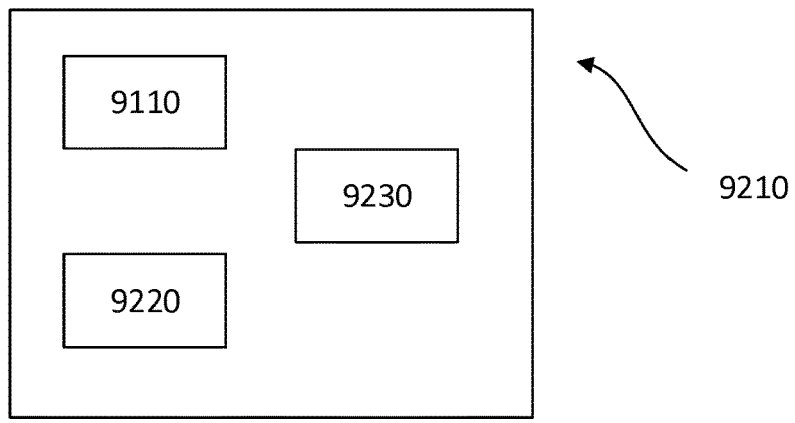
FIG. 32 shows a schematic representation of a system incorporating a controller in accordance with an embodiment of the present invention.

A system 9210 is accordance with an embodiment of the invention is shown in FIG. 32.

The system 9210 comprises the controller 9110 as described hereinbefore with reference to FIG. 31. The controller 9110 is arranged to switch between the autonomous driving mode and the transition driving mode. The controller 9110 is arranged to switch between the transition driving mode and the further driving mode. The system comprises input apparatus 9220. The input apparatus 9220 is for receiving the confirmation from the user to transition out of the current driving mode of the host vehicle. The input apparatus 9220 is arranged to output the confirmation signal to the controller 9110 in dependence on the confirmation from the user. In some embodiments, the input apparatus 9220 is operable by a hand of the user and is an input switch 9220, substantially as described hereinbefore.

In some embodiments, in the transition driving mode, the controller 9110 is arranged to decelerate the host vehicle autonomously. In some embodiments, the controller 9110 is arranged to decelerate the host vehicle autonomously at a deceleration rate less than a maximum deceleration rate of the host vehicle. In other words, the deceleration rate is set to achieve less severe deceleration than possible by the host vehicle when the host vehicle is in the further driving mode. In some embodiments, the further driving mode is a manual driving mode of the host vehicle in which the host vehicle is steered in dependence on a steering request of the user, indicated by a steering request signal as described hereinbefore.

In some embodiments, the controller 9110 is configured to decelerate the host vehicle autonomously at a maximum deceleration rate of the host vehicle.

In some embodiments, the system 9210 comprises notification means 9230 in the form of a notification unit 9230. The notification means 9230 is for receiving the notification signal from the controller 9110. The notification means 9230 is arranged to indicate to the user to confirm the transition from the transition driving mode to the further driving mode of the host vehicle in dependence on the notification signal. In some embodiments, the notification means 9230 comprises a display means 9230, such as a display unit 9230. In some embodiments, the notification means 9230 comprises a tactile output means (not shown in FIG. 32). In some embodiments, the notification means 9230 comprises an audio output means (not shown in FIG. 32).

Figure 33:
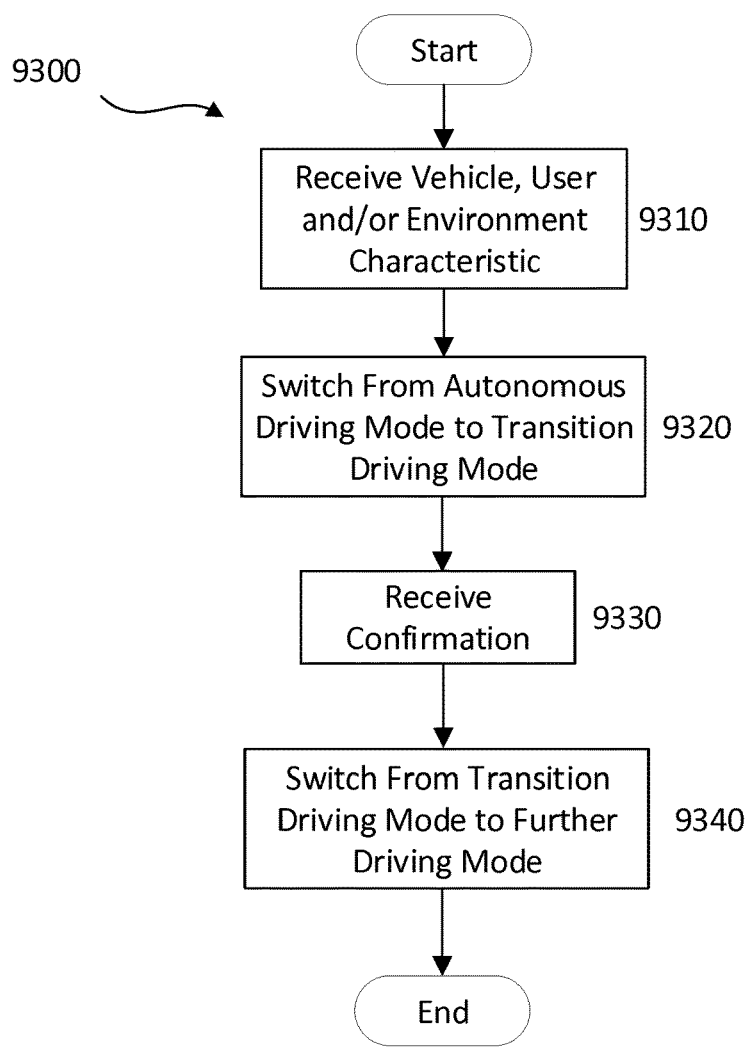
FIG. 33 shows a flow diagram illustrating a method in accordance with an embodiment of the present invention.

A method 9300 according to an embodiment of the invention is shown in FIG. 33. The method 9300 is a method of controlling the host vehicle. In particular, the method 9300 is a method of transitioning the host vehicle out of an autonomous driving mode to a further driving mode in dependence on one or more of a vehicle characteristic, a user characteristic and an environment characteristic and in dependence on a confirmation by a user of the host vehicle.

The method 9300 may be performed by the controller 9110 and system 9210 described hereinbefore with reference to FIGS. 31 and 32.

The method 9300 broadly comprises the steps of receiving 9310 one or more of a vehicle characteristic, a user characteristic and an environment characteristic, transitioning or switching 9320 a host vehicle from an autonomous driving mode to a transition driving mode in dependence on the received characteristics, receiving 9330 a confirmation by a user of the host vehicle to transition out of a current driving mode and transitioning or switching 9340 the host vehicle from the transition driving mode to a further driving mode in dependence on the confirmation.

Referring to FIG. 33, the illustrated embodiment of the method 9300 comprises a step of receiving 9310 one or more of a vehicle characteristic, a user characteristic and an environment characteristic. As described hereinbefore, the characteristics may be received in the form of one or more state signals. The characteristics are any aspects of a vehicle, user or environment which can lead to a necessity for a host vehicle to no longer be operated in an autonomous driving mode.

In step 9320, the host vehicle is transitioned or switched from an autonomous driving mode to a transition driving mode in dependence on one or more of the one or more of the vehicle characteristic, the user characteristic and the environment characteristic. In the transition driving mode, the host vehicle is steered autonomously. The transition driving mode can be as described hereinbefore in relation to other embodiments of the invention.

In step 9330, a confirmation by a user of the host vehicle to transition out of a current driving mode of the host vehicle is received. In some embodiments, the confirmation is a confirmation to transition to a further driving mode of the host vehicle. The confirmation may be determined in any way described hereinbefore.

In step 9340, the host vehicle is transitioned or switched from the transition driving mode to a or the further driving mode in dependence on the confirmation.

In some embodiments, the method 9300 comprises indicating to the user to request the transition from the transition driving mode to the further driving mode of the host vehicle. The indicating to the user may be performed in dependence on the one or more of the one or more of the vehicle characteristic, the user characteristic and the environment characteristic. In some embodiments, the indicating to the user may be performed in dependence on the host vehicle transitioning or switching 9320 from the autonomous driving mode to the transition driving mode.

In some embodiments, the method 9300 comprises transitioning or switching the host vehicle from the transition driving mode to the further driving mode in dependence on a capability of the user to take control of the host vehicle after the host vehicle has transitioned to the further driving mode. In some embodiments, the capability is different from the confirmation. The capability of the user to take control of the host vehicle may be determined as described in relation to any embodiments of the invention described herein.

In some embodiments, the method 9300 comprises causing the host vehicle to decelerate autonomously in the transition driving mode. The autonomous deceleration can be substantially as described in relation to any embodiments of the invention described herein.

Figure 34:
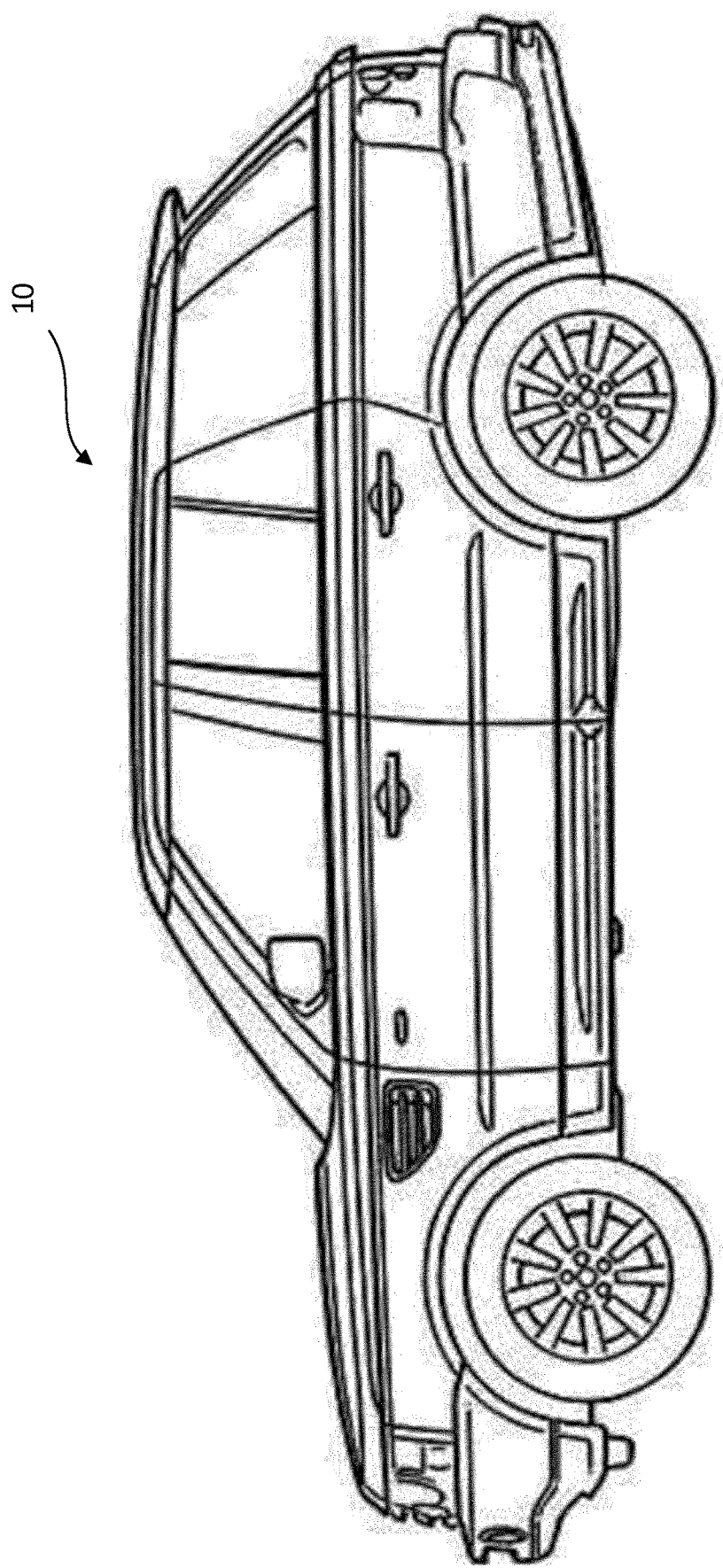
FIG. 34 shows a schematic representation of a vehicle in accordance with an embodiment of the present invention.

A host vehicle 10 in accordance with an embodiment of the invention is shown in FIG. 34. The host vehicle 10 is for travelling along a navigable path in an autonomous driving mode of the host vehicle 10. The host vehicle 10 may comprise any of the controllers or systems described hereinbefore. The host vehicle 10 may be arranged to perform any of the methods described hereinbefore.

As will be understood, the host vehicle 10 may be a ground vehicle, for example a road vehicle such as a car, a lorry, or any other suitable vehicle.

It will be appreciated that embodiments of the present inventions can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A controller, comprising:
   input means for receiving one or more state signals each indicative of at least one selected from the group consisting of: a vehicle characteristic, a user characteristic and an environment characteristic;
   output means for outputting an availability signal indicative of an availability of an autonomous driving mode of a host vehicle; and
   control means arranged to control the output means to output the availability signal based at least in part on the one or more state signals, wherein the input means is arranged to receive a frequency signal indicative of a frequency of previous activation of the autonomous driving mode of the host vehicle, and wherein the control means is further arranged to control the output means to output the availability signal based at least in part on the frequency signal, wherein the input means is further arranged to receive an initiation signal indicative of a user's request to initiate the autonomous driving mode in response to the availability signal and wherein the output means is further arranged to output a driving mode signal to cause the host vehicle to initiate the autonomous driving mode, wherein the control means is further arranged to control the output means to output the driving mode signal based at least in part on the initiation signal, wherein the control means is further arranged to determine a transition phase of the autonomous driving mode, during which control of a vehicle movement of the host vehicle is transitioned away from the user to an autonomous driving control means, wherein at the end of the transition phase, the autonomous driving control means is arranged to autonomously control the vehicle movement, wherein a duration of the transition phase is determined based at least in part on the one or more state signals, and wherein during the transition phase, the autonomous driving control means begins to take control of the host vehicle but the host vehicle continues to respond to vehicle control inputs from the user, and, as the transition phase progresses, the host vehicle becomes less responsive to the vehicle control inputs from the user until the end of the transition phase where the autonomous driving control means fully controls the vehicle movement, and wherein the output means is further arranged to output a progress signal indicative of a progress through the transition phase, wherein the control means is further arranged to control the output means to output the progress signal during the transition phase.

2. The controller of claim 1, wherein the control means is further arranged to determine the duration of the transition phase during the transition phase.

3. The controller of claim 1, wherein at least one of the one or more state signals is indicative of a driving environment of the host vehicle.

4. The controller of claim 3, wherein the driving environment is indicative of a type of navigable path.

5. The controller of claim 1, wherein at least one of the one or more state signals is indicative of a speed.

6. The controller of claim 5, wherein the speed is a speed of the host vehicle or a speed of at least one target vehicle.

7. The controller of claim 1, wherein at least one of the one or more state signals is indicative of at least one selected from the group consisting of: a detection range of one or more sensors associated with the host vehicle, a weather condition, and an awareness of the user.

8. The controller of claim 1, wherein the control means is further arranged to determine:
the frequency signal as having a first value if a frequency of previous activation of the autonomous driving mode is greater than a threshold; and
the frequency signal as having a second value if a frequency of previous activation of the autonomous driving mode is lower than a threshold.

9. A system, comprising:
the controller of claim 1, arranged to output the availability signal; and
notification means for receiving the availability signal and to indicate to a user that the autonomous driving mode is available based at least in part on the received availability signal.

10. The system of claim 9, wherein the notification means is further arranged to receive the driving mode signal to cause the notification means to indicate to the user that the autonomous driving mode is to be initiated.

11. The system of claim 9, wherein the notification means is further arranged to receive the progress signal and to indicate to the user the progress through the transition phase based on the progress signal.

12. The system of claim 9, further comprising sensing means for determining at least one selected from the group consisting of: the vehicle characteristic, the user characteristic and the environment characteristic, sensor output means for outputting the one or more state signals to the controller, and sensor control means to control the sensor output means to output the one or more state signals to the controller based at least in part on the at least one of the vehicle characteristic, wherein the user characteristic and the environment characteristic are determined by the sensing means.

13. A vehicle comprising the controller of claim 1.

14. A vehicle comprising the system of claim 9.

15. A method comprising:
receiving one or more state signals each indicative of at least one selected from the group consisting of: a vehicle characteristic, a user characteristic and an environment characteristic from an input means;
determining the availability signal indicative of an availability of an autonomous driving mode of a host vehicle based at least in part on the one or more state signals;
controlling an output means with a control means to output the availability signal;
determining whether to make the user aware that the autonomous driving mode is currently available based at least in part on a frequency of previous activation of the autonomous driving mode of the host vehicle;
receiving an initiation signal indicative of a user's request to initiate the autonomous driving mode in response to the availability signal;
outputting a driving mode signal to cause the host vehicle to initiate the autonomous driving mode;
controlling the output means to output the driving mode signal based at least in part on the initiation signal;
determining a transition phase of the autonomous driving mode, during which control of a vehicle movement of the host vehicle is transitioned away from the user to an autonomous driving control means, wherein at the end of the transition phase, the autonomous driving control means is arranged to autonomously control the vehicle movement, wherein a duration of the transition phase is determined based at least in part on the one or more state signals, and wherein during the transition phase, the autonomous driving control means begins to take control of the host vehicle but the host vehicle continues to respond to vehicle control inputs from the user, and, as the transition phase progresses, the host vehicle becomes less responsive to the vehicle control inputs from the user until the end of the transition phase where the autonomous driving control means fully controls the vehicle movement; and
outputting a progress signal indicative of a progress through the transition phase, wherein the control means is further arranged to control the output means to output the progress signal during the transition phase.

16. A non-transitory, computer-readable storage medium storing instructions thereon that when executed by one or more processors causes the one or more processors to perform the method of claim 15.

\* \* \* \* \*